US012737071B2

(12) United States Patent
Kim

(10) Patent No.: US 12,737,071 B2
(45) Date of Patent: Sep. 15, 2026

(54) ELECTRONIC DEVICE INCLUDING INTEGRATED TOUCH FINGERPRINT SENSOR, OPERATION METHOD THEREOF, AND RECORDING MEDIUM

(71) Applicant: Samsung Electronics Co., Ltd., Suwon-si (KR)

(72) Inventor: Suna Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/767,024

(22) Filed: Jul. 9, 2024

(65) Prior Publication Data

US 2025/0004591 A1 Jan. 2, 2025

Related U.S. Application Data

(63) Continuation of application No. PCT/KR2024/008900, filed on Jun. 26, 2024.

(30) Foreign Application Priority Data

Jun. 27, 2023 (KR) ........................ 10-2023-0082487
Aug. 14, 2023 (KR) ........................ 10-2023-0106235

(51) Int. Cl.
*G06F 3/041* (2006.01)
*G06F 3/044* (2006.01)
(Continued)

(52) U.S. Cl.
CPC ........ *G06F 3/04164* (2019.05); *G06F 3/0412* (2013.01); *G06V 40/1306* (2022.01);
(Continued)

(58) Field of Classification Search
CPC . G06F 2203/04102; G06F 2203/04111; G06F 2203/04112; G06F 3/0412; G06F 3/04164; G06F 3/0446; G06F 2203/0338
See application file for complete search history.

(56) References Cited

U.S. PATENT DOCUMENTS 11,209,961 B2 12/2021 Pope et al.
2012/0050216 A1* 3/2012 Kremin ................ G06F 3/0446 345/174

(Continued)

FOREIGN PATENT DOCUMENTS

KR 10-2014-0093092 A 7/2014
KR 10-2014-0123610 A 10/2014

(Continued)

OTHER PUBLICATIONS

International Search Report dated Oct. 2, 2024, issued in International Application No. PCT/KR2024/008900.

*Primary Examiner* — Robin J Mishler
(74) *Attorney, Agent, or Firm* — Jefferson IP Law, LLP

(57) ABSTRACT

An electronic device is provided. The electronic device includes a display in which a plurality of pixels are arranged, a display driver integrated circuit (IC) configured to control an operation of the display, a touch fingerprint sensor disposed inside the display and including transmit (Tx) lines and receive (Rx) lines formed of a metal mesh, a touch fingerprint sensor IC configured to control an operation of the touch fingerprint sensor, one or more processors configured to control operations of the display driver IC and the touch fingerprint sensor IC, and memory operatively connected to the one or more processors, wherein the memory store one or more computer programs, wherein the one or more computer programs include computer-executable instructions that, when executed by the one or more processors during a touch sensing operation, cause the electronic (Continued)

device to configure a plurality of Tx touch channels by grouping the Tx lines in a predetermined number of units, and supply a first Tx signal to the plurality of Tx touch channels, configure a plurality of Rx channels by grouping the Rx lines in a predetermined number of units, and receive a first Rx signal of each of the plurality of Rx channels, and detect a touch location, based on the first Rx signal of each of the plurality of Rx channels.

16 Claims, 24 Drawing Sheets

(51) Int. Cl.

| | |
|---|---|
| ***G06V 40/12*** | (2022.01) |
| ***G06V 40/13*** | (2022.01) |
| ***G09G 3/00*** | (2006.01) |
| ***G09G 3/3208*** | (2016.01) |

(52) U.S. Cl.
CPC ......... *G06V 40/1365* (2022.01); *G09G 3/035* (2020.08); *G06F 3/0446* (2019.05); *G06F 2203/04102* (2013.01); *G06F 2203/04111* (2013.01); *G06F 2203/04112* (2013.01); *G09G 3/3208* (2013.01); *G09G 2340/0464* (2013.01); *G09G 2354/00* (2013.01)

(56) References Cited

U.S. PATENT DOCUMENTS

| | | | | |
|---|---|---|---|---|
| 2014/0198267 | A1 | 7/2014 | Jeong et al. | |
| 2015/0135108 | A1 | 5/2015 | Pope et al. | |
| 2017/0024602 | A1* | 1/2017 | Han | G06F 3/0443 |
| 2018/0217679 | A1* | 8/2018 | Kwon | G06V 40/10 |
| 2020/0160025 | A1* | 5/2020 | Dangy-Caye | G06F 21/32 |
| 2020/0241722 | A1 | 7/2020 | Kim et al. | |
| 2020/0264755 | A1* | 8/2020 | Jin | G06F 3/0412 |
| 2021/0165987 | A1 | 6/2021 | Kim et al. | |
| 2021/0256237 | A1 | 8/2021 | Kim et al. | |
| 2022/0148464 | A1 | 5/2022 | Kwak et al. | |
| 2023/0280874 | A1 | 9/2023 | Han et al. | |

FOREIGN PATENT DOCUMENTS

| | | | |
|---|---|---|---|
| KR | 10-2017-0011675 | A | 2/2017 |
| KR | 10-2017-0016556 | A | 2/2017 |
| KR | 10-2020-0048096 | A | 5/2020 |
| KR | 10-2020-0093323 | A | 8/2020 |
| KR | 10-2154813 | B1 | 9/2020 |
| KR | 10-2247663 | B1 | 5/2021 |
| KR | 10-2021-0069483 | A | 6/2021 |
| KR | 10-2021-0103317 | A | 8/2021 |
| KR | 10-2021-0124829 | A | 10/2021 |
| KR | 10-2021-0143022 | A | 11/2021 |
| KR | 10-2375850 | B1 | 3/2022 |
| KR | 10-2022-0063936 | A | 5/2022 |

* cited by examiner

FIG. 4

501
TOUCH FINGERPRINT SENSOR (TOUCH SCREEN) [451]
POLARIZING LAYER (POLARIZING FILM)
DISPLAY [410]
<ADD-ON MANNER>
502
POLARIZING LAYER (POLARIZING FILM)
TOUCH FINGERPRINT SENSOR (TOUCH SCREEN) [451]
DISPLAY [410]
<ON-CELL MANNER>
503
POLARIZING LAYER (POLARIZING FILM)
TOUCH FINGERPRINT SENSOR (TOUCH SCREEN) [451] + DISPLAY [410]
<IN-CELL MANNER>

[STRIPE TYPE]

[DIAMOND TYPE]

[ROUND DIAMOND TYPE]

[ROUND DIAMOND TYPE]

1200
1210
1212
1214
1260
1262
node
TX1
TX2
TX3
TX4
TX11
RX1
RX2
RX11
TXG1
TXG2
TXG3
TXGn
RXG1
RXG2
RXG3
RXGn
1230
1240
1244
RX MUX
ADC
TX MUX
TOUCH CONTROLLER
PROCESSOR
MEMORY
1220
1242
1250
130

1300

ELECTRONIC DEVICE INCLUDING INTEGRATED TOUCH FINGERPRINT SENSOR, OPERATION METHOD THEREOF, AND RECORDING MEDIUM

CROSS-REFERENCE TO RELATED APPLICATION(S)

This application is a continuation application, claiming priority under § 365 (c), of an International application No. PCT/KR2024/008900, filed on Jun. 26, 2024, which is based on and claims the benefit of a Korean patent application number 10-2023-0082487, filed on Jun. 27, 2023, in the Korean Intellectual Property Office, and of a Korean patent application number 10-2023-0106235, filed on Aug. 14, 2023, in the Korean Intellectual Property Office, the disclosure of each of which is incorporated by reference herein in its entirety.

BACKGROUND

1. Field

The disclosure relates to an electronic device including an integrated touch fingerprint sensor, an operation method thereof, and a recording medium.

2. Description of Related Art

The term "electronic device" may refer to a device which performs a specified function according to an equipped program on a home appliance, an electronic scheduler, a portable multimedia player, a mobile communication terminal, a tablet personal computer (PC), a video/sound device, a desktop/laptop computer, or a navigation device for automobile.

The electronic device may include a touch sensor (e.g., a touch screen) for detecting a user's touch (e.g., finger touch). The electronic device may include a fingerprint sensor (e.g., an optical fingerprint sensor) for detecting a user's fingerprint. The electronic device may drive each of a touch sensor (e.g., a touch screen) and a fingerprint sensor (e.g., an optical fingerprint sensor).

The above information is presented as background information only to assist with an understanding of the disclosure. No determination has been made, and no assertion is made, as to whether any of the above might be applicable as prior art with regard to the disclosure.

DISCLOSURE OF INVENTION

A general electronic device may include each of a touch sensor for touch detection and a fingerprint sensor (e.g., an optical fingerprint sensor) for fingerprint detection. A touch sensing operation using a touch sensor and a fingerprint sensing operation using a fingerprint sensor may be performed separately. A fingerprint authentication function of the electronic device may be frequently performed when running an application, and may be essentially performed for the security of the electronic device and user authentication. Recently, a flexible electronic device including a flexible display (e.g., a rollable display) which can expand (or contract) its screen size has been developed.

As a screen of the flexible display (e.g., a rollable display) expands (or contracts), there may be a restriction on placing a fingerprint sensor in the flexible electronic device.

The fingerprint sensor may be fixedly disposed under the flexible display (e.g., a rollable display). In this case, for fingerprint authentication convenience of a user, it is necessary to be able to sense a fingerprint at a fixed location, but as the screen of the flexible display (e.g., a rollable display) expands (or contracts), a location of the fingerprint sensor may also be changed. As the screen of the flexible display (e.g., a rollable display) expands (or contracts), a location where a fingerprint is sensed has changed, which may cause inconvenience to the user. In addition, it is necessary to be able to sense a fingerprint across the entire area of the screen of the flexible display (e.g., a rollable display), but when the fingerprint sensor is fixedly disposed under the flexible display (e.g., a rollable display), there is a restriction in that a fingerprint may be sensed only in a specific part of the screen.

Aspects of the disclosure are to address at least the above-mentioned problems and/or disadvantages and to provide at least the advantages described below. Accordingly, an aspect of the disclosure is to provide an electronic device and an operation method thereof, the electronic device including an integrated touch fingerprint sensor capable of performing touch sensing and fingerprint sensing together by embedding a sensor (e.g., an integrated touch fingerprint sensor), in which a touch sensing function and a fingerprint sensing function are integrated, in a display (e.g., an in-cell touch manner).

Another aspect of the disclosure is to provide an electronic device and an operation method thereof, the electronic device including an integrated touch fingerprint sensor capable of displaying a user interface for fingerprint authentication at a preconfigured location regardless of screen expansion or screen contraction of a flexible display (e.g., a rollable display), and sensing a touch and a fingerprint at the preconfigured location.

Another aspect of the disclosure is to provide an electronic device and an operation method thereof, the electronic device including an integrated touch fingerprint sensor capable of sensing a fingerprint on the entire screen (e.g., the entire area of a display) of a flexible display (e.g., a rollable display).

Additional aspects will be set forth in part in the description which follows and, in part, will be apparent from the description, or may be learned by practice of the presented embodiments.

In accordance with an aspect of the disclosure, an electronic device is provided. The electronic device includes a display in which a plurality of pixels are arranged, a display driver integrated circuit (IC) configured to control an operation of the display, a touch fingerprint sensor disposed inside the display and including transmit (Tx) lines and receive (Rx) lines formed of a metal mesh, a touch fingerprint sensor IC configured to control an operation of the touch fingerprint sensor, one or more processors configured to control operations of the display driver IC and the touch fingerprint sensor IC, and memory operatively connected to the one or more processors, wherein the memory store one or more computer programs, and wherein the one or more computer programs include computer-executable instructions that, when executed by the one or more processors during a touch sensing operation, cause the electronic device to configure a plurality of Tx touch channels by grouping the Tx lines in a predetermined number of units, and supply a first Tx signal to the plurality of Tx touch channels, configure a plurality of Rx channels by grouping the Rx lines in a predetermined number of units, and receive a first Rx signal of each of the plurality of Rx channels, and detect a touch location, based on the first Rx signal of each of the plurality of Rx channels.

In accordance with another aspect of the disclosure, an electronic device is provided. The electronic device includes a display in which a plurality of pixels are arranged, a display driver integrated circuit (IC) configured to control an operation of the display, a touch fingerprint sensor disposed inside the display and including Tx lines and Rx lines formed of a metal mesh, a touch fingerprint sensor IC configured to control an operation of the touch fingerprint sensor, and one or more processors configured to control operations of the display driver IC and the touch fingerprint sensor IC, wherein the display includes the plurality of pixels, a light blocking layer defining areas of the plurality of pixels, and circuit wires configured to drive the plurality of pixels, wherein the plurality of pixels and the touch fingerprint sensor are arranged so as not to overlap in a vertical direction, and wherein the touch fingerprint sensor and the light blocking layer are arranged so to overlap in the vertical direction.

In accordance with another aspect of the disclosure, a method of operating an electronic device is provided. The method includes, during a touch sensing operation, configuring a plurality of Tx touch channels by grouping the Tx lines in a predetermined number of units, and supplying a first Tx signal to the plurality of Tx touch channels, configuring a plurality of Rx channels by grouping the Rx lines in a predetermined number of units, and detecting a touch location, based on the first Rx signal of each of the plurality of Rx channels.

One or more non-transitory computer-readable storage media storing one or more computer programs including computer-executable instructions that, when executed by the one or more processors, cause the electronic device to perform operations are provided. the operations include, during a touch sensing operation, configuring a plurality of Tx touch channels by grouping Tx lines arranged on a display of the electronic device in a predetermined number of units, supplying a first Tx signal to the plurality of Tx touch channels, configuring a plurality of Rx channels by grouping Rx lines arranged on the display in a predetermined number of units, receiving a first Rx signal of each of the plurality of Rx channels, detecting a touch location, based on the first Rx signal of each of the plurality of Rx channels and, during a fingerprint sensing operation, supplying a second Tx signal to each of local Tx lines corresponding to the touch location among all the Tx lines, receiving a second Rx signal of each of local Rx lines corresponding to the touch location among all the Rx lines, and generating a fingerprint image, based on the second Rx signal of each of the local Rx lines.

In an electronic device including an integrated touch fingerprint sensor and an operation method thereof according to various embodiments of the disclosure, touch sensing and fingerprint sensing is performed together by embedding a sensor (e.g., an integrated touch fingerprint sensor), in which a touch sensing function and a fingerprint sensing function are integrated, in a flexible display (e.g., a rollable display) (e.g., an in-cell touch manner).

In an electronic device including an integrated touch fingerprint sensor and an operation method thereof according to various embodiments of the disclosure, a user interface for fingerprint authentication is displayed at a preconfigured location regardless of screen expansion or screen contraction of a flexible display (e.g., a rollable display), and a fingerprint sensed at the preconfigured location.

In an electronic device including an integrated touch fingerprint sensor and an operation method thereof according to various embodiments of the disclosure, a touch and a fingerprint sensed on the entire screen (e.g., the entire area of a display) of a flexible display (e.g., a rollable display).

In an electronic device including an integrated touch fingerprint sensor and an operation method thereof according to various embodiments of the disclosure, a high-resolution fingerprint image is generated on the entire screen (e.g., the entire area of a display) of a flexible display (e.g., a rollable display), and a more intuitive and convenient user experience using enhanced security and the fluidity in a fingerprint recognition area is provided.

For example, in an electronic device including an integrated touch fingerprint sensor and an operation method thereof according to various embodiments of the disclosure, a touch fingerprint sensor is embedded in the inside of a flexible display (e.g., a rollable display) (or disposed in an upper portion of the display), and the touch fingerprint sensor is disposed so as to overlap a light blocking layer (e.g., a light absorption layer) (e.g., a black matrix), so that reflected light inside the flexible display (e.g., a rollable display) can be prevented from being reflected externally and deteriorating image quality.

Other aspects, advantageous, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 4 is a block diagram illustrating a configuration of an electronic device according to an embodiment of the disclosure;

It should be noted that throughout the drawings, the same reference numerals are used to depict identical or similar elements, features, and structures.

MODE FOR THE INVENTION

The following description with reference to the accompanying drawings is provided to assist in comprehensive understanding of an embodiment of the disclosure as defined by the claims and equivalents thereof. It includes various specific details to assist in the understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and the claims are not limited to the bibliographical meanings thereof, but are merely used by the inventors to enable clear and consistent understanding of the disclosure. Accordingly, it will be apparent to those skilled in the art that the following description of various embodiments of the disclosure is not intended to limit the disclosure as defined by the appended claims and equivalents thereof, but is provided merely for the purpose of illustration.

It is to be understood that the expressions in singular forms include plural referents unless the context clearly dictates otherwise. Therefore, for example, reference to "a component surface" includes reference to one or more such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
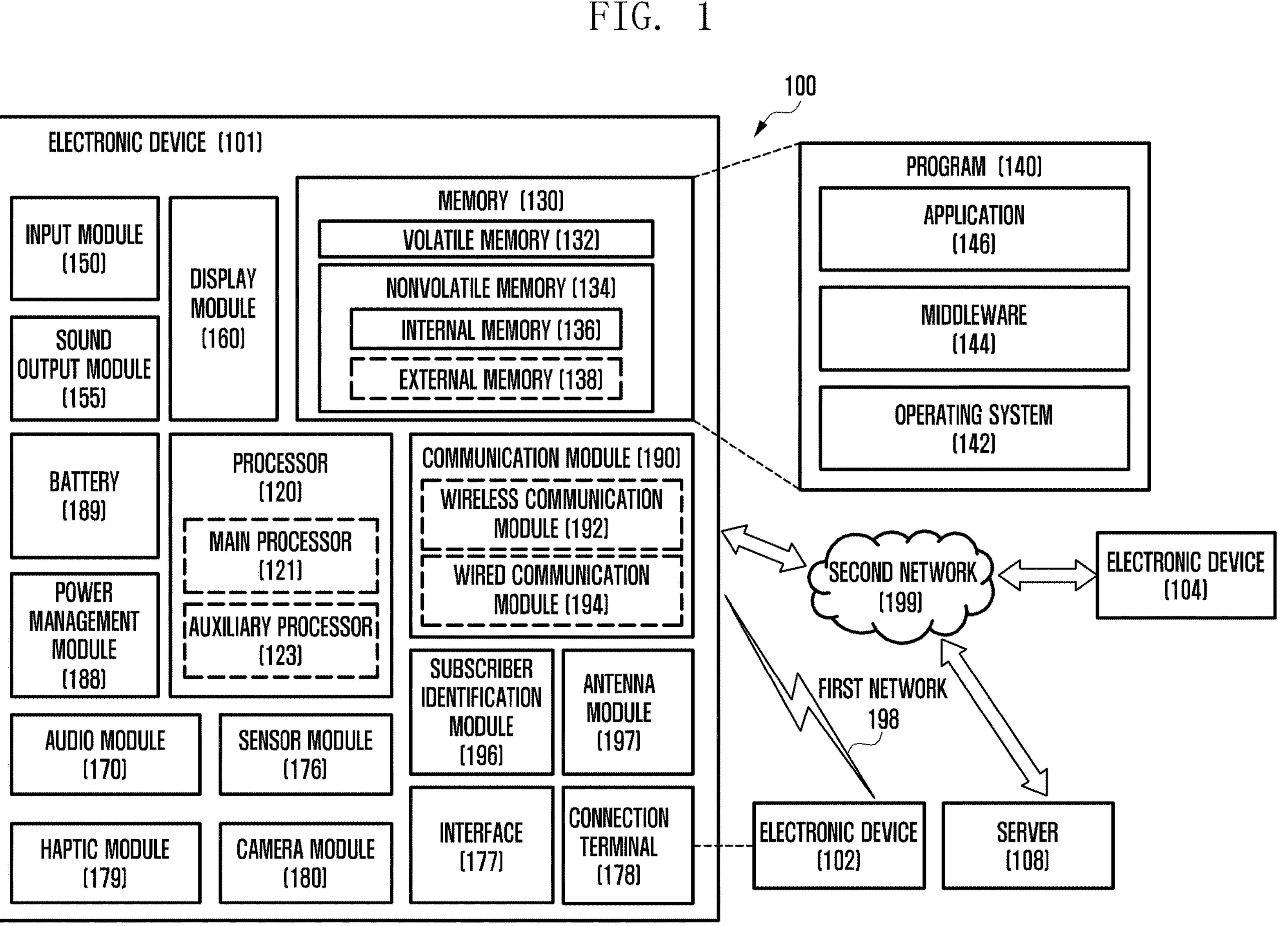
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to an embodiment, a display module 160 may include a flexible display configured to be foldable or unfoldable.

According to an embodiment, the display module 160 may include the flexible display which is disposed to be slidable (e.g., sliding in the x-axis direction and sliding in the y-axis direction of FIGS. 2A, 2B, 2C, and 2D) to provide a screen (e.g., a display screen).

According to an embodiment, the display module 160 may be referred to as a variable display (e.g., a stretchable display), an expandable display, or a slide-in/out display.

According to an embodiment, the display module 160 may include a bar type or plate type display.

According to an embodiment, the display module 160 may include a touch fingerprint circuit (e.g., an integrated touch fingerprint circuit) (e.g., a touch fingerprint circuit 450 of FIG. 4) for detecting a user's touch (e.g., finger touch) and fingerprint. A touch fingerprint circuit 450 (e.g., an integrated touch fingerprint circuit) may include an integrated touch fingerprint sensor (e.g., a touch fingerprint sensor 451 of FIG. 4) (e.g., a touch fingerprint sensor 620 of FIG. 6) (e.g., a touch fingerprint sensor 940 of FIG. 11), and a touch fingerprint sensor integrated circuit (IC) (e.g., a touch fingerprint sensor IC 453 of FIG. 4).

A touch fingerprint circuit (e.g., an integrated touch fingerprint circuit) (e.g., a touch fingerprint circuit 450 of FIG. 4) for detecting a user's touch (e.g., finger touch) and fingerprint may be included. The touch fingerprint circuit 450 (e.g., an integrated touch fingerprint circuit) may include an integrated touch fingerprint sensor (e.g., a touch fingerprint sensor 451 of FIG. 4) (e.g., a touch screen), and a touch fingerprint sensor integrated circuit (IC) (e.g., a touch fingerprint sensor IC 453 of FIG. 4).

Figure 2A:
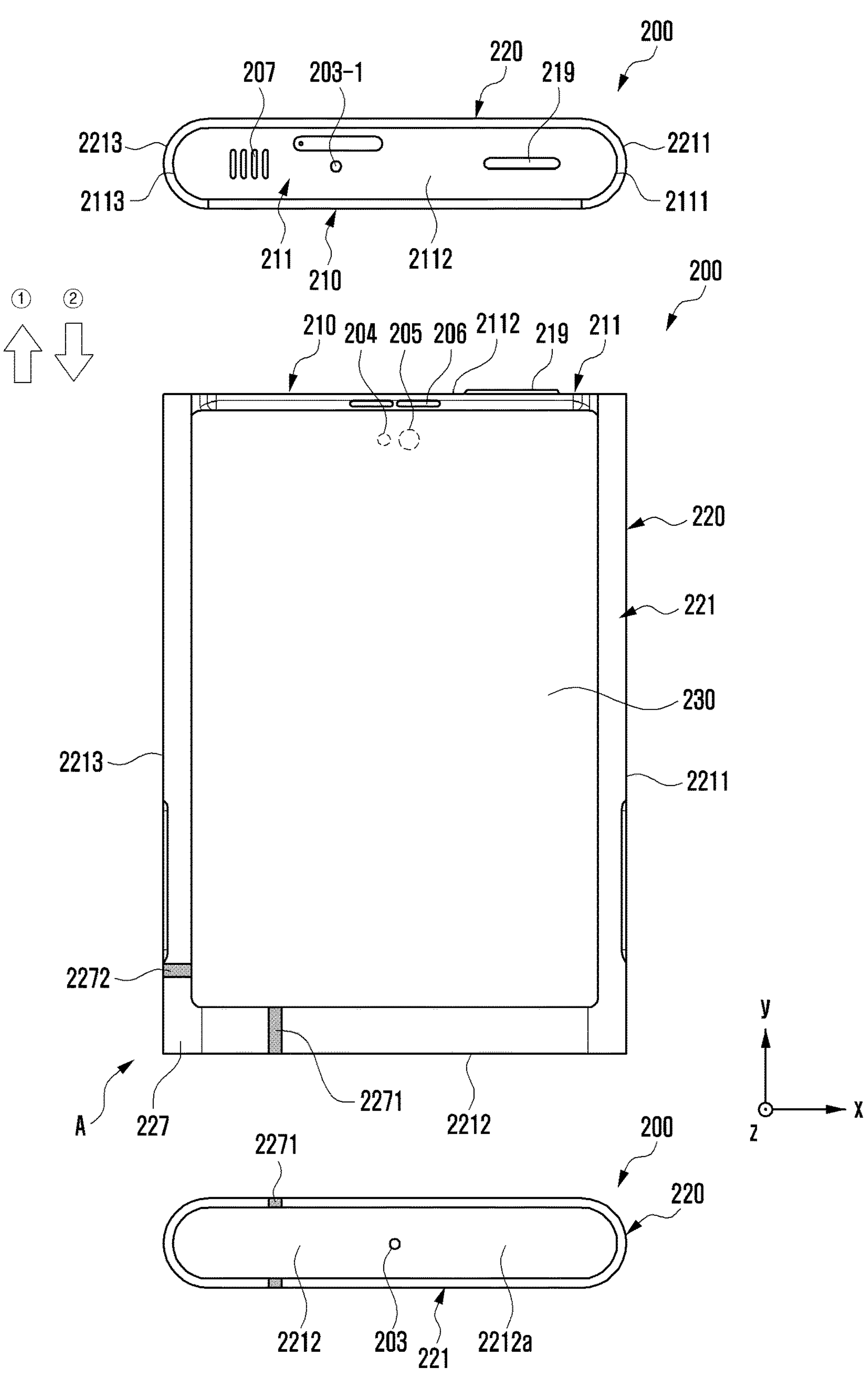
FIGS. 2A and 2B are diagrams illustrating a front surface and a rear surface of an electronic device in a slide-in state according to various embodiments of the disclosure.
Figure 2B:
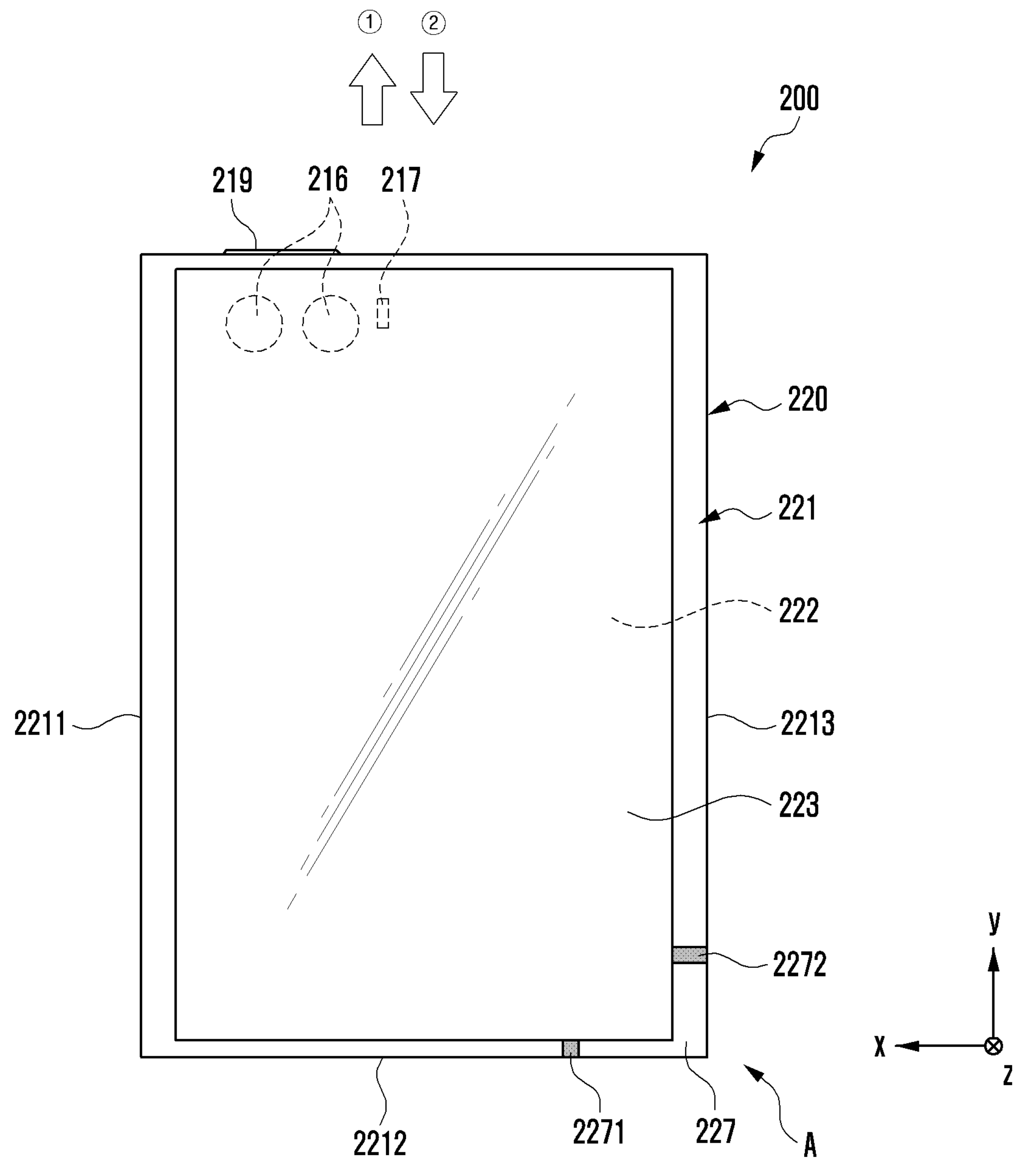
Figure 2C:
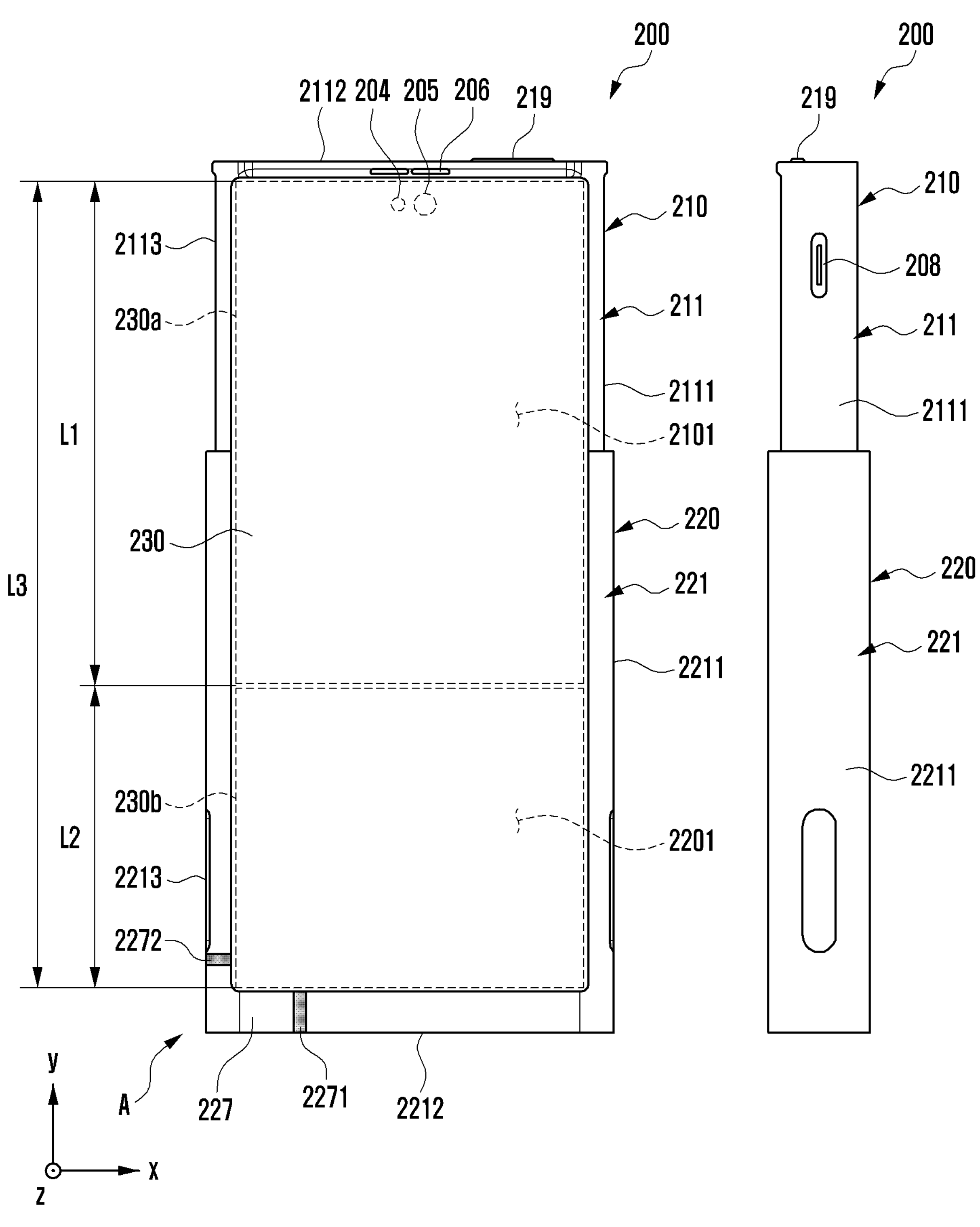
FIGS. 2C and 2D are diagrams illustrating a front surface and a rear surface of an electronic device in a slide-out state according to various embodiments of the disclosure.
Figure 2D:
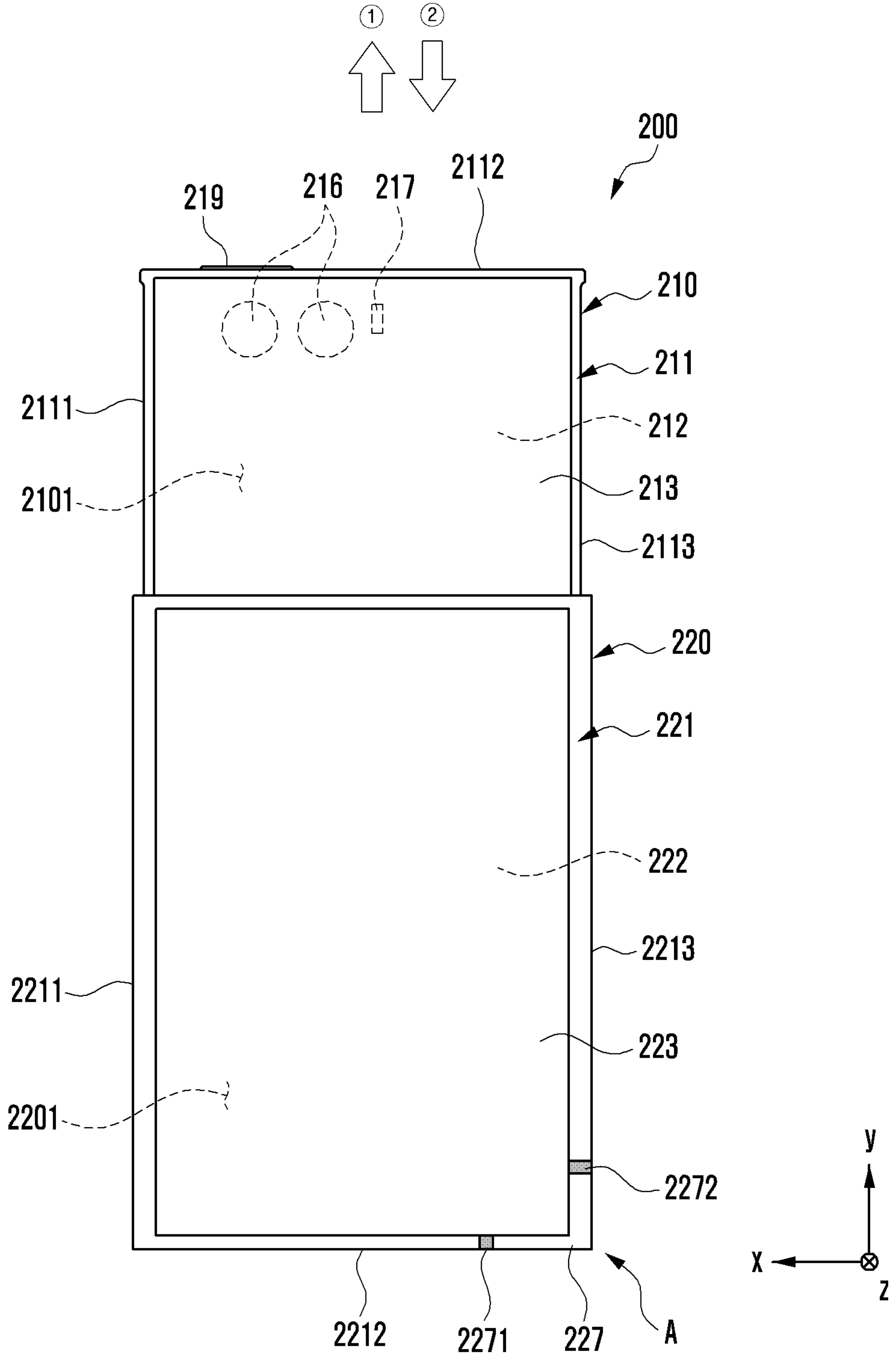

FIGS. 2A and 2B are diagrams illustrating a front surface and a rear surface of an electronic device in a slide-in state according to various embodiments of the disclosure. FIGS. 2C and 2D are diagrams illustrating a front surface and a rear surface of an electronic device in a slide-out state according to various embodiments of the disclosure.

Referring to FIGS. 2A to 2D, two housings 210 and 220 of an electronic device 200 according to an embodiment of the disclosure slides with respect to each other in a specified direction (e.g., direction ① or direction ②) (e.g., ±y-axis direction), so that a display area of a rollable display 230 (e.g., a flexible display) may be varied (e.g., expanded or contracted). The disclosure is not limited thereto, and the electronic device 200 may be configured so that the two housings 210 and 220 slide in a direction (e.g., ±x-axis direction) perpendicular to a specified direction (e.g., ±y-axis direction), and thus variation (e.g., expansion or contraction) of the display area of the rollable display 230 is induced.

According to an embodiment, the electronic device 200 may include a first housing 210 (e.g., a first housing structure, a moving part, or a slide housing), a second housing 220 (e.g., a second housing structure, a fixing part, or a base housing) slidably coupled to the first housing 210 in a specified direction (e.g., direction ① or direction ②) (e.g., ±y-axis direction), and a rollable display 230 (e.g., a flexible display) (e.g., an expandable display or a stretchable display) disposed to be supported by at least portions of the first housing 210 and the second housing 220.

According to an embodiment, the second housing 220 of the electronic device 200 of a user may be held. The electronic device 200 may be configured so that, with reference to the second housing 220 held by the user, the first housing 210 is slid out in a first direction (direction ①) (e.g., y-axis direction) or is slid in in a second direction (direction ②) (e.g., −y-axis direction) opposite to the first direction (direction ①).

According to an embodiment, at least a portion of the first housing 210 including a first space 2101 may be received in a second space 2201 of the second housing 220, so as to be changed to a slide-in state (e.g., a first state). For example, the at least the portion may be changed from a second state (e.g., a slide-out state) to a first state (e.g., a slide-in state).

According to an embodiment, at least a portion of the first housing 210 received in the second housing 220 may move to the outside of the second housing 220, so as to be changed to a slide-out state (e.g., a second state). For example, the at least the portion may be changed from a first state (e.g., a slide-in state) to a second state (e.g., a slide-out state).

According to an embodiment, the electronic device 200 may include a bendable member or bendable support member (e.g., a multi-joint hinge module or a multi-bar assembly) for forming at least partially the same plane as at least a portion of the first housing 210 in the slide-out state.

According to an embodiment, in the slide-in state of the electronic device 200, the bendable member or bendable support member (e.g., a multi-joint hinge module or a multi-bar assembly) may be at least partially received in the second space 2201 of the second housing 220.

According to an embodiment, at least a portion of the rollable display 230 may be received in the second space 2201 of the second housing 220 while being supported by the bendable member in the slide-in state, so as to be disposed to be invisible from the outside.

According to an embodiment, at least a portion of the rollable display 230 may be disposed to be visible from the outside while being supported by the bendable member which forms at least partially the same plane as the first housing 210 in the slide-out state.

According to various embodiments, the electronic device 200 may include the first housing 210 including a first lateral member 211, and the second housing 220 including a second lateral member 221.

According to an embodiment, the first lateral member 211 may include a first lateral surface 2111 having a first length along a first direction (e.g., y-axis direction), a second lateral surface 2112 extending from the first lateral surface 2111 along a substantially perpendicular direction (e.g., −x-axis direction) to have a second length shorter than the first length, and a third lateral surface 2113 extending from the second lateral surface 2112 to be substantially parallel to the first lateral surface 2111 and having the first length.

According to an embodiment, the first lateral member 211 may be at least partially formed of a conductive member (e.g., metal). For example, the first lateral member 211 may be configured by combining a conductive member and a non-conductive member (e.g., polymer).

According to an embodiment, the first housing 210 may include a first support member 212 extending from at least a portion of the first lateral member 211 to at least a portion of the first space 2101.

According to an embodiment, the first support member 212 may be configured integrally with the first lateral member 211. For example, the first support member 212 may be configured separately from the first lateral member 211 and may be structurally coupled to the first lateral member 211.

According to various embodiments, the second lateral member 221 may at least partially correspond to the first lateral surface 2111. The second lateral member 221 may include a fourth lateral surface 2211 having a third length, a fifth lateral surface 2212 extending from the fourth lateral surface 2211 in a direction substantially parallel to the second lateral surface 2112 and having a fourth length shorter than the third length, and a sixth lateral surface 2213 extending from the fifth lateral surface 2212 to correspond to the third lateral surface 2113 and having a third length.

According to an embodiment, the second lateral member 221 may be at least partially formed of a conductive member (e.g., metal). For example, the second lateral member 221 may be configured by combining a conductive member and a non-conductive member (e.g., polymer).

According to an embodiment, at least a portion of the second lateral member 221 may include a second support member 222 extending up to at least a portion of the second space 2201 of the second housing 220.

According to an embodiment, the second support member 222 may be configured integrally with the second lateral member 221. For example, the second support member 222 may be configured separately from the second lateral member 221 and may be structurally coupled to the second lateral member 221.

According to various embodiments, the first lateral surface 2111 and the fourth lateral surface 2211 may be slidably coupled to each other.

According to an embodiment, the third lateral surface 2113 and the sixth lateral surface 2213 may be slidably coupled to each other.

According to an embodiment, in the slide-in state, the first lateral surface 2111 may be disposed to be substantially invisible from the outside by overlapping with the fourth lateral surface 2211.

According to an embodiment, in the slide-in state, the third lateral surface 2113 may be disposed to be substantially invisible from the outside by overlapping with the sixth lateral surface 2213. For example, at least portions of the first lateral surface 2111 and the third lateral surface 2113 may be disposed to be at least partially visible from the outside in the slide-in state.

According to an embodiment, in the slide-in state, the first support member 212 may be disposed to be substantially invisible from the outside by overlapping with the second support member 222.

According to various embodiments, the first housing 210 may include a first rear cover 213 coupled to at least a portion of the first lateral member 211.

According to an embodiment, the first rear cover 213 may be disposed in a manner of being coupled to at least a portion of the first support member 212. For example, the first rear cover 213 may be configured integrally with the first lateral member 211.

According to an embodiment, the first rear cover 213 may be formed of a polymer, coated or colored glass, a ceramic, a metal (e.g., aluminum, stainless steel (STS), or magnesium), or a combination of at least two of these materials. For example, the first rear cover 213 may extend up to at least a portion of the first lateral member 211. For example, at least a portion of the first support member 212 may be replaced with the first rear cover 213.

According to various embodiments, the second housing 220 may include a second rear cover 223 coupled to at least a portion of the second lateral member 221.

According to an embodiment, the second rear cover 223 may be disposed in a manner of being coupled to at least a portion of the second support member 222. For example, the second rear cover 223 may be configured integrally with the second lateral member 221.

According to an embodiment, the second rear cover 223 may be formed of a polymer, coated or colored glass, a ceramic, a metal (e.g., aluminum, stainless steel (STS), or magnesium), or a combination of at least two of these materials. For example, the second rear cover 223 may extend up to at least a portion of the second lateral member 221. For example, at least a portion of the second support member 222 may be replaced with the second rear cover 223.

According to various embodiments, the rollable display 230 may be disposed to be supported by at least portions of the first housing 210 and the second housing 220.

According to an embodiment, the rollable display 230 may include a first portion **230*a* (e.g., a flat part) which is always visible from the outside and a second portion 230*b* (e.g., a bendable part) extending from the first portion 230*a*. The second portion 230*b* (e.g., a bendable part) may be at least partially received in the second space 2201 of the second housing 220** so as to be invisible from the outside in the slide-in state.

According to an embodiment, the first portion **230*a* may be disposed to be supported by the first housing 210. The second portion 230*b*** may be disposed to be at least partially supported by a bendable member.

According to an embodiment, the second portion **230*b* of the rollable display 230 may extend from the first portion 230*a* while being supported by the bendable member in a state in which the first housing 210 is slid out along the first direction (direction ①). In a state in which the first housing 210 is slid out along the first direction (direction ①), the second portion 230*b* of the rollable display 230 may form substantially the same plane as the first portion 230*a***, and be disposed so as to be visible from the outside.

According to an embodiment, in a state in which the first housing 210 is slid in along the second direction (direction ②), the second portion **230*b* of the rollable display 230 may be received in the second space 2201 of the second housing 220. The second portion 230*b* of the rollable display 230 may be disposed so as to be invisible from the outside in a state in which the first housing 210 is slid in along the second direction (direction ②). Therefore, in the electronic device 200, as the first housing 210 is moved in a sliding manner along a specified direction (e.g., ±y-axis direction) from the second housing 220, a display area of the rollable display 230** may be varied (e.g., expanded or contracted).

According to various embodiments, according to the sliding movement of the first housing 210 moving with reference to the second housing 220, the length of the rollable display 230 in the first direction (direction ①) may varied (e.g., expanded or contracted). For example, the rollable display 230 may have a first display area (e.g., an area corresponding to the first portion **230*a*) corresponding to a first length L1** in the slide-in state.

According to an embodiment, in the slide-out state of the rollable display 230, the first housing 210 may slidingly move as much as a second length L2 with reference to the second housing 220. In the slide-out state, the rollable display 230 may correspond to a third length L3 that is longer than the first length L1. In the slide-out state, the rollable display 230 may be expanded to have a third display area (e.g., an area including the first portion 230*a* and the second portion 230*b*) that is larger than the first display area.

According to an embodiment, in the slide-in state (e.g., a first state) of the electronic device 200, a screen size (e.g., a screen area) of the rollable display 230 visible to the outside may be minimized (e.g., substantially minimized).

According to an embodiment, in the slide-out state (e.g., a second state) of the electronic device 200, the screen size (e.g., a screen area) of the rollable display 230 visible to the outside may be maximized (e.g., substantially maximized).

According to an embodiment, in an intermediate state (e.g., a third state) of the electronic device 200, the screen size (e.g., a screen area) of the rollable display 230 visible to the outside may be smaller than that in the slide-out state (e.g., a second state) and larger than that in the slide-in state (e.g., a first state). For example, in the intermediate state (e.g., a third state) of the electronic device 200, the screen size (e.g., a screen area) of the rollable display 230 visible to the outside may be smaller than the maximum size (e.g., a maximum screen area) and larger than the minimum size (e.g., a minimum screen area).

According to various embodiments, the electronic device 200 may include at least one of a sound input device (e.g., a microphone 203-1) disposed in the first space 2101 of the first housing 210, a sound output device (e.g., a call receiver 206 or a speaker 207), sensor modules 204 and 217, a camera device (e.g., a first camera device 205 or a second camera device 216), a connector port 208, a key input device 219, or an indicator (not shown).

According to an embodiment, the electronic device 200 may include another sound input device (e.g., a microphone 203) disposed in the second housing 220. As another embodiment, the electronic device 200 may be configured so that at least one of the above-described components is omitted or other components are additionally included. As another embodiment, at least one of the above-described components may be disposed in the second space 2201 of the second housing 220.

According to various embodiments, the sound input device may include a microphone 203-1. In some embodiments, the sound input device (e.g., the microphone 203-1) may include a plurality of microphones arranged to detect the direction of sound. The sound output device may include, for example, a call receiver 206 and a speaker 207.

According to an embodiment, the speaker 207 may correspond to the outside through at least one speaker hole configured in the first housing 210 at a location (e.g., the second lateral surface 2112) which is always exposed to the outside, regardless of the slide-in/slide-out state.

According to an embodiment, the connector port 208 (e.g., a universal serial bus (USB) type C terminal) may correspond to the outside through a connector port hole configured in the first housing 210 in the slide-out state. For example, in the slide-in state, the connector port 208 may be disposed in the second housing and may correspond to the outside through an opening disposed to correspond to the connector port hole. For example, the call receiver 206 may include a speaker (e.g., a piezo speaker) which is operated without a separate speaker hole.

According to various embodiments, the sensor modules 204 and 217 may generate an electrical signal or data value corresponding to an internal operation state of the electronic device 200 or an external environmental state. For example, the sensor modules 204 and 217 may include a first sensor module 204 (e.g., a proximity sensor or an illuminance sensor) disposed on a front surface of the electronic device 200 and/or a second sensor module 217 (e.g., a heart rate monitoring (HRM) sensor) disposed on a rear surface of the electronic device 200.

According to an embodiment, the first sensor module 204 may be disposed under (e.g., a lower portion with reference to the z-axis direction) the rollable display 230 on the front surface of the electronic device 200.

According to an embodiment, the first sensor module 204 and/or the second sensor module 217 may include at least one of a proximity sensor, an illuminance sensor, a time of flight (TOF) sensor, an ultrasonic sensor, a gesture sensor, a gyro sensor, an air pressure sensor, a magnetic sensor, an acceleration sensor, a grip sensor, a color sensor, an infrared (IR) sensor, a biometric sensor, a temperature sensor, or a humidity sensor.

According to various embodiments, the camera module may include a first camera module 205 disposed on the front surface of the electronic device 200 and a second camera module 216 disposed on the rear surface of the electronic device 200.

According to an embodiment, the electronic device 200 may include a flash (not shown) located near the second camera module 216.

According to an embodiment, the camera modules 205 and 216 may include one or more lenses, an image sensor, and/or an image signal processor.

According to an embodiment, the first sensor module 204 may be disposed under (e.g., a lower portion with reference to the z-axis direction) the rollable display 230. The first camera module 205 may be disposed under (e.g., a lower portion with reference to the z-axis direction) the rollable display 230 and configured to photograph a subject through a portion of an active area (e.g., a display area) of the rollable display 230.

According to various embodiments, the first camera module 205 among the camera modules may be disposed to detect an external environment through the rollable display 230. The sensor module 204 among the sensor modules 204 and 217 may be disposed to detect an external environment through the rollable display 230. For example, the first camera module 205 or the sensor module 204 may be disposed in the first space 2101 of the first housing 210 to be able to be in contact with an external environment through a transmission area or a perforated opening configured in the rollable display 230.

According to an embodiment, an area facing the first camera module 205 of the rollable display 230 is a portion of the display area which displays content, and may be formed as a transmission area having a specified transmittance.

According to an embodiment, the transmission area of the rollable display 230 may be configured to have a transmissivity ranging from about 5% to about 20%. The transmission area may include an area overlapping with an effective area (e.g., field of view area) of the first camera module 205 through which light captured by an image sensor to generate an image passes. For example, the transmission area of the rollable display 230 may include an area having a lower pixel arrangement density and/or wiring density than the surrounding area. For example, the transmission area may replace the opening described above. For example, the camera module 205 may include an under display camera (UDC). In addition, the sensor module 204 may be disposed to perform its function without being visually exposed through the rollable display 230 in an internal space of the electronic device 200.

According to various embodiments, the electronic device 200 may include a bezel antenna A disposed through the conductive second lateral member 221 of the second housing 220. For example, the bezel antenna A may include a conductive portion 227 which is disposed in at least portions of the fifth lateral surface 2212 and the sixth lateral surface 2213 of the second lateral member 221, and electrically segmented through at least one segment part 2271 and 2272 formed of a non-conductive material (e.g., polymer).

According to an embodiment, a wireless communication circuit (e.g., the wireless communication module 192 of FIG. 1) may be configured to transmit or receive a wireless signal in at least one specified frequency band (e.g., about 600 MHz to 9000 MHZ) (e.g., a legacy band or an NR band) through the conductive portion 227.

According to an embodiment, the electronic device 200 may include a lateral cover 2212*a* disposed on the fifth lateral surface 2212 to cover at least a portion of the at least one segment 2271. For example, the bezel antenna A may be disposed on at least one lateral surface among the fourth lateral surface 2211, the fifth lateral surface 2212, and the sixth lateral surface 2213. For example, the bezel antenna A may be disposed on at least one lateral surface among the first lateral surface 2111, the second lateral surface 2112, and the third lateral surface 2113 of the first housing 210.

According to an embodiment, the electronic device 200 may further include at least one antenna module (e.g., a 5G antenna module or an antenna structure). For example, the at least one antenna module (e.g., a 5G antenna module or an antenna structure) may be disposed in an internal space (e.g., the first space 2101 or the second space 2201) of the electronic device 200. The at least one antenna module (e.g., a 5G antenna module or an antenna structure) may be disposed to transmit or receive a wireless signal in a frequency band ranging from about 3 GHz to 100 GHz through another wireless communication circuit (e.g., the wireless communication module 192 of FIG. 1).

According to various embodiments, a slide-in/slide-out operation of the electronic device 200 may be automatically performed. For example, the slide-in/slide-out operation of the electronic device 200 may be performed through coupling of a rack gear and a drive motor (e.g., a gear drive part) including a pinion gear. The rack gear may be disposed in the first space 2101 of the first housing 210. The drive motor (e.g., a gear drive part) including a pinion gear may be disposed in the second space 2201 of the second housing 220.

For example, when a triggering operation for changing from the slide-in state to the slide-out state is detected, a processor (e.g., the processor 120 of FIG. 1) of the electronic device 200 may operate the drive motor disposed inside the electronic device 200.

For example, when a triggering operation for changing from the slide-out state to the slide-in state is detected, the processor (e.g., the processor 120 of FIG. 1) of the electronic device 200 may operate the drive motor disposed inside the electronic device 200.

For example, a triggering operation of a state change (e.g., slide-in or slide-out state change) of the electronic device 200 may include selecting (e.g., touching) an object displayed on the rollable display 230 or manipulating a physical button (e.g., a key button) included in the electronic device 200.

According to various embodiments, the electronic device 200 may have the drive motor disposed at an end portion, in the second space 2201 of the second housing 220, in a slide-out direction (direction ①) closest to the first space 2101 of the first housing 210. The electronic device 200 may have an electrical connection structure which is electrically connected to a first substrate (e.g., a main substrate) disposed in the first space 2101 through an electrical connection member. Accordingly, it is possible to help improve the operational reliability of the electronic device 200 by minimizing the electrical connection structure between the drive motor and the first substrate (e.g., a main substrate) disposed in each of the different housings 210 and 220.

According to an embodiment, the electronic device 200 may include a touch fingerprint circuit (e.g., an integrated touch fingerprint circuit) (e.g., a touch fingerprint circuit 450 of FIG. 4) for detecting a user's touch (e.g., finger touch) and fingerprint. The touch fingerprint circuit 450 (e.g., an integrated touch fingerprint circuit) may include an integrated touch fingerprint sensor (e.g., a touch fingerprint sensor 451 of FIG. 4) (e.g., a touch fingerprint sensor 620 of FIG. 6) (e.g., a touch fingerprint sensor 940 of FIG. 11), and a touch fingerprint sensor integrated circuit (IC) (e.g., a touch fingerprint sensor IC 453 of FIG. 4).

According to an embodiment, the integrated touch fingerprint sensors 451, 620, and 940 according to an embodiment of the disclosure may be applied to the electronic device 200 (e.g., a rollable electronic device) shown in FIGS. 2A to 2D.

Figure 3A:
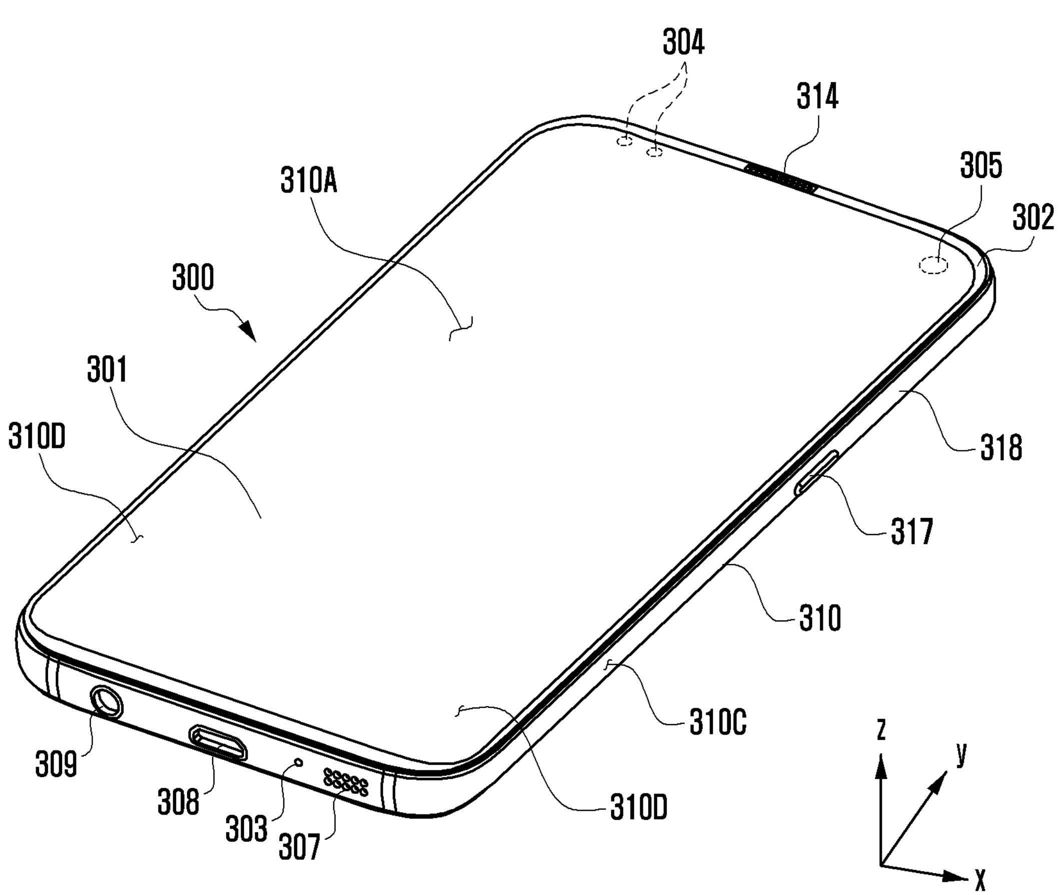
FIG. 3A is a perspective view of a first surface (e.g., a front surface) of an electronic device according to an embodiment of the disclosure.
Figure 3B:
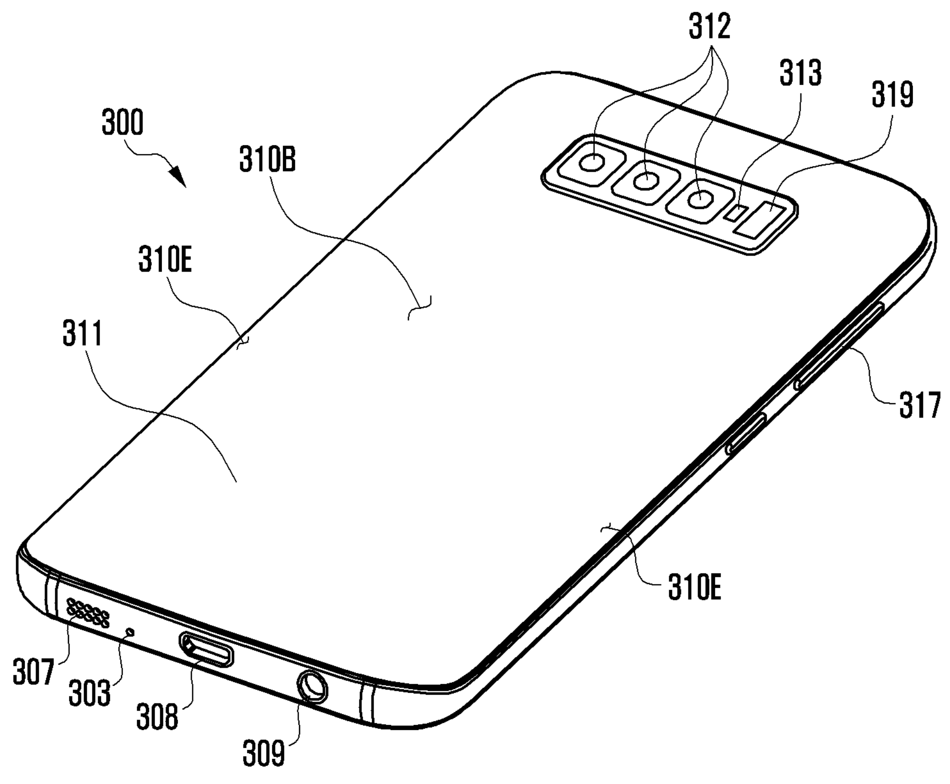
FIG. 3B is a perspective view of a second surface (e.g., a rear surface) of an electronic device according to an embodiment of the disclosure.

FIG. 3A is a perspective view of a first surface (e.g., a front surface) of an electronic device according to an embodiment of the disclosure. FIG. 3B is a perspective view of a second surface (e.g., a rear surface) of an electronic device according to an embodiment of the disclosure.

Referring to FIGS. 3A and 3B, an electronic device 300 (e.g., the electronic device 101 of FIG. 1) according to an embodiment of the disclosure may include a first surface (or front surface) 310A, a second surface (or rear surface) 310B, and a housing 310. The electronic device 300 (e.g., the electronic device 101 of FIG. 1) according to an embodiment of the disclosure may include a display 301.

According to an embodiment, the display 301 may be supported by the housing 310. For example, the display 301 may include a liquid crystal display (LCD) display, an organic light emitting diode (OLED) display, or a micro LED display.

According to an embodiment, the housing 310 may include a lateral surface 310C surrounding a space between the first surface 310A and the second surface 310B. According to an embodiment, the housing 310 may refer to a structure which forms portions of the first surface 310A, the second surface 310B, and the lateral surface 310C.

According to an embodiment, the first surface 310A may be configured by a front plate 302 (e.g., a glass plate or a polymer plate including various coating layers), at least a portion of which is substantially transparent.

According to an embodiment, the second surface 310B may be configured by a substantially opaque rear plate 311. The rear plate 311 may be formed of, for example, coated or colored glass, ceramic, a polymer, or a metal (e.g., aluminum, stainless steel (STS), or magnesium), or a combination of two or more of the above materials. However, the disclosure is not limited thereto, and the rear plate 311 may be formed of transparent glass.

According to an embodiment, the lateral surface 310C may be configured by a lateral bezel structure 318 (or a "lateral member") coupled to the front plate 302 and the rear plate 311 and including a metal and/or a polymer. According to an embodiment, the rear plate 311 and the lateral bezel structure 318 may be integrally configured and may include the same material (e.g., a metal material such as aluminum).

According to an embodiment, the front plate 302 may include two first areas 310D which are bent and seamlessly extend from the first surface 310A toward the rear plate 311. The two first areas 310D may be disposed at both ends of the long edge of the front plate 302.

According to an embodiment, the rear plate 311 may include two second areas 310E which are bent and seamlessly extend from the second surface 310B toward the front plate 302.

According to an embodiment, the front plate 302 (or the rear plate 311) may include only one of the first areas 310D (or the second areas 310E). According to an embodiment, a portion of the first areas 310D or the second areas 310E may not be included.

In embodiments, when viewed from a lateral surface of the electronic device 300, the lateral bezel structure 318 may have a first thickness (or width) on the lateral surface where the first areas 310D or the second areas 310E are not included. In embodiments, when viewed from a lateral surface of the electronic device 300, the lateral bezel structure 318 may have a second thickness (or width), which is thinner than the first thickness, on the lateral surface where the first areas 310D or the second areas 310E are included.

According to an embodiment, the electronic device 300 may include at least one of the display 301, a sound input device 303 (e.g., the input module 150 of FIG. 1 or a microphone), sound output devices 307 and 314 (e.g., the sound output module 155 of FIG. 1 or a speaker) (e.g., an audio module), sensor modules 304 and 319 (e.g., the sensor module 176 of FIG. 1), camera devices 305 and 312 (e.g., the camera module 180 of FIG. 1), a flash 313, a key input device 317, an indicator (not shown), and connectors 308 and 309.

According to an embodiment, the electronic device 300 may not include at least one (e.g., the key input device 317) of the components or may additionally include another component.

According to an embodiment, the display 301 may be visually visible through an upper portion of the front plate 302.

According to an embodiment, at least a portion of the display 301 may be visible through the front plate 302 forming the first areas 310D of the lateral surface 310C and the first surface 310A. The display 301 may be coupled to or disposed adjacent to a touch sensing circuit (e.g., a touch fingerprint sensing circuit) (e.g., an integrated touch fingerprint circuit), a pressure sensor capable of measuring the strength (pressure) of a touch, and/or a digitizer (e.g., a digitizer 460 of FIG. 4) which detects a magnetic field-type electronic pen (e.g., a stylus pen).

According to an embodiment, at least one of a first sensor module 304, the camera modules 305 and 312 (e.g., an image sensor), and the sound output device 314 (e.g., an audio module) may be included on a rear surface of a screen display area of the display 301.

According to an embodiment, the display 301 may be coupled to or disposed adjacent to a touch sensing circuit (e.g., a touch fingerprint sensing circuit) (e.g., an integrated touch fingerprint circuit), a pressure sensor capable of measuring the strength (pressure) of a touch, and/or a digitizer (e.g., a digitizer 460 of FIG. 4) which detects a magnetic field-type electronic pen (e.g., a stylus pen).

According to an embodiment, at least a portion of the sensor modules 304 and 319 and/or at least a portion of the key input device 317 may be disposed in the first areas 310D and/or the second areas 310E.

According to an embodiment, the sound input device 303 may include a microphone. According to an embodiment, the sound input device 303 may include a plurality of microphones arranged to detect the direction of sound.

According to an embodiment, the sound output devices 307 and 314 may include the sound output device 307 operating as an external speaker and the sound output device 314 operating as a call receiver.

In an embodiment, the sound input device 303 (e.g., a microphone), the sound output devices 307 and 314, and the connectors 308 and 309 may be disposed in an internal space of the electronic device 300. The sound input device 303 (e.g., a microphone), the sound output devices 307 and 314, and the connectors 308 and 309 may be exposed to an external environment through at least one hole disposed in the housing 310.

In an embodiment, the hole disposed in the housing 310 may be commonly used for the sound input device 303 (e.g., a microphone) and the sound output devices 307 and 314. In an embodiment, the sound output devices 307 and 314 may include a speaker (e.g., a piezo speaker) which operates while excluding the hole disposed in the housing 310.

According to an embodiment, the sensor modules 304 and 319 (e.g., the sensor module 176 of FIG. 1) may generate an electrical signal or data value corresponding to an internal operation state of the electronic device 300 or an external environmental state. The sensor modules 304 and 319 may include the first sensor module 304 (e.g., a proximity sensor) disposed on the first surface 310A of the housing 310 and/or a second sensor module 319 (e.g., an HRM sensor) disposed on the second surface 310B of the housing 310.

According to an embodiment, the sensor modules 304 and 319 (e.g., the sensor module 176 of FIG. 1) may include at least one of a gesture sensor, a grip sensor, a color sensor, an infrared (IR) sensor, an illuminance sensor, an ultrasonic sensor, an iris recognition sensor, or a distance detection sensor (e.g., a time of flight (TOF) sensor or a light detection and ranging (LiDAR) sensor).

According to an embodiment, a processor (e.g., the processor 120 of FIG. 1) of the electronic device 300 may operate the sensor modules 304 and 319 (e.g., the sensor module 176 of FIG. 1) to sense ambient illuminance and/or IR intensity of the electronic device 300. The processor 120 may obtain (e.g., receive) information on the IR intensity and information on the ambient illuminance of the electronic device 300. For example, the processor 120 may control an operation of a display driver IC (e.g., a display driver IC 430 (DDIC) of FIG. 4 (e.g., a display driver) so as to change (e.g., adjust or control) a color temperature of the display 301, based on the information on the IR intensity and the information on the ambient illuminance of the electronic device 300. The display driver IC 430 may change (e.g., adjust or control) the color temperature of the display 301, based on the control of the processor 120.

According to an embodiment, the processor (e.g., the processor 120 of FIG. 1) of the electronic device 300 may operate one or more camera modules 305 and 312 (e.g., an image sensor) to sense a color temperature value of the surroundings of the electronic device 300. The processor 120 may obtain (e.g., receive) a color temperature value of the surroundings of the electronic device 300. For example, the processor 120 may control an operation of the display driver IC 430 so as to change (e.g., adjust or control) a color temperature of the display 301, based on the color temperature value of the surroundings of the electronic device 300.

The display driver IC 430 may change (e.g., adjust or control) a color temperature of the display 301, based on the control of the processor 120.

According to an embodiment, the processor (e.g., the processor 120 of FIG. 1) of the electronic device 300 may operate the sensor modules 304 and 319 (e.g., the sensor module 176 of FIG. 1) to sense the type of lighting (or light source) of the surroundings of the electronic device 300. The processor 120 may obtain (e.g., receive) information on the type of lighting (or light source) of the surroundings of the electronic device 300. For example, the processor 120 may control an operation of the display driver IC 430 so as to change (e.g., adjust or control) a color temperature of the display 301, based on information on the lighting (or light source) of the surroundings of the electronic device 300. The display driver IC 430 may change (e.g., adjust or control) a color temperature of the display 301, based on the control of the processor 120.

According to an embodiment, the electronic device 300 may further include at least one of an air pressure sensor, a magnetic sensor (e.g., a 6-axis sensor or a geomagnetic sensor), an acceleration sensor, a biometric sensor, a temperature sensor, or a humidity sensor, which is not shown.

According to an embodiment, the camera modules 305 and 312 may include a first camera device 305 disposed on the first surface 310A of the electronic device 300, and a second camera device 312 disposed on the second surface 310B. The flash 313 may be disposed around the camera modules 305 and 312. The camera modules 305 and 312 may include one or more lenses, an image sensor, and/or an image signal processor. The flash 313 may include, for example, a light-emitting diode or a xenon lamp.

According to an embodiment, the first camera module 305 may be disposed under a display panel of the display 301 in an under display camera (UDC) manner. According to an embodiment, two or more lenses (wide-angle and telephoto lenses) and image sensors may be disposed on one surface of the electronic device 300. According to an embodiment, a plurality of first camera modules 305 may be disposed on the first surface (e.g., a surface on which a screen is displayed) of the electronic device 300 in the under display camera (UDC) manner.

According to an embodiment, the key input device 317 may be disposed on the lateral surface 310C of the housing 310. According to an embodiment, the electronic device 300 may not include a portion or all of the above-mentioned key input device 317, and a key input device 317, which is not included, may be implemented in another form, such as a soft key, on the display 301. According to an embodiment, the key input device 317 may be implemented using a pressure sensor included in the display 301.

According to an embodiment, the connector holes 308 and 309 may include a first connector hole 308 capable of receiving a connector (e.g., a USB connector) for transmitting or receiving power and/or data to or from an external electronic device, and/or a second connector hole 309 (e.g., an earphone jack) capable of receiving a connector for transmitting or receiving an audio signal to or from an external electronic device. The first connector hole 308 may include a universal serial bus (USB) type A or USB type C port. When the first connector hole 308 supports USB Type C, the electronic device 300 (e.g., the electronic device 101 of FIG. 1 or the electronic device 200 of FIG. 2A) may support USB power delivery (PD) charging.

According to an embodiment, the first camera module 305 among the camera modules 305 and 312 and/or the first sensor module 304 among the sensor modules 304 and 319 may be arranged to be visually visible through the display 301.

According to an embodiment, when the first camera module 305 is disposed in the under display camera (UDC) manner, the first camera module 305 may not be visually visible to the outside.

According to an embodiment, the first camera module 305 may be disposed to overlap a display area, and a screen may be displayed even in the display area corresponding to the first camera module 305. The first sensor module 304 may be disposed to perform its function without being visually exposed through the front plate 302 in an internal space of the electronic device 300.

According to an embodiment, the electronic device 300 may include a touch fingerprint circuit (e.g., an integrated touch fingerprint circuit) (e.g., a touch fingerprint circuit 450 of FIG. 4) for detecting a user's touch (e.g., finger touch) and fingerprint. The touch fingerprint circuit 450 (e.g., an integrated touch fingerprint circuit) may include an integrated touch fingerprint sensor (e.g., a touch fingerprint sensor 451 of FIG. 4) (e.g., a touch fingerprint sensor 620 of FIG. 6) (e.g., a touch fingerprint sensor 940 of FIG. 11), and a touch fingerprint sensor integrated circuit (IC) (e.g., a touch fingerprint sensor IC 453 of FIG. 4).

According to an embodiment, the integrated touch fingerprint sensors 451, 620, and 940 according to an embodiment of the disclosure may be applied to the electronic device 300 (e.g., a plate type electronic device) (e.g., a bar type electronic device) shown in FIGS. 3A and 3B.

Figure 4:
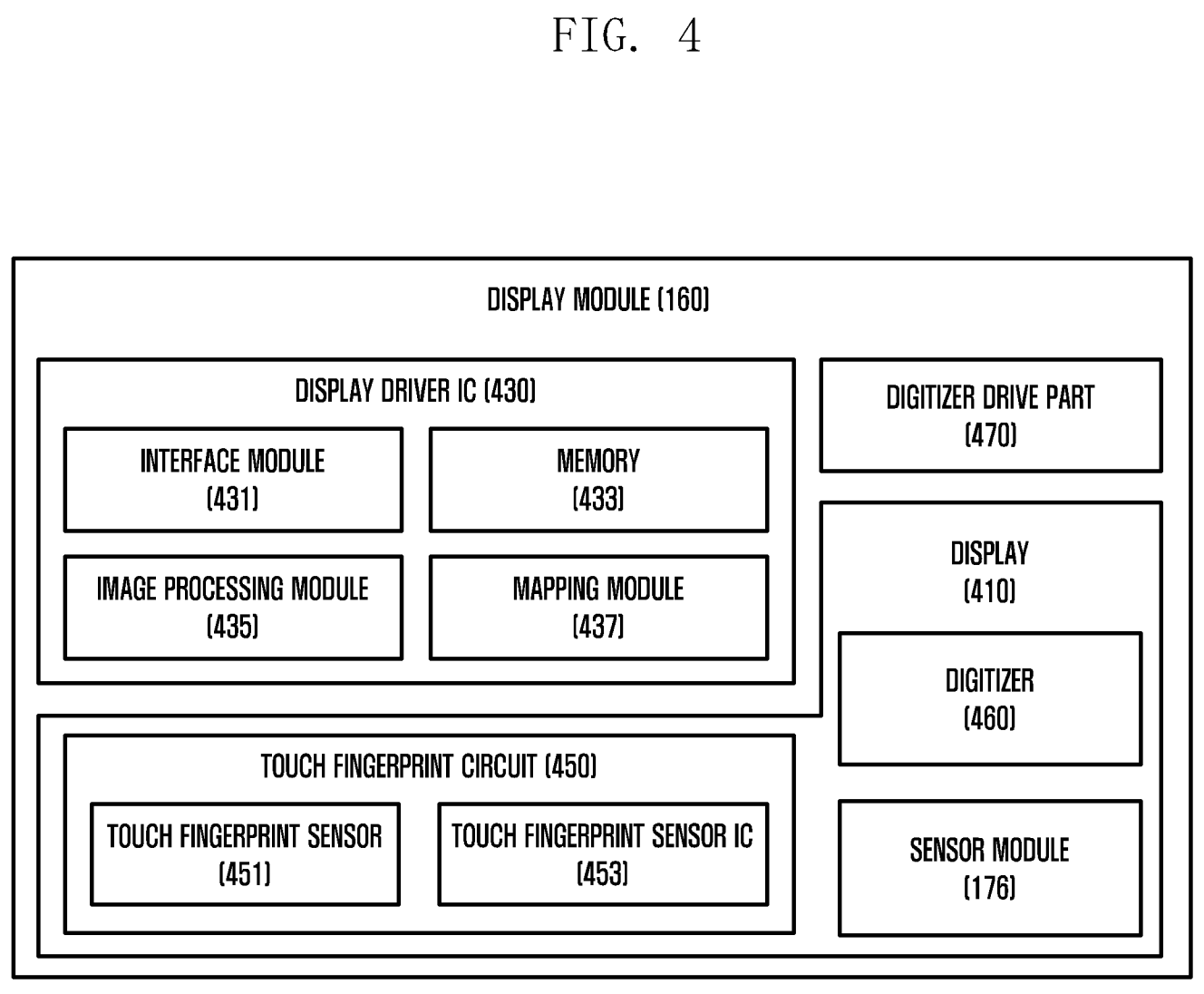
Figure 5:
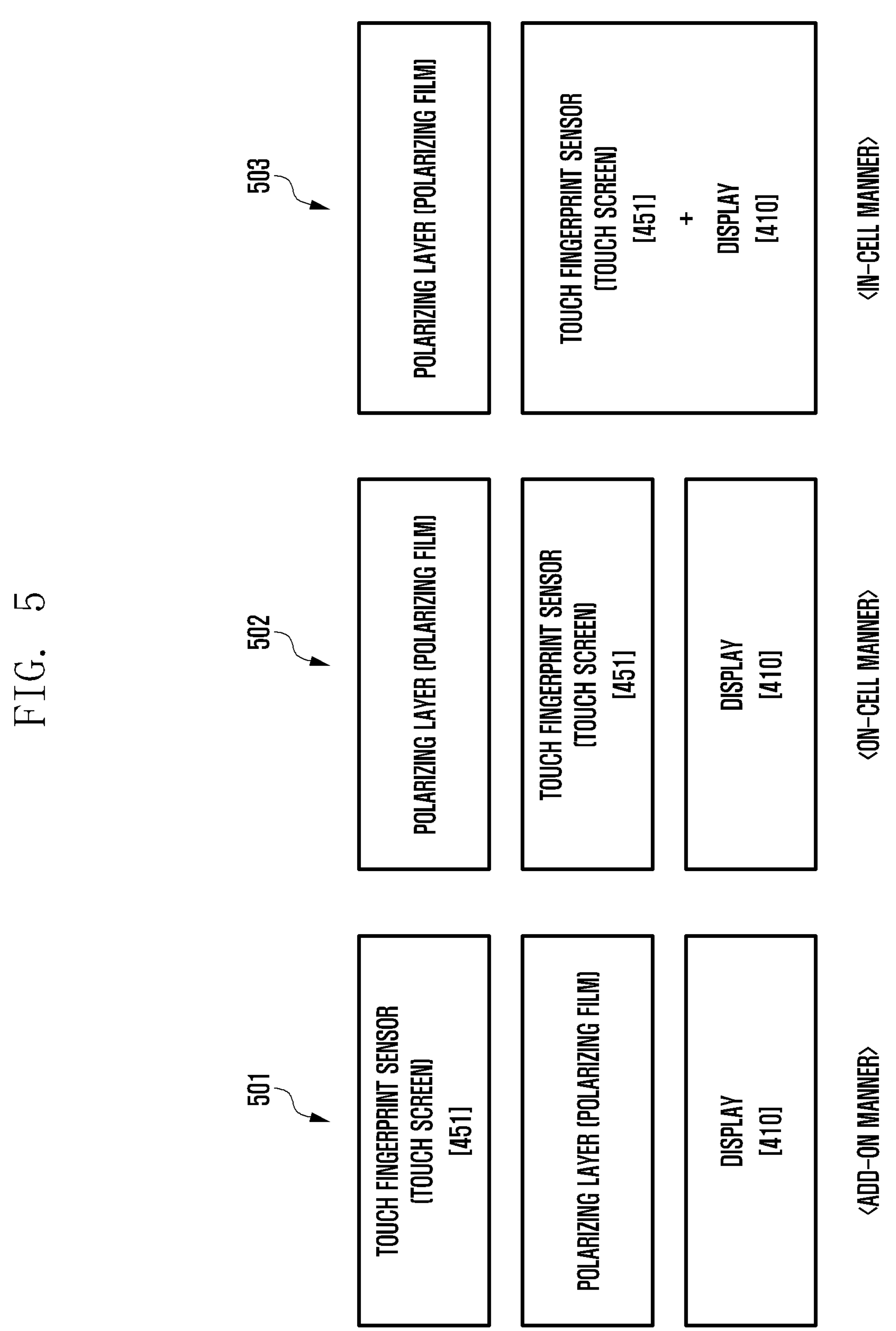
FIG. 5 is a diagram illustrating a form in which a touch screen (e.g., a touch sensor) is disposed on an electronic device according to an embodiment of the disclosure.

FIG. 4 is a block diagram illustrating a configuration of an electronic device according to an embodiment of the disclosure. FIG. 5 is a diagram illustrating a form in which a touch screen (e.g., a touch sensor) is disposed on an electronic device according to an embodiment of the disclosure.

Referring to FIGS. 4 and 5, the display module 160 (e.g., the display module 160 of FIG. 1) may include a display 410 (e.g., the first display 230 of FIG. 2A or the display 301 of FIG. 3A), a display driver IC (hereinafter referred to as "DDIC") 430 (e.g., a display drive part) for driving the display 410, a touch fingerprint circuit 450 for detecting a user's touch and fingerprint, a digitizer 460, and a digitizer drive part 470.

According to an embodiment, the DDIC 430 may include an interface module 431, memory 433 (e.g., a buffer memory), an image processing module 435, or a mapping module 437.

According to an embodiment, the DDIC 430 may receive image information including image data or an image control signal corresponding to a command for controlling the image data from another component of an electronic device (e.g., the electronic device 101 of FIG. 1, the electronic device 200 of FIGS. 2A to 2D, the electronic device 300 of FIGS. 3A and 3B, or an electronic device 1200 of FIG. 12) through the interface module 431.

Figure 12:
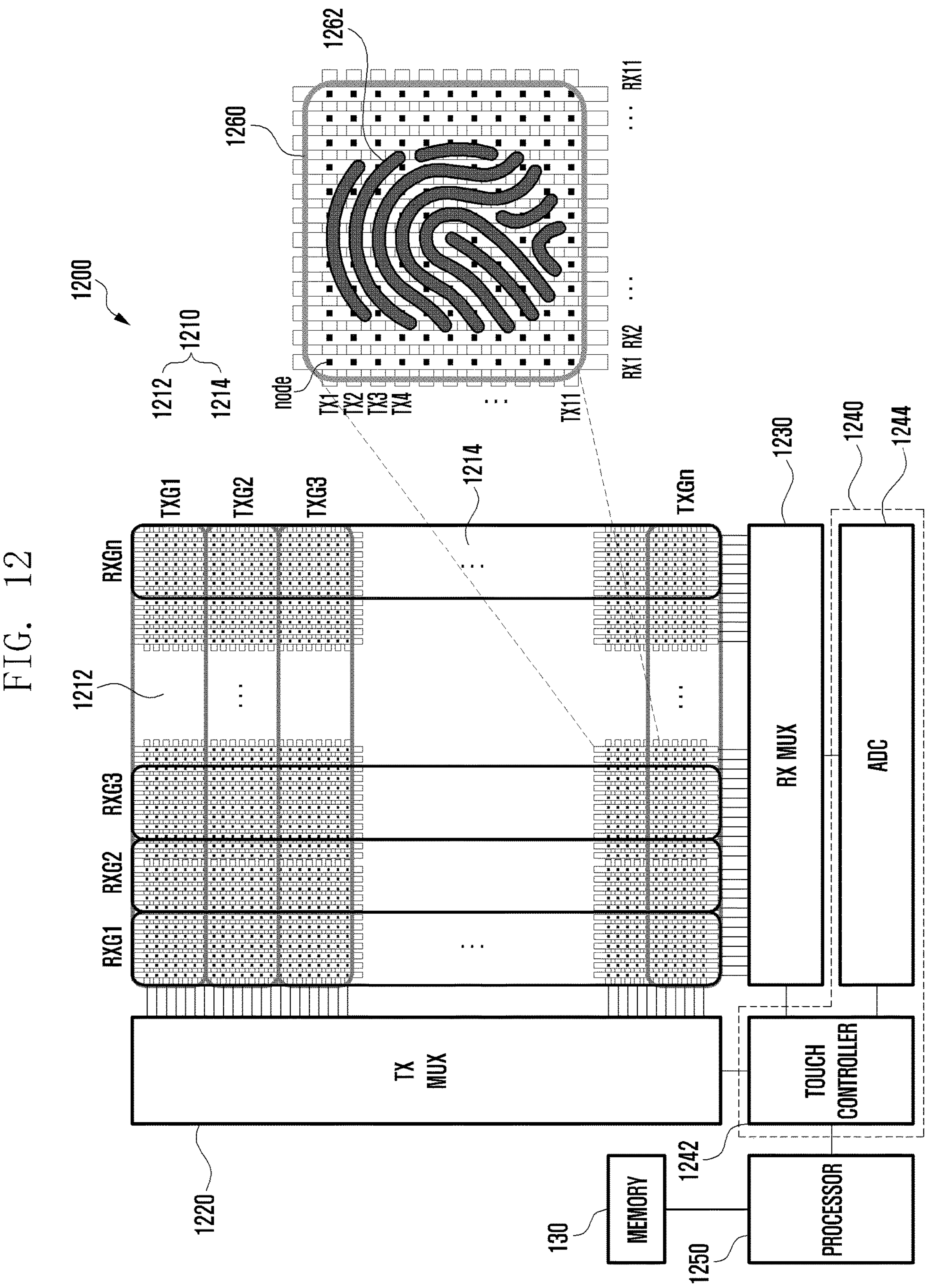
FIG. 12 is a diagram illustrating an electronic device including an integrated touch fingerprint sensor according to an embodiment of the disclosure.

According to an embodiment, the image information may be received from a processor (e.g., a processor 1250 of FIG. 12 (e.g., the processor 120 of FIG. 1)) (e.g., the main processor 121 of FIG. 1) (e.g., an application processor) or a coprocessor (e.g., the coprocessor 123 of FIG. 1) (e.g., a graphics processing device) which operates independently of a function of the main processor 121.

According to an embodiment, the DDIC 430 may communicate with the touch fingerprint circuit 450 or the sensor module 176 through the interface module 431. In addition, the DDIC 430 may store at least a piece of the received image information in the memory 433. As an example, the DDIC 430 may store at least a piece of the received image information in the memory 433 in units of frames.

According to an embodiment, the image processing module 435 may perform pre-processing or post-processing (e.g., resolution, brightness, or size adjustment) on at least a piece of the image data, based at least on the characteristics of the image data or the characteristics of the display 410.

According to an embodiment, the mapping module 437 may generate a voltage value or a current value corresponding to the image data pre-processed or post-processed through the image processing module 435. According to an embodiment, the generation of the voltage value or the current value may be performed, for example, based at least in part on properties (e.g., an array (a red green blue (RGB) stripe or PenTile structure) of pixels, or a size of each of subpixels) of pixels of the display 410.

According to an embodiment, for example, at least some pixels of the first display 410 are driven based at least in part on the voltage value or the current value, so that visual information (e.g., text, an image, or an icon) corresponding to the image data may be displayed through the display 410.

According to an embodiment, the touch fingerprint circuit 450 (e.g., an integrated touch fingerprint circuit) may include a touch fingerprint sensor 451 (e.g., a touch screen), and a touch fingerprint sensor integrated circuit (IC) 453.

According to an embodiment, the touch fingerprint circuit 450 may detect a touch input or a hovering input for a specific location of the display 410. The touch fingerprint sensor IC 453 may control the touch fingerprint sensor 451 (e.g., a touch screen) to detect a touch input or a hovering input. For example, the touch fingerprint sensor IC 453 may detect a touch input or a hovering input by measuring a change in a signal (e.g., a voltage, an amount of light, a resistance, or an amount of charge) with respect to a specific location of the display 410. The touch fingerprint sensor IC 453 may provide information (e.g., a location, an area, a pressure, or a time) on the detected touch input or hovering input to a processor (e.g., the processor 120 of FIG. 1 or a processor 1250 of FIG. 12) (e.g., transmit or deliver the information to the processor 120 or 1250).

According to an embodiment, the touch fingerprint sensor 451 (e.g., a touch screen) may be applied to an add-on manner 501 in which the touch fingerprint sensor 451 is separately manufactured and separately disposed above (e.g., top) the display 410.

According to an embodiment, the touch fingerprint sensor 451 (e.g., a touch screen) may be applied to an on-cell manner 502 in which the touch fingerprint sensor 451 is disposed on the display 410.

According to an embodiment, the touch fingerprint sensor 451 (e.g., a touch screen) may be applied to an in-cell manner 503 in which the touch fingerprint sensor 451 is disposed together with the pixels of the display 410.

According to an embodiment, at least a portion (e.g., the touch fingerprint sensor IC 453) of the touch fingerprint circuit 450 may be included as a portion of the DDIC 430 or the display 410.

According to an embodiment, at least a portion (e.g., the touch fingerprint sensor IC 453) of the touch fingerprint circuit 450 may be included as a portion of another component (e.g., the coprocessor 123) disposed outside the display module 160.

According to an embodiment, the display module 160 may further include at least one sensor (e.g., a fingerprint sensor, an iris sensor, a pressure sensor, or an illumination sensor) of the sensor module 176, or a control circuit therefor. In this case, the at least one sensor or the control circuit therefor may be embedded in a portion of the display module 160 (e.g., the display 410 or the DDIC 430) or a portion of the touch fingerprint circuit 450.

For example, when the sensor module 176 embedded in the display module 160 includes a pressure sensor, the pressure sensor may obtain (e.g., receive) pressure information associated with a touch input through a portion or the entire area of the display 410.

According to an embodiment, the touch fingerprint sensor 451 or the sensor module 176 may be disposed between pixels of a pixel layer of the display 410, or above or below the pixel layer.

According to an embodiment, the display module 160 may include the digitizer 460 for detecting an input (e.g., a touch input or a hovering input) of an electronic pen (e.g., a stylus pen). For example, the digitizer 460 may convert analog coordinates (e.g., a location) of an electronic pen (e.g., a stylus pen) into digital coordinate data. The digitizer 460 may deliver the digital coordinate data to a processor (e.g., the processor 120 of FIG. 1) and/or the DDIC 430.

According to an embodiment, the processor 120 or 1250 may obtain (e.g., receive) the digital coordinate data input from the digitizer 460. The processor 120 or 1250 may detect an input (e.g., a touch input or a hovering input) through an electronic pen (e.g., a stylus pen) based on the digital coordinate data. For example, the digitizer 460 may include a plurality of x-axis channels and a plurality of y-axis channels. The processor 120 or 1250 may sense a location of an electronic pen (e.g., a stylus pen) by using sensing signals (e.g., electro magnetic resonance (EMR) signals) received from the x-axis channels and y-axis channels arranged in the digitizer 460. For example, the plurality of x-axis channels and the plurality of y-axis channels may be sequentially arranged in the digitizer 460, and the processor 120 or 1250 may sense a location of an electronic pen (e.g., a stylus pen) by using sensing signals received from a plurality of consecutive channels (e.g., three adjacent channels).

According to an embodiment, the digitizer 460 may be invisible from the outside due to the display 410, electronic components, and appliances.

For example, the digitizer 460 may be disposed integrally with the flat-plate type display 410 or may be disposed adjacent to the flat-plate type display 410. For example, when the digitizer 460 is applied to the flat-plate type display 410, the digitizer 460 may include one electro magnetic resonance (EMR) sheet (or EMR film). The plurality of x-axis channels and the plurality of y-axis channels for detecting a location of an electronic pen may be arranged on one EMR sheet.

For example, the digitizer 460 may be disposed integrally with a flexible display (e.g., a rollable display or a foldable display) or may be disposed adjacent to the flexible display. For example, the digitizer 460 may be disposed in a lower portion (e.g., bottom) of the display 410 (e.g., the first display 230 of FIG. 2A) in the z-axis direction (e.g., the z-axis direction in FIG. 2A or the z-axis direction in FIG. 3A).

For example, the digitizer 460 may be disposed in a lower portion (e.g., bottom) of a bar-type display (e.g., the display 301 of FIG. 3A).

Figure 6:
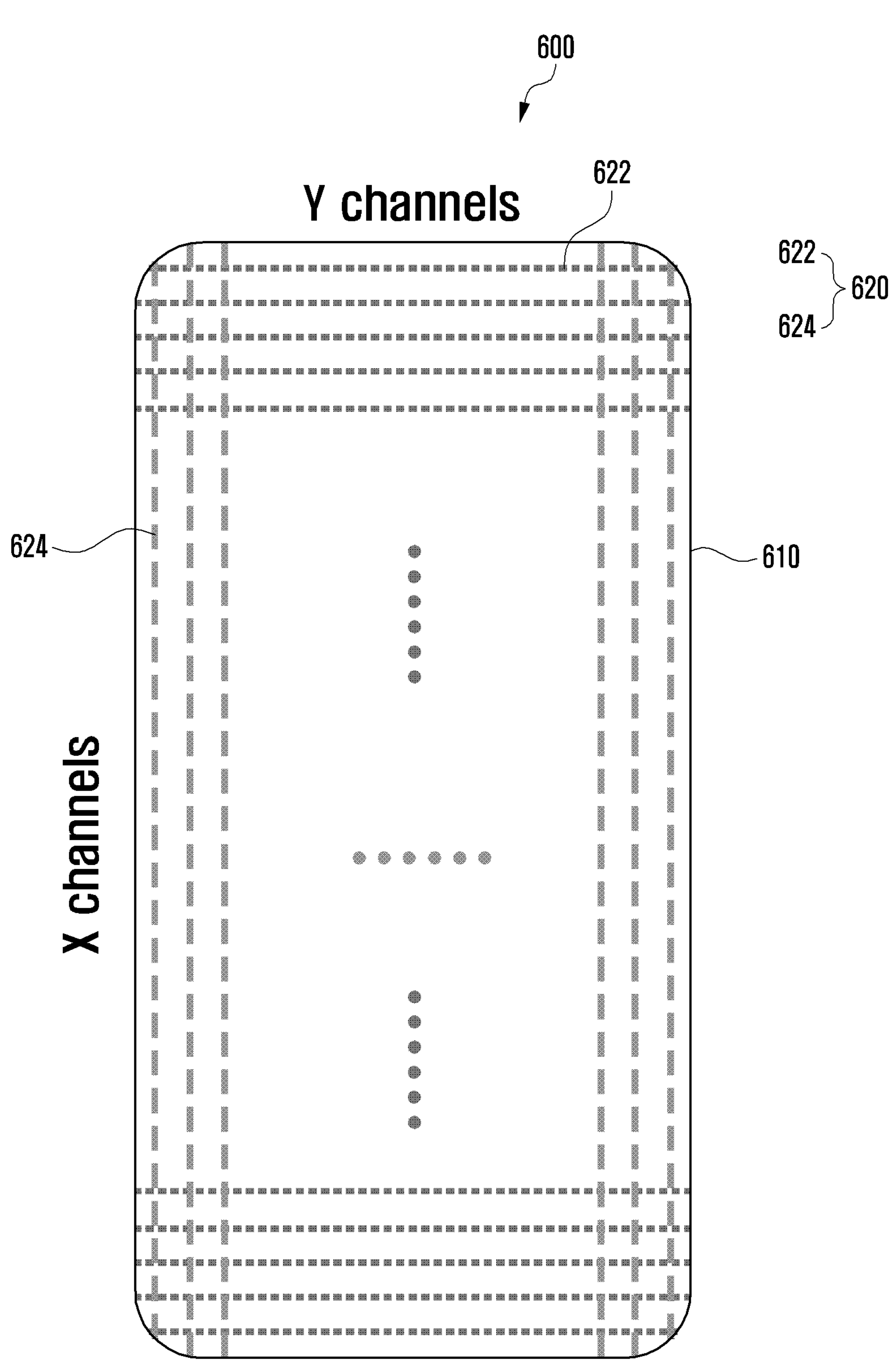
FIG. 6 is a diagram illustrating x channels and y channels of a touch fingerprint sensor disposed on a display according to an embodiment of the disclosure.
Figure 7:
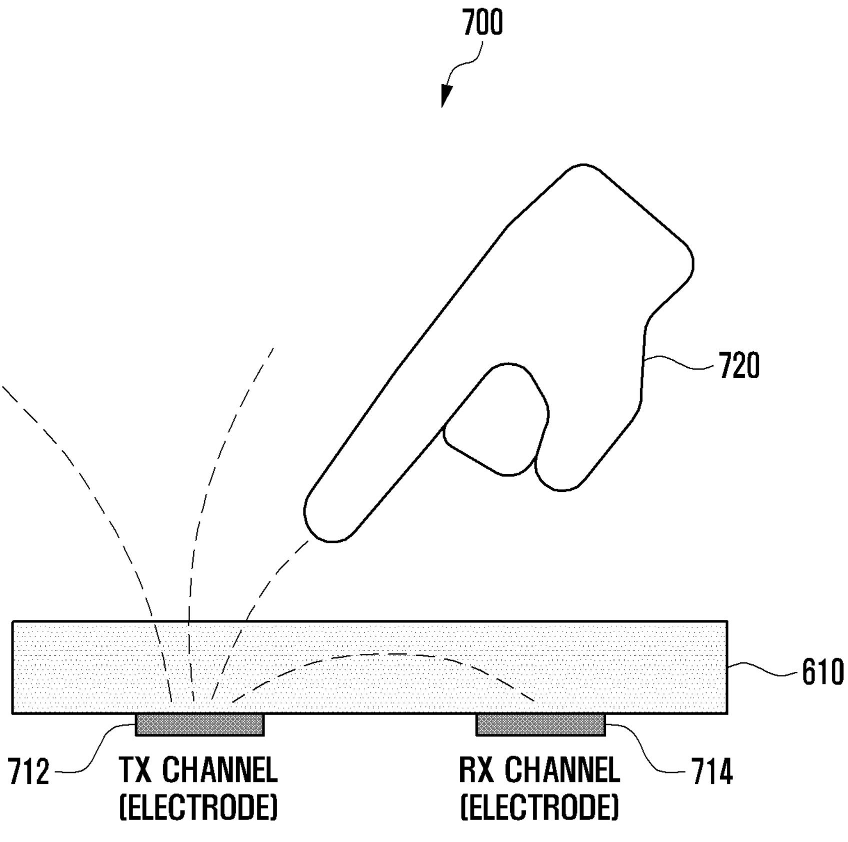
FIG. 7 is a diagram illustrating detection of a user's touch by using a capacitive manner according to an embodiment of the disclosure.

FIG. 6 is a diagram 600 illustrating x channels and y channels of a touch fingerprint sensor disposed on a display according to an embodiment of the disclosure. FIG. 7 is a diagram 700 illustrating detection of a user's touch by using a capacitive manner according to an embodiment of the disclosure.

Referring to FIGS. 6 and 7, a display 610 (e.g., a rollable display or a flexible display) (e.g., a display 900 of FIG. 9, a display 900 of FIG. 10, a display 900 of FIG. 11, or a display 900 of FIG. 12) according to an embodiment of the disclosure may include a touch fingerprint sensor 620 (e.g., the touch fingerprint sensor 451 of FIG. 4) (e.g., an integrated touch fingerprint sensor).

According to an embodiment, the touch fingerprint sensor 620 may include first metal mesh lines 622 (e.g., first metal mesh lines 942 of FIGS. 10 and 11) (e.g., first conductive mesh lines) (e.g., first mesh touch lines) (e.g., Tx metal mesh lines) (e.g., a Tx metal mesh pattern), and second metal mesh lines 624 (e.g., second metal mesh lines 944 of FIGS. 10 and 11) (e.g., second conductive mesh lines) (e.g., second mesh touch lines) (e.g., Rx metal mesh lines) (e.g., an Rx metal mesh pattern).

For example, the first metal mesh lines 622 may be formed in a mesh-shaped metal pattern (e.g., a metal mesh pattern 941 of FIG. 10) (e.g., a mesh-shaped metal line).

For example, the second metal mesh lines 624 may be formed in a mesh-shaped metal pattern (e.g., a metal mesh pattern 941 of FIG. 10) (e.g., a mesh-shaped metal line).

For example, the width of each of the first metal mesh lines 622 and the second metal mesh lines 624 may be several μm. A gap between the first metal mesh lines 622 may be tens of μm. A gap between the second metal mesh lines 624 may be tens of μm. All of the first metal mesh lines 622 and the second metal mesh lines 624 may be formed in a metal mesh pattern 941 (e.g., a mesh-shaped metal line).

According to an embodiment, the first metal mesh lines 622 (e.g., Tx metal mesh lines) may be used as Tx lines (e.g., Tx touch fingerprint sensing lines) for touch sensing and fingerprint sensing.

According to an embodiment, the second metal mesh lines 624 (e.g., Rx metal mesh lines) may be used as Rx lines (e.g., Rx touch fingerprint sensing lines) for touch sensing and fingerprint sensing.

For example, first channels 712 (e.g., y channels) (e.g., Tx channels) may be configured by each of the first metal mesh lines 622. That is, one first channel 712 (e.g., a y channel) (e.g., a Tx channel) may be configured by one first metal mesh line 622.

For example, each of the first channels 712 (e.g., y channels) (e.g., Tx channels) may be configured by grouping (e.g., electrically binding) a predetermined number (e.g., two or more) of the first metal mesh lines 622.

For example, second channels 714 (e.g., x channels) (e.g., Rx channels) may be configured by each of the second metal mesh lines 624. That is, one second channel 714 (e.g., an x channel) (e.g., an Rx channel) may be configured by one second metal mesh line 624.

For example, each of the second channels 714 (e.g., x channels) (e.g., Rx channels) may be configured by grouping (e.g., electrically binding) a predetermined number (e.g., two or more) of the second metal mesh lines 624.

For example, when a user's finger 720 approaches the display 610 (e.g., a rollable display or a flexible display) (or touches the display 610), capacitance formed between the first channel 712 (e.g., a y channel) (e.g., a Tx channel) and the second channel 714 (e.g., an x channel) (e.g., an Rx channel) may be changed. A change in the capacitance formed between the first channel 712 (e.g., a y channel) (e.g., a Tx channel) and the second channel 714 (e.g., an x channel) (e.g., an Rx channel) may be detected by using a touch fingerprint sensor IC (e.g., the touch fingerprint sensor IC 453 of FIG. 4).

For example, the touch fingerprint sensor IC (e.g., the touch fingerprint sensor IC 453 of FIG. 4) may generate a touch value, based on the capacitance formed between the first channel 712 (e.g., a y channel) (e.g., a Tx channel) and the second channel 714 (e.g., an x channel) (e.g., an Rx channel). The touch fingerprint sensor IC (e.g., the touch fingerprint sensor IC 453 of FIG. 4) may provide a touch value to a processor (e.g., the processor 120 of FIG. 1 or a processor 1250 of FIG. 12). The processor 120 or 1250 may detect a touch location (a location where a touch is made on a display screen), based on the obtained touch value.

Figure 8A:
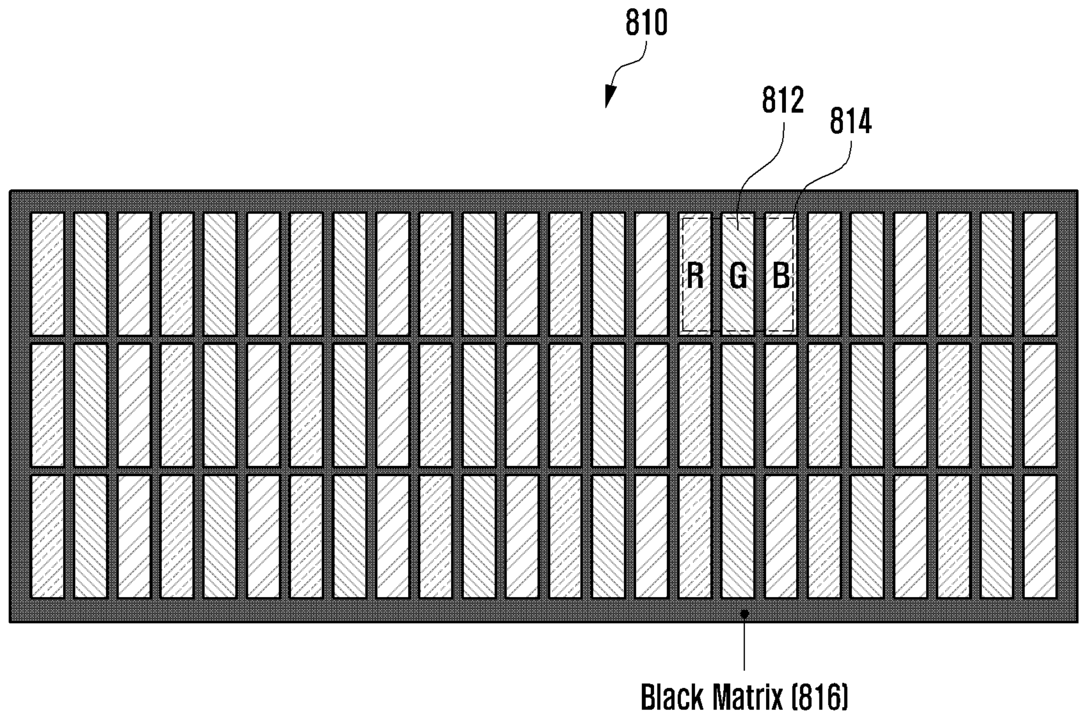
FIG. 8A is a diagram illustrating a display in which subpixels are arranged in a stripe type according to an embodiment of the disclosure.

FIG. 8A is a diagram illustrating a display in which subpixels are arranged in a stripe type according to an embodiment of the disclosure.

Figure 8B:
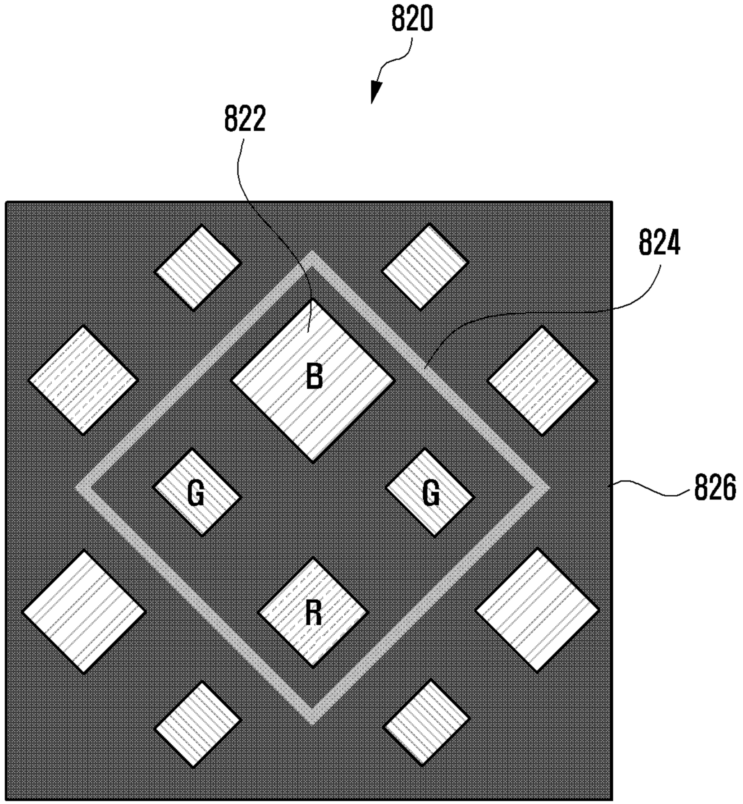
FIG. 8B is a diagram illustrating a display in which subpixels are arranged in a diamond type according to an embodiment of the disclosure.

FIG. 8B is a diagram illustrating a display in which subpixels are arranged in a diamond type according to an embodiment of the disclosure.

Figure 8C:
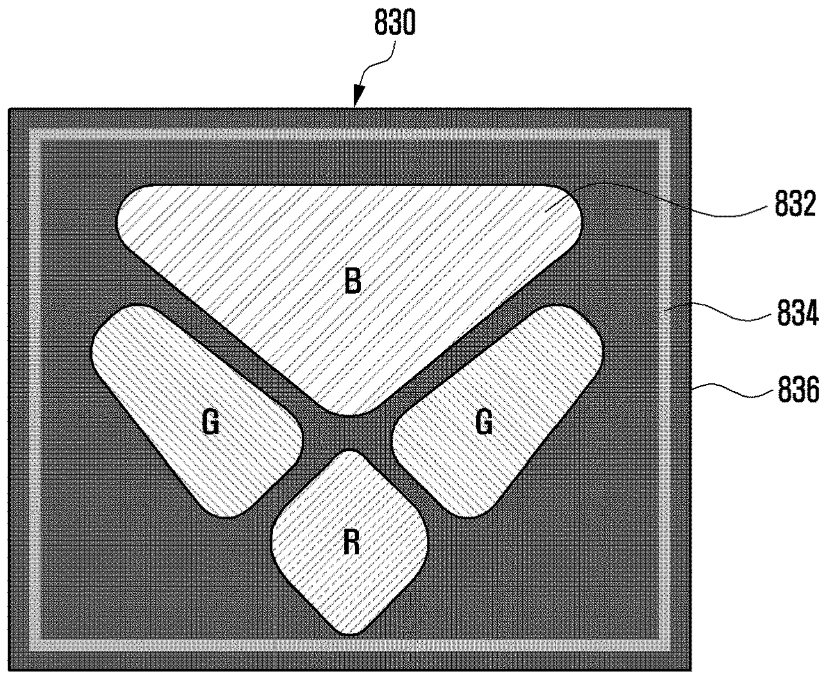
FIG. 8C is a diagram illustrating a display in which subpixels are arranged in a round diamond type according to an embodiment of the disclosure.
Figure 8C:
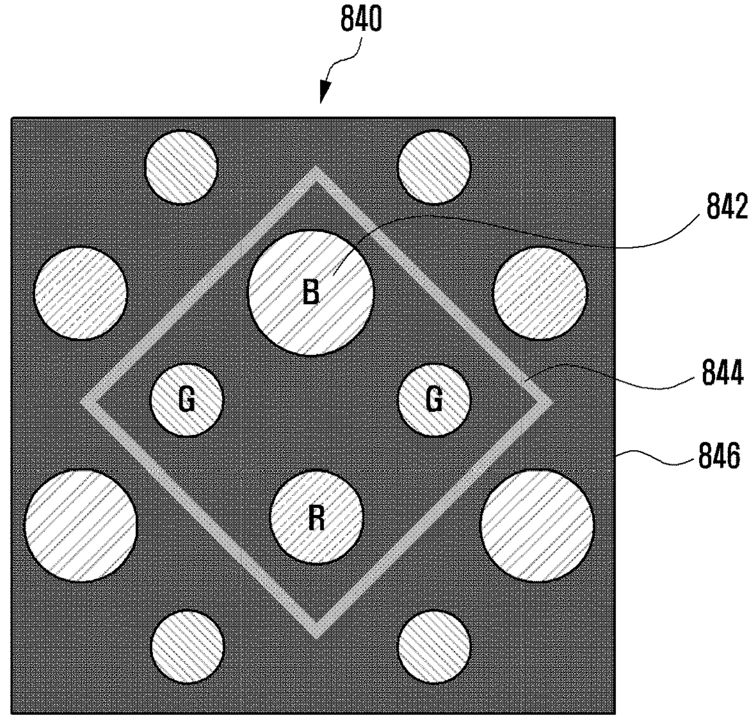

FIG. 8C is a diagram illustrating a display in which subpixels are arranged in a round diamond type according to an embodiment of the disclosure.

Referring to FIG. 8A, a display 810 (e.g., the display 610 of FIGS. 6 and 7 or a display 900 of FIGS. 9 and 10) (e.g., a rollable display or a flexible display) may include a plurality of pixels 814 and a light blocking layer 816 (e.g., a light absorption layer) (e.g., a black matrix).

According to an embodiment, the plurality of pixels 814 may be arranged in a stripe type. For example, each of the plurality of pixels 814 may be configured by subpixels 812 of three colors (e.g., red, green, and blue). The disclosure is not limited thereto, and each of the plurality of pixels 814 may be configured by subpixels 812 of four or five colors. For example, the subpixels 812 may be separated (e.g., divided) by the light blocking layer 816 (e.g., a light absorption layer) (e.g., a black matrix) to prevent color mixing.

Referring to FIG. 8B, a display 820 (e.g., the display 610 of FIGS. 6 and 7 or a display 900 of FIGS. 9 and 10) (e.g., a rollable display or a flexible display) may include a plurality of pixels 824 and a light blocking layer 826 (e.g., a light absorption layer) (e.g., a black matrix).

According to an embodiment, the plurality of pixels 824 may be arranged in a diamond type. For example, each of the plurality of pixels 824 may be configured by subpixels 822 of three colors (e.g., red, green, and blue). In the diamond type, the plurality of pixels 824 may be arranged in a diamond shape (or a diamond-like shape), and the sizes of the subpixels 822 of three colors (e.g., red, green, and blue) may be different from each other. The disclosure is not limited thereto, and each of the plurality of pixels 824 may be configured by subpixels 822 of four or five colors. For example, the subpixels 822 may be separated (e.g., divided) by the light blocking layer 826 (e.g., a light absorption layer) (e.g., a black matrix) to prevent color mixing.

Referring to FIG. 8C, a display 830 (e.g., the display 610 of FIGS. 6 and 7 or a display 900 of FIGS. 9 and 10) (e.g., a rollable display or a flexible display) may include a plurality of pixels 834 and a light blocking layer 836 (e.g., a light absorption layer) (e.g., a black matrix).

For example, the plurality of pixels 834 may be arranged in a round diamond type. For example, each of the plurality of pixels 834 may be configured by subpixels 832 of three colors (e.g., red, green, and blue). In the round diamond type, the plurality of pixels 834 having a round shape may be arranged in a diamond shape (or a diamond-like shape), and the sizes of the subpixels 832 of three colors (e.g., red, green, and blue) may be different from each other. The disclosure is not limited thereto, and each of the plurality of pixels 834 may be configured by subpixels 832 of four or five colors. For example, the subpixels 832 may be separated (e.g., divided) by the light blocking layer 836 (e.g., a light absorption layer) (e.g., a black matrix) to prevent color mixing.

According to an embodiment, a display 840 (e.g., the display 610 of FIGS. 6 and 7 or a display 900 of FIGS. 9 and 10) (e.g., a rollable display or a flexible display) may include a plurality of pixels 844 and a light blocking layer 846 (e.g., a light absorption layer) (e.g., a black matrix).

For example, the plurality of pixels 844 may be arranged in a round diamond type. For example, each of the plurality of pixels 844 may be configured by subpixels 842 of three colors (e.g., red, green, and blue). In the round diamond type, the plurality of pixels 844 having a circular (or oval) shape may be arranged in a diamond shape (or a diamond-like shape), and the sizes of the subpixels 842 of three colors (e.g., red, green, and blue) may be different from each other. The disclosure is not limited thereto, and each of the plurality of pixels 844 may be configured by subpixels 842 of four or five colors. For example, the subpixels 842 may be separated (e.g., divided) by the light blocking layer 846 (e.g., a light absorption layer) (e.g., a black matrix) to prevent color mixing.

Figure 9:
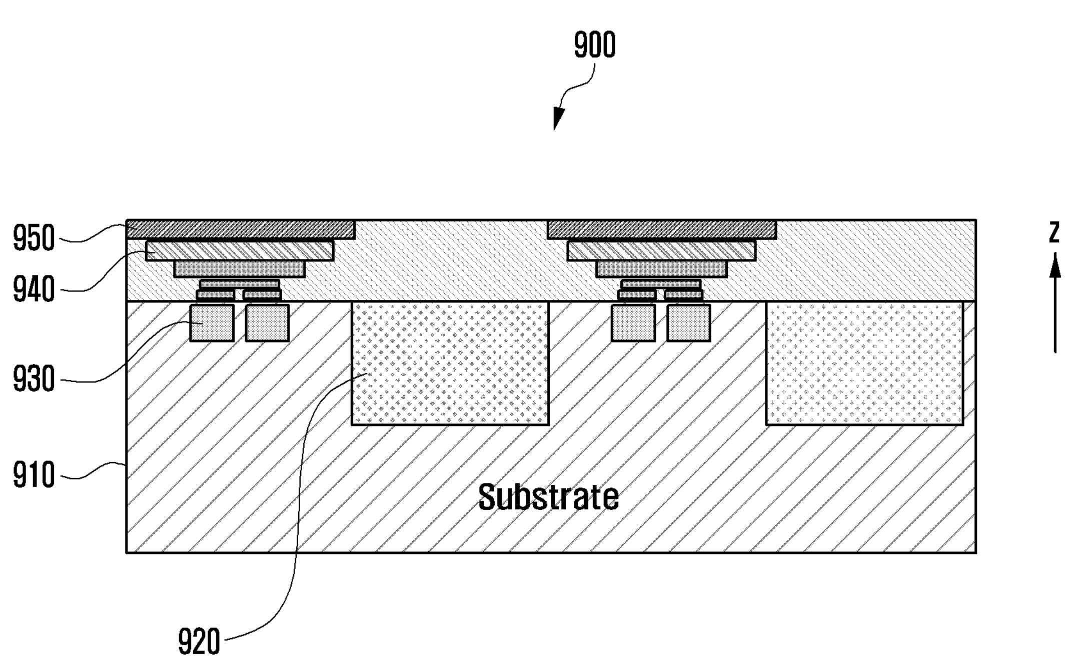
FIG. 9 is a cross-sectional view illustrating a display including an integrated touch fingerprint sensor according to an embodiment of the disclosure.
Figure 10:
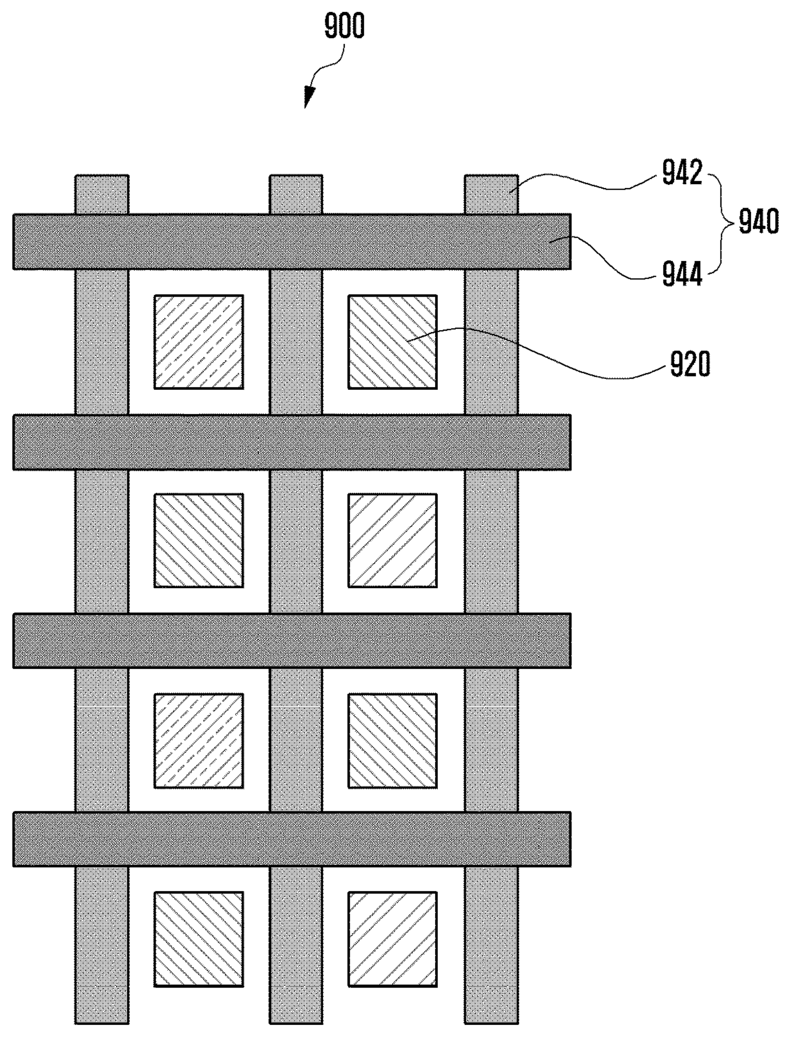
FIG. 10 is a diagram illustrating the arrangement of subpixels and a touch fingerprint sensor of an electronic device according to an embodiment of the disclosure.
Figure 10:
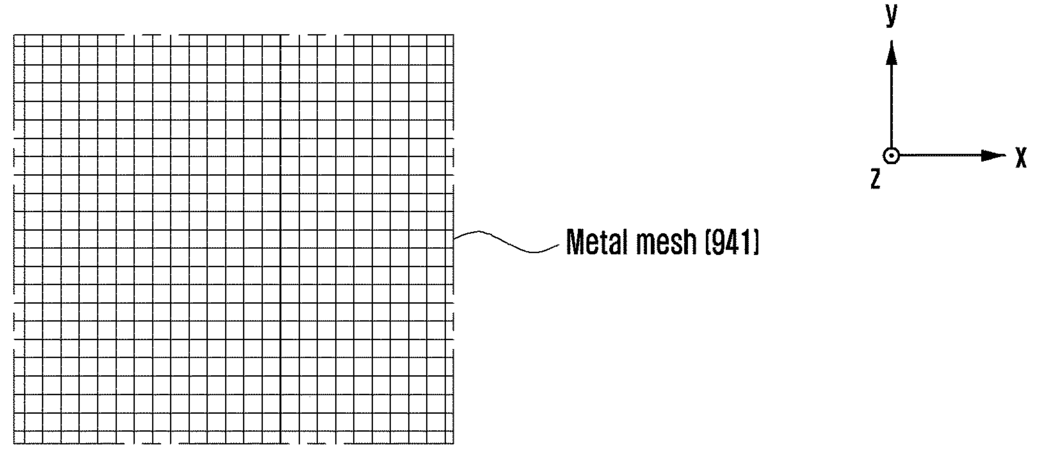

FIG. 9 is a cross-sectional view illustrating a display including an integrated touch fingerprint sensor according to an embodiment of the disclosure. FIG. 10 is a diagram illustrating the arrangement of subpixels and a touch fingerprint sensor of an electronic device (e.g., the electronic device 200 of FIG. 2A) according to an embodiment of the disclosure.

Referring to FIGS. 9 and 10, a display 900 (e.g., a rollable display or a flexible display) including an integrated touch fingerprint sensor according to an embodiment of the disclosure may include a substrate 910, a plurality of subpixels 920 (e.g., subpixels 920 of FIG. 11) disposed on the substrate 910, circuits and wires 930 for driving the pixels 920, a touch fingerprint sensor 940 (e.g., the touch fingerprint sensor 451 of FIG. 4) (e.g., an integrated touch fingerprint sensor) for sensing a touch and a fingerprint, and a light blocking layer 950 (e.g., a light absorption layer) (e.g., a black matrix).

According to an embodiment, the subpixels 920 may include organic light emitting diodes (OLEDs) or micro LEDs.

According to an embodiment, the plurality of subpixels 920 and the touch fingerprint sensor 940 may be arranged to be separated (e.g., so as not to overlap each other) on a plane.

For example, the plurality of subpixels 920 and the touch fingerprint sensor 940 are arranged so as not to interfere with each other, so that the touch fingerprint sensor 940 does not affect light emission of the plurality of subpixels 920.

For example, the plurality of subpixels 920 and the touch fingerprint sensor 940 are arranged so as not to interfere with each other, so that the plurality of subpixels 920 do not affect the driving of the touch fingerprint sensor 940.

According to an embodiment, the touch fingerprint sensor 940 and the light blocking layer 950 (e.g., a light absorption layer) (e.g., a black matrix) may be arranged so as to overlap on a plane. For example, the touch fingerprint sensor 940 and the light blocking layer 950 (e.g., a light absorption layer) (e.g., a black matrix) may be arranged so as to overlap in the z-axis (e.g., the z-axis in FIG. 2A and the z-axis in FIG. 3A). For example, the light blocking layer 950 (e.g., a light absorption layer) (e.g., a black matrix) may be disposed so as to overlap an upper portion (e.g., top) of the touch fingerprint sensor 940 with reference to a direction in which a screen is displayed (e.g., z-axis direction). For example, the light blocking layer 950 (e.g., a light absorption layer) (e.g., a black matrix) may be disposed so as to cover at least the entirety of the touch fingerprint sensor 940 (e.g., to overlap at least the entirety).

For example, the touch fingerprint sensor 940 is embedded in the inside of the display 900 (e.g., a rollable display or a flexible display) (or disposed in an upper portion of the display 900), so that the transmittance of the display 900 may not be affected.

For example, the touch fingerprint sensor 940 is disposed so as to overlap the light blocking layer 950 (e.g., a light absorption layer) (e.g., a black matrix), so that moire phenomenon from occurring due to the metal mesh pattern 941 of the touch fingerprint sensor 940 may be prevented.

According to an embodiment, the touch fingerprint sensor 940 may include first metal mesh lines 942 (e.g., the first metal mesh lines 622 of FIG. 6) (e.g., first conductive mesh lines) (e.g., first mesh touch lines) (e.g., Tx metal mesh lines) (e.g., a Tx metal mesh pattern), and second metal mesh lines 944 (e.g., the second metal mesh lines 624 of FIG. 6) (e.g., second conductive mesh lines) (e.g., second mesh touch lines) (e.g., Rx metal mesh lines) (e.g., an Rx metal mesh pattern), the metal mesh lines being formed in the metal mesh pattern 941 (e.g., a mesh-shaped metal pattern) (e.g., a mesh-shaped metal line).

For example, the display 900 (e.g., a rollable display or a flexible display) may be formed to have a thickness of several tens of μm, thereby securing a sensing distance for touch sensing and fingerprint sensing (e.g., obtaining a fingerprint image).

According to an embodiment, the touch fingerprint sensor 940 is a sensor (e.g., an integrated touch fingerprint sensor) in which a touch sensing function and a fingerprint sensing function are integrated, and may be embedded in the display 900 (e.g., a rollable display or a flexible display) (e.g., an in-cell touch manner).

For example, at the time of manufacturing the display 900 (e.g., a rollable display or a flexible display), the touch fingerprint sensor 940 may be embedded in the display 900 (e.g., a rollable display or a flexible display) by forming the touch fingerprint sensor 940 while forming the plurality of subpixels 920 and/or the circuits and wires 930 (e.g., an in-cell touch manner).

For example, the touch fingerprint sensor 940 may be disposed in the top portion (or surface) of the display 900 (e.g., a rollable display or a flexible display) in an on-cell manner.

For example, in an electronic device according to an embodiment of the disclosure, the touch fingerprint sensor 940 may be disposed in an upper portion (e.g., above the subpixels 920) of the display 900 (e.g., a rollable display or a flexible display). The touch fingerprint sensor 940 may be disposed in the upper portion (e.g., above the subpixels 920) of the display 900 (e.g., a rollable display or a flexible display) to increase the sensitivity of touch sensing and fingerprint sensing.

The disclosure is not limited thereto, and in an electronic device according to an embodiment of the disclosure, the touch fingerprint sensor 940 may be disposed at the same height (or similar height) as the subpixels 920.

According to an embodiment, the metal mesh pattern 941 (e.g., a mesh-shaped metal line) forming the touch fingerprint sensor 940 may be formed of a metal (e.g., silver (Ag), copper (Cu), gold (Au), aluminum (Al), magnesium (Mg), zinc (Zn), nickel (Ni), lead (Pb), or antimony (Sb)) having low electric resistance and high electric conductivity. For example, the metal mesh pattern 941 (e.g., a mesh-shaped metal line) forming the touch fingerprint sensor 940 may be formed of an alloy containing at least two of silver (Ag), copper (Cu), gold (Au), aluminum (Al), magnesium (Mg), zinc (Zn), nickel (Ni), lead (Pb), and antimony (Sb).

Figure 11:
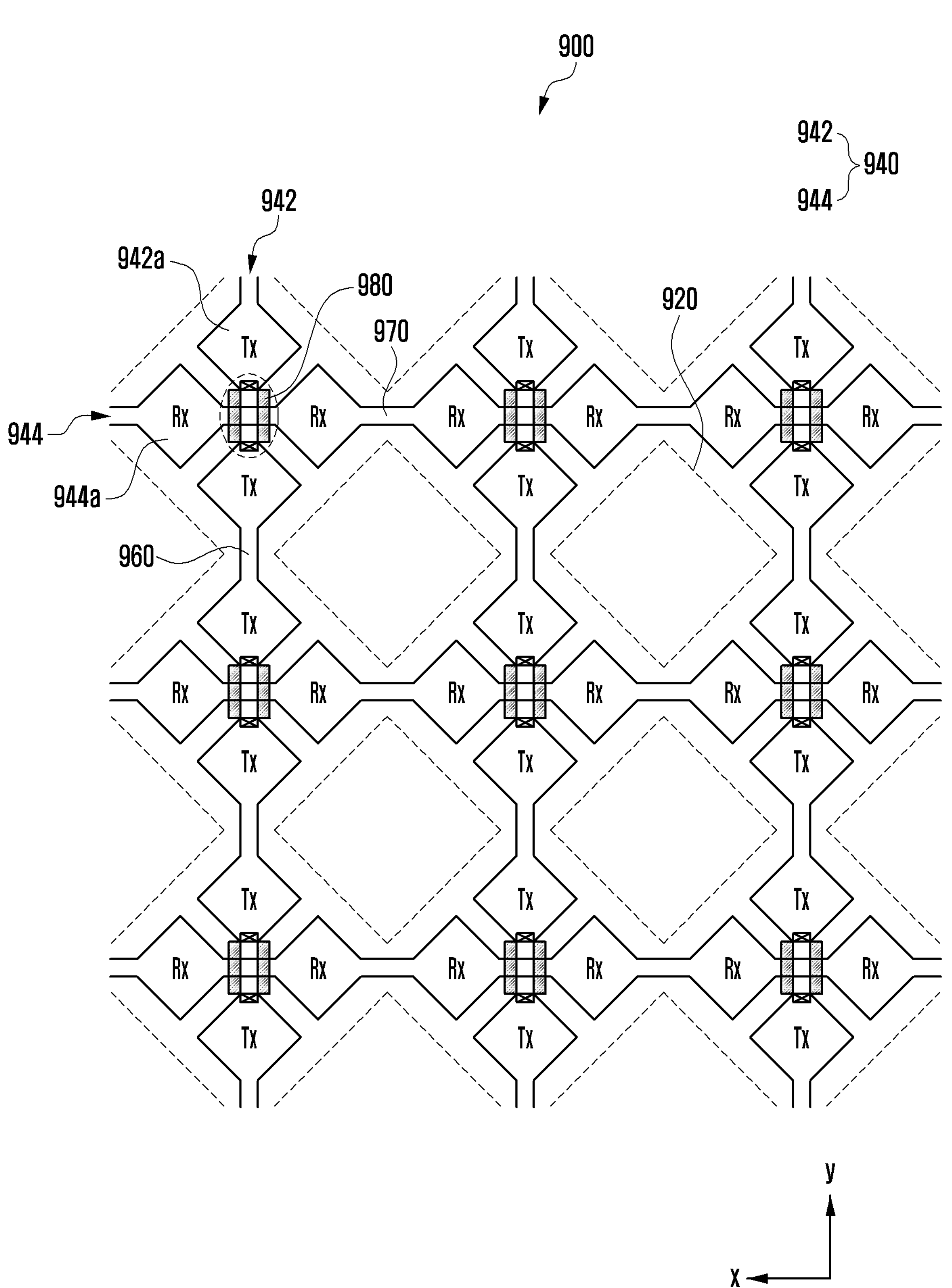
FIG. 11 is a diagram illustrating a first metal mesh line (e.g., a Tx metal mesh line) and a second metal mesh line (e.g., an Rx metal mesh line) disposed on a display according to an embodiment of the disclosure.

FIG. 11 is a diagram illustrating a first metal mesh line (e.g., a Tx metal mesh line) and a second metal mesh line (e.g., an Rx metal mesh line) disposed on a display according to an embodiment of the disclosure.

Referring to FIGS. 10 and 11, according to an embodiment, the display 900 (e.g., a rollable display or a flexible display) according to an embodiment of the disclosure may include the plurality of subpixels 920 and the touch fingerprint sensor 940 (e.g., the touch fingerprint sensor 451 of FIG. 4).

According to an embodiment, the touch fingerprint sensor 940 may include the first metal mesh lines 942 (e.g., the first metal mesh lines 622 of FIG. 6) (e.g., first conductive mesh lines) (e.g., first mesh touch lines) (e.g., Tx metal mesh lines) (e.g., a Tx metal mesh pattern), and the second metal mesh lines 944 (e.g., the second metal mesh lines 624 of FIG. 6) (e.g., second conductive mesh lines) (e.g., second mesh touch lines) (e.g., Rx metal mesh lines) (e.g., an Rx metal mesh pattern), the metal mesh lines being formed in a mesh-shaped metal pattern (e.g., the metal mesh pattern 941 of FIG. 10) (e.g., a mesh-shaped metal line).

For example, the first metal mesh lines 942 (e.g., first conductive mesh lines) (e.g., first mesh touch lines) (e.g., Tx metal mesh lines) (e.g., a Tx metal mesh pattern) may be used as Tx lines (e.g., Tx touch fingerprint sensing lines) for touch sensing and fingerprint sensing.

For example, the second metal mesh lines 944 (e.g., second conductive mesh lines) (e.g., second mesh touch lines) (e.g., Rx metal mesh lines) (e.g., an Rx metal mesh pattern) may be used as Rx lines (e.g., Rx touch fingerprint sensing lines) for touch sensing and fingerprint sensing.

For example, the first metal mesh lines 942 (e.g., first conductive mesh lines) (e.g., first mesh touch lines) (e.g., Tx metal mesh lines) (e.g., a Tx metal mesh pattern) may be arranged in a line form (e.g., a metal mesh line form) having a length in a first direction (e.g., y-axis direction). The disclosure is not limited thereto, and the first metal mesh lines 942 (e.g., first conductive mesh lines) (e.g., first mesh touch lines) (e.g., Tx metal mesh lines) (e.g., a Tx metal mesh pattern) may be arranged in a line form (e.g., a metal mesh line form) having a length in a second direction (e.g., x-axis direction).

For example, the second metal mesh lines 944 (e.g., second conductive mesh lines) (e.g., second mesh touch lines) (e.g., Rx metal mesh lines) (e.g., an Rx metal mesh pattern) may be arranged in a line form (e.g., a metal mesh line form) having a length in the second direction (e.g., x-axis direction) perpendicular to the first direction (e.g., y-axis direction). The disclosure is not limited thereto, and the second metal mesh lines 944 (e.g., second conductive mesh lines) (e.g., second mesh touch lines) (e.g., Rx metal mesh lines) (e.g., an Rx metal mesh pattern) may be arranged in a line form (e.g., a metal mesh line form) having a length in the first direction (e.g., y-axis direction).

For example, the first metal mesh lines 942 (e.g., Tx metal mesh lines) may be formed by electrically connecting first metal mesh patterns 942*a*.

For example, the first metal mesh patterns 942*a* may be electrically connected by first connection wires 960 (e.g., a first metal mesh connection wire) (e.g., a first metal mesh connection pattern).

For example, the second metal mesh lines 944 (e.g., Rx metal mesh lines) may be formed by electrically connecting second metal mesh patterns 944*a*.

For example, the second metal mesh patterns 944*a* may be electrically connected by second connection wires 970 (e.g., a second metal mesh connection wire) (e.g., a second metal mesh connection pattern).

According to an embodiment, the first metal mesh lines 942 (e.g., Tx metal mesh lines) and the second metal mesh lines 944 (e.g., Rx metal mesh lines) may be arranged on different planes. For example, the first metal mesh lines 942 (e.g., Tx metal mesh lines) may be arranged on a first layer, and the second metal mesh lines 944 (e.g., Rx metal mesh lines) may be disposed on a second layer. An insulating layer may be disposed between the first layer and the second layer.

According to an embodiment, the first metal mesh lines 942 (e.g., Tx metal mesh lines) and the second metal mesh lines 944 (e.g., Rx metal mesh lines) may be arranged on the same plane (e.g., arranged on substantially the same plane).

For example, when the first metal mesh lines 942 (e.g., Tx metal mesh lines) and the second metal mesh lines 944 (e.g., Rx metal mesh lines) are arranged on the same plane (e.g., substantially the same plane), a bridge pattern 980 may be disposed in a portion where the first metal mesh lines 942 (e.g., Tx metal mesh lines) and the second metal mesh lines 944 (e.g., Rx metal mesh lines) intersect.

For example, through the bridge pattern 980, the first metal mesh lines 942 (e.g., Tx metal mesh lines) and the second metal mesh lines 944 (e.g., Rx metal mesh lines) may not be electrically connected to each other (e.g., disconnected) (e.g., insulated).

For example, the first metal mesh lines 942 (e.g., Tx metal mesh lines) and the bridge pattern 980 are electrically connected, so that the first metal mesh lines 942 (e.g., Tx metal mesh lines) and the second metal mesh lines 944 (e.g., Rx metal mesh lines) may not be electrically connected to each other (e.g., disconnected) (e.g., insulated).

The disclosure is not limited thereto, and the second metal mesh lines 944 (e.g., Rx metal mesh lines) and the bridge pattern 980 are electrically connected, so that the second metal mesh lines 944 (e.g., Rx metal mesh lines) and the first metal mesh lines 942 (e.g., Tx metal mesh lines) may not be electrically connected to each other (e.g., disconnected) (e.g., insulated).

Figure 13:
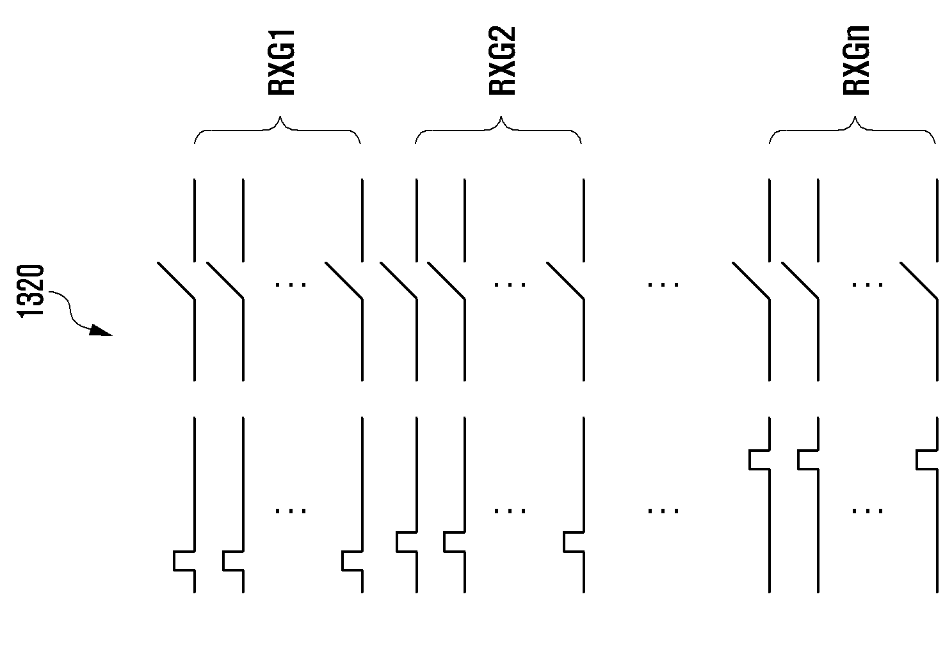
FIG. 13 is a diagram illustrating first switching waveforms of a first multiplexer (e.g., a Tx multiplexer) and second switching waveforms of a second multiplexer (e.g., an Rx multiplexer) for touch recognition according to an embodiment of the disclosure.
Figure 13:
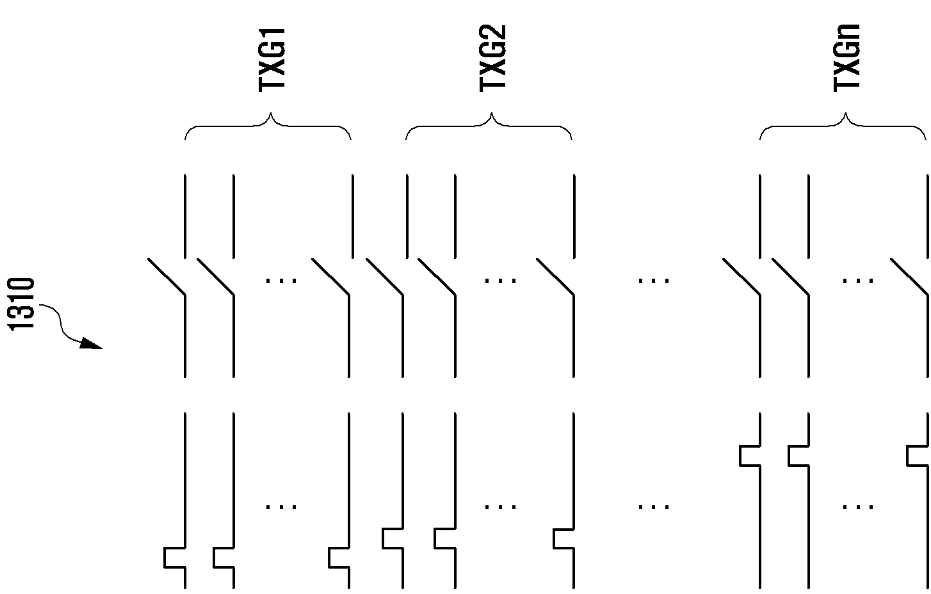

FIG. 12 is a diagram illustrating an electronic device including an integrated touch fingerprint sensor according to an embodiment of the disclosure. FIG. 13 is a diagram illustrating first switching waveforms of a first multiplexer (e.g., a Tx multiplexer) and second switching waveforms of a second multiplexer (e.g., an Rx multiplexer) 1300 for touch recognition according to an embodiment of the disclosure.

Referring to FIGS. 12 and 13, an electronic device 1200 according to an embodiment of the disclosure may include a display 900 (e.g., a rollable display or a flexible display) in which a plurality of pixels are arranged, a display driver IC (e.g., the display driver IC 430 of FIG. 4), a first multiplexer 1220 (e.g., a Tx multiplexer), a second multiplexer 1230 (e.g., an Rx multiplexer), a touch fingerprint sensor IC 1240 (e.g., the touch fingerprint sensor IC 453 of FIG. 4), a processor 1250 (e.g., the processor 120 of FIG. 1), and memory 130 (e.g., the memory 130 of FIG. 1).

According to an embodiment, the processor 1250 and the memory 130 may be operatively connected. The memory 130 may include instructions for executing the processor 1250, the display driver IC 430, and the touch fingerprint sensor IC 1240.

According to an embodiment, the processor 1250 may be operatively connected to the display driver IC 430 and the touch fingerprint sensor IC 1240. For example, the processor 1250 may control an operation of the display driver IC 430. For example, the processor 1250 may control an operation of the touch fingerprint sensor IC 1240.

For example, the processor 1250 may control operations of the first multiplexer 1220 (e.g., a Tx multiplexer) and the second multiplexer 1230 (e.g., an Rx multiplexer).

According to an embodiment, the display driver IC 430 may operate the display 900 (e.g., a rollable display or a flexible display), based on the control of the processor 1250.

According to an embodiment, the display 900 may include a touch fingerprint sensor 1210 (e.g., the touch fingerprint sensor 940 of FIGS. 9 to 11) (e.g., an integrated touch fingerprint sensor) disposed to perform touch sensing and fingerprint sensing together. The electronic device 1200 according to an embodiment of the disclosure may perform touch sensing and fingerprint sensing together by using the touch fingerprint sensor 1210 or 940 (e.g., an integrated touch fingerprint sensor).

According to an embodiment, the touch fingerprint sensor IC 1240 may operate the touch fingerprint sensor 1210 or 940, based on the control of the processor 1250.

For example, the touch fingerprint sensor 1210 or 940 may include first metal mesh lines (e.g., the first metal mesh lines 942 of FIGS. 10 and 11), and second metal mesh lines (e.g., the second metal mesh lines 944 of FIGS. 10 and 11), the metal mesh lines being formed in a mesh-shaped metal pattern (e.g., the metal mesh pattern 941 of FIG. 10) (e.g., a mesh-shaped metal line).

For example, the first metal mesh lines 942 (e.g., first conductive mesh lines) (e.g., first mesh touch lines) (e.g., Tx metal mesh lines) (e.g., a Tx metal mesh pattern) may be used as Tx lines (e.g., Tx touch fingerprint sensing lines) for touch sensing and fingerprint sensing. For example, the first metal mesh lines 942 (e.g., first conductive mesh lines) (e.g., first mesh touch lines) (e.g., Tx metal mesh lines) (e.g., a Tx metal mesh pattern) may be individually driven.

For example, the second metal mesh lines 944 (e.g., second conductive mesh lines) (e.g., second mesh touch lines) (e.g., Rx metal mesh lines) (e.g., an Rx metal mesh pattern) may be used as Rx lines (e.g., Rx touch fingerprint sensing lines) for touch sensing and fingerprint sensing. For example, the second metal mesh lines 944 (e.g., second conductive mesh lines) (e.g., second mesh touch lines) (e.g., Rx metal mesh lines) (e.g., an Rx metal mesh pattern) may be individually driven.

According to an embodiment, the electronic device 1200 according to an embodiment of the disclosure may perform touch sensing and fingerprint sensing together by using the first metal mesh lines 942 (e.g., Tx lines) (e.g., Tx touch fingerprint sensing lines) and the second metal mesh lines 944 (e.g., Rx lines) (e.g., Rx touch fingerprint sensing lines), the metal mesh lines being disposed (e.g., built-in) on the display 900 (e.g., a rollable display or a flexible display).

The electronic device 1200 according to an embodiment of the disclosure may perform a touch sensing operation and a fingerprint sensing operation separately. For example, the electronic device 1200 may simultaneously perform (e.g., substantially simultaneously perform) the touch sensing operation and the fingerprint sensing operation. For example, the electronic device 1200 may perform the touch sensing operation first and then perform the fingerprint sensing operation. For example, the electronic device 1200 may start the fingerprint sensing operation before the touch sensing operation is completed. For example, the electronic device 1200 may start the fingerprint sensing operation after the touch sensing operation is completed.

During the touch sensing operation, the electronic device 1200 according to an embodiment of the disclosure may configure a plurality of Tx touch channels 1212 by grouping the first metal mesh lines 942 (e.g., Tx lines) (e.g., Tx touch fingerprint sensing lines) in a predetermined number of units. For example, the processor 1250 may control an operation of the first multiplexer 1220 (e.g., a Tx multiplexer). The first multiplexer 1220 (e.g., a Tx multiplexer) may electrically connect or insulate the touch fingerprint sensor IC 1240 and the first metal mesh lines 942 (e.g., Tx lines) (e.g., Tx touch fingerprint sensing lines).

For example, the first multiplexer 1220 (e.g., a Tx multiplexer) may include a plurality of first switches (e.g., a plurality of Tx selection switches). For example, the first multiplexer 1220 (e.g., a Tx multiplexer) may supply first switch signals 1310 by grouping the plurality of first switches (e.g., a plurality of Tx selection switches) in a predetermined number of units such that the first metal mesh lines 942 (e.g., Tx lines) (e.g., Tx touch fingerprint sensing lines) are grouped in a predetermined number of units.

For example, the plurality of first switches (e.g., a plurality of Tx selection switches) of the first multiplexer 1220 (e.g., a Tx multiplexer) may be selectively turned on or off by the first switch signals 1310. The plurality of first switches (e.g., a plurality of Tx selection switches) are selectively turned on or off to electrically connect or electrically insulate each of the first metal mesh lines 942 (e.g., Tx lines) (e.g., Tx touch fingerprint sensing lines) to or from the touch fingerprint sensor IC 1240.

For example, the first multiplexer 1220 (e.g., a Tx multiplexer) may configure the plurality of Tx touch channels 1212 (e.g., TXG1, TXG2, . . . , and TXGn) by grouping (e.g., electrically connecting) the first metal mesh lines 942 (e.g., Tx lines) (e.g., Tx touch fingerprint sensing lines) in a predetermined number of units.

For example, the touch fingerprint sensor IC 1240 may supply a first Tx signal (e.g., a first Tx signal for touch sensing) to the first multiplexer 1220 (e.g., a Tx multiplexer).

For example, the first multiplexer 1220 (e.g., a Tx multiplexer) may supply a first Tx signal (e.g., a first Tx signal for touch sensing) to the plurality of Tx touch channels 1212 (e.g., TXG1, TXG2, . . . , and TXGn) in which the first metal mesh lines 942 (e.g., Tx lines) (e.g., Tx touch fingerprint sensing lines) are grouped (e.g., electrically connected) in a predetermined number of units. For example, the same first Tx signal (e.g., a first Tx signal for touch sensing) may be supplied to each of the plurality of Tx touch channels 1212 (e.g., TXG1, TXG2, . . . , and TXGn).

During the touch sensing operation, the electronic device 1200 according to an embodiment of the disclosure may configure a plurality of Rx touch channels 1214 by grouping the second metal mesh lines 944 (e.g., Rx lines) (e.g., Rx touch fingerprint sensing lines) in a predetermined number of units. For example, the processor 1250 may control an operation of the second multiplexer 1230 (e.g., an Rx multiplexer). The second multiplexer 1230 (e.g., an Rx multiplexer) may electrically connect or insulate the touch fingerprint sensor IC 1240 and the second metal mesh lines 944 (e.g., Rx lines) (e.g., Rx touch fingerprint sensing lines).

For example, the second multiplexer 1230 (e.g., an Rx multiplexer) may include a plurality of second switches (e.g., a plurality of Rx selection switches). For example, the second multiplexer 1230 (e.g., an Rx multiplexer) may supply second switch signals 1320 by grouping the plurality of second switches (e.g., a plurality of Rx selection switches) in a predetermined number of units such that the second metal mesh lines 944 (e.g., Rx lines) (e.g., Rx touch fingerprint sensing lines) are grouped in a predetermined number of units.

For example, the plurality of second switches (e.g., a plurality of Rx selection switches) of the second multiplexer 1230 (e.g., an Rx multiplexer) may be selectively turned on or off by the second switch signals 1320. The plurality of second switches (e.g., a plurality of Rx selection switches) are selectively turned on or off to electrically connect or electrically insulate each of the second metal mesh lines 944 (e.g., Rx lines) (e.g., Rx touch fingerprint sensing lines) to or from the touch fingerprint sensor IC 1240.

For example, the second multiplexer 1230 (e.g., an Rx multiplexer) may configure each of the plurality of Rx touch channels 1214 (e.g., RXG1, RXG2, . . . , and RXGn) by grouping (e.g., electrically connecting) the second metal mesh lines 944 (e.g., Rx lines) (e.g., Rx touch fingerprint sensing lines) in a predetermined number of units. For example, the second multiplexer 1230 (e.g., an Rx multiplexer) may receive a first Rx signal (e.g., a first Rx signal for touch sensing) from the plurality of Rx touch channels 1214 (e.g., RXG1, RXG2, . . . , and RXGn) in which the second metal mesh lines 944 (e.g., Rx lines) (e.g., Rx touch fingerprint sensing lines) are grouped (e.g., electrically connected) in a predetermined number of units. The second multiplexer 1230 (e.g., an Rx multiplexer) may deliver (e.g., provide or transmit) the first Rx signal (e.g., a first Rx signal for touch sensing) received from the plurality of Rx touch channels 1214 (e.g., RXG1, RXG2, . . . , and RXGn) to the touch fingerprint sensor IC 1240.

For example, while one Tx touch channel 1212 is driven (e.g., while the first Tx signal (e.g., a first Tx signal for touch sensing) is supplied to one Tx touch channel 1212), the first Rx signal (e.g., a first Rx signal for touch sensing) may be detected for all the Rx touch channels 1214. The waveform scale of the Tx touch channel 1212 and the waveform scale of the Rx touch channels 1214 may be different from each other.

According to an embodiment, the touch fingerprint sensor IC 1240 may include a touch controller 1242 and an analog-to-digital converter 1244.

The analog-to-digital converter 1244 may convert the first Rx signal (e.g., a first Rx signal for touch sensing) received from the plurality of Rx touch channels 1214 (e.g., RXG1, RXG2, . . . , and RXGn) into first digital touch values.

For example, the touch controller 1242 may determine a touch location 1260 (e.g., a location where a touch is made), based on touch values of each of the plurality of Rx touch channels 1214 (e.g., RXG1, RXG2, . . . , and RXGn).

For example, the touch controller 1242 may provide (e.g., deliver or transmit) the touch values of each of the plurality of Rx touch channels 1214 (e.g., RXG1, RXG2, . . . , and RXGn) to the processor 1250. The processor 1250 may determine the touch location 1260 (e.g., a location where a touch is made), based on the touch values of each of the plurality of Rx touch channels 1214 (e.g., RXG1, RXG2, . . . , and RXGn).

The display 900 (e.g., a rollable display or a flexible display) of the electronic device 1200 according to an embodiment of the disclosure may slide in a first direction (e.g., direction ① in FIG. 2A) to expand a screen thereof (e.g., a slide-out state of a rollable display).

The display 900 (e.g., a rollable display or a flexible display) of the electronic device 1200 according to an embodiment of the disclosure may slide in a second direction (e.g., direction ② in FIG. 2A) to contract the screen (e.g., a slide-in state of a rollable display).

During the touch sensing operation, the electronic device 1200 according to an embodiment of the disclosure may determine whether the display 900 (e.g., a rollable display or a flexible display) is in an expanded screen state (e.g., a slide-out state of a rollable display) or is in a contracted screen state (e.g., a slide-in state of a rollable display). For example, the processor 1250 may determine whether the display 900 (e.g., a rollable display or a flexible display) is in an expanded screen state (e.g., a slide-out state of a rollable display) or is in a contracted screen state (e.g., a slide-in state of a rollable display), by using a sensor module (e.g., the sensor module 176 of FIG. 1).

When the display 900 (e.g., a rollable display or a flexible display) is in an expanded state (e.g., a slide-out state of a rollable display), the electronic device 1200 according to an embodiment of the disclosure may configure the plurality of Tx touch channels 1212 (e.g., TXG1, TXG2, . . . , and TXGn) according to the expanded state (e.g., a slide-out state of a rollable display) of the display 900 (e.g., a rollable display or a flexible display).

When the display 900 (e.g., a rollable display or a flexible display) is in an expanded state (e.g., a slide-out state of a rollable display), the electronic device 1200 according to an embodiment of the disclosure may configure the plurality of Rx touch channels 1214 (e.g., RXG1, RXG2, . . . , and RXGn) according to the expanded state (e.g., a slide-out state of a rollable display) of the display 900 (e.g., a rollable display or a flexible display).

During the fingerprint sensing operation, the electronic device 1200 according to an embodiment of the disclosure may sense a fingerprint 1262 by using the first metal mesh lines 942 (e.g., local Tx lines) (e.g., local Tx touch fingerprint sensing lines) disposed at the touch location 1260 (e.g., a location where a touch is made).

During the fingerprint sensing operation, the electronic device 1200 according to an embodiment of the disclosure may sense the fingerprint 1262 by using the second metal mesh lines 944 (e.g., local Rx lines) (e.g., local Rx touch fingerprint sensing lines) disposed at the touch location 1260 (e.g., a location where a touch is made).

According to an embodiment, the processor 1250 may control an operation of the first multiplexer 1220 (e.g., a Tx multiplexer). The first multiplexer 1220 (e.g., a Tx multiplexer) may individually turn on or off the first metal mesh lines 942 (e.g., local Tx lines) (e.g., local Tx touch fingerprint sensing lines) disposed at the touch location 1260 (e.g., a location where a touch is made).

For example, the touch fingerprint sensor IC 1240 may supply a second Tx signal (e.g., a second Tx signal for fingerprint sensing) to the first multiplexer 1220 (e.g., a Tx multiplexer).

For example, the first multiplexer 1220 (e.g., a Tx multiplexer) may supply a second Tx signal (e.g., a second Tx signal for fingerprint sensing) to the first metal mesh lines 942 (e.g., local Tx lines) (e.g., local Tx touch fingerprint sensing lines) disposed at the touch location 1260 (e.g., a location where a touch is made).

During the fingerprint sensing operation, in the electronic device 1200 according to an embodiment of the disclosure, the processor 1250 may control an operation of the second multiplexer 1230 (e.g., an Rx multiplexer). The second multiplexer 1230 (e.g., an Rx multiplexer) may individually turn on or off the second metal mesh lines 944 (e.g., local Rx lines) (e.g., local Rx touch fingerprint sensing lines) disposed at the touch location 1260 (e.g., a location where a touch is made).

For example, at a point where a Tx line (or Tx lines) and an Rx line (or Rx lines) intersect, a node (e.g., a touch node) for detecting a touch location may be configured.

For example, one node (e.g., a touch node) may be configured by one first metal mesh line 942 (e.g., local Tx lines) and one second metal mesh line 944 (e.g., local Rx lines) (e.g., local Rx touch fingerprint sensing lines).

For example, one node (e.g., a touch node) may be configured by the plurality of first metal mesh lines 942 (e.g., local Tx lines) and the plurality of second metal mesh lines 944 (e.g., local Rx lines) (e.g., local Rx touch fingerprint sensing lines).

For example, the plurality of second switches (e.g., a plurality of Rx selection switches) are selectively turned on or off to electrically connect or electrically insulate each of the second metal mesh lines 944 (e.g., local Rx lines) (e.g., local Rx touch fingerprint sensing lines) disposed at the touch location 1260 (e.g., a location where a touch is made) to or from the touch fingerprint sensor IC 1240.

For example, a second Rx signal (e.g., a second Rx signal for fingerprint sensing) may be received from the second metal mesh lines 944 (e.g., local Rx lines) (e.g., local Rx touch fingerprint sensing lines) disposed at the touch location 1260 (e.g., a location where a touch is made). The second multiplexer 1230 (e.g., an Rx multiplexer) may deliver (e.g., provide or transmit), to the touch fingerprint sensor IC 1240, the second Rx signal (e.g., a second Rx signal for fingerprint sensing) received from the second metal mesh lines 944 (e.g., local Rx lines) (e.g., local Rx touch fingerprint sensing lines) disposed at the touch location 1260 (e.g., a location where a touch is made).

According to an embodiment, the analog-to-digital converter 1244 of the touch fingerprint sensor IC 1240 may convert the second Rx signal (e.g., a second Rx signal for fingerprint sensing) received from the second metal mesh lines 944 (e.g., local Rx lines) (e.g., local Rx touch fingerprint sensing lines) disposed at the touch location 1260 (e.g., a location where a touch is made) into second digital touch values (e.g., a touch value for generating a fingerprint image).

For example, the touch controller 1242 of the touch fingerprint sensor IC 1240 may generate a fingerprint image, based on the second touch values (e.g., a touch value for generating a fingerprint image) of the second metal mesh lines 944 (e.g., local Rx lines) (e.g., local Rx touch fingerprint sensing lines) disposed at the touch location 1260 (e.g., a location where a touch is made).

For example, the touch controller 1242 of the touch fingerprint sensor IC 1240 may provide (e.g., deliver or transmit), to the processor 1250, the second touch values (e.g., a touch value for generating a fingerprint image) of the second metal mesh lines 944 (e.g., local Rx lines) (e.g., local Rx touch fingerprint sensing lines) disposed at the touch location 1260 (e.g., a location where a touch is made). The processor 1250 may generate a fingerprint image, based on the second touch values (e.g., a touch value for generating a fingerprint image) of the second metal mesh lines 944 (e.g., local Rx lines) (e.g., local Rx touch fingerprint sensing lines) disposed at the touch location 1260 (e.g., a location where a touch is made).

For example, while a second Tx signal (e.g., a second Tx signal for fingerprint sensing) is supplied to one first metal mesh line 942 (e.g., a local Tx line) (e.g., a local Tx touch fingerprint sensing line) disposed at the touch location 1260 (e.g., a location where a touch is made), a second Rx signal (e.g., a second Rx signal for fingerprint sensing) may be detected for all the second metal mesh lines 944 (e.g., local Rx lines) (e.g., local Rx touch fingerprint sensing lines) disposed at the touch location 1260 (e.g., a location where a touch is made). The waveform scale of the first metal mesh lines 942 (e.g., local Tx lines) (e.g., local Tx touch fingerprint sensing lines) and the waveform scale of the second metal mesh lines 944 (e.g., local Rx lines) (e.g., local Rx touch fingerprint sensing lines) may be different from each other.

An electronic device (e.g., the electronic device 1200 of FIG. 12) according to an embodiment of the disclosure may perform fingerprint sensing by using all the first metal mesh lines 942 (e.g., local Tx lines) (e.g., local Tx touch fingerprint sensing lines) and all the second metal mesh lines 944 (e.g., local Rx lines) (e.g., local Rx touch fingerprint sensing lines) disposed at the touch location 1260 (e.g., a location where a touch is made). Accordingly, a fingerprint image having a resolution of about 500 dpi may be generated. When a fingerprint image is generated to have a resolution of about 500 dpi, even fingerprint ridges and sweat pores on the surface of a finger may be imaged for further enhancing security.

The display 900 (e.g., a rollable display or a flexible display) of the electronic device 1200 according to an embodiment of the disclosure may slide in a first direction (e.g., direction ① in FIG. 2A) to expand a screen thereof (e.g., a slide-out state of a rollable display).

The display 900 (e.g., a rollable display or a flexible display) of the electronic device 1200 according to an embodiment of the disclosure may slide in a second direction (e.g., direction ② in FIG. 2A) to contract the screen (e.g., a slide-in state of a rollable display).

During the fingerprint sensing operation, the electronic device 1200 according to an embodiment of the disclosure may determine whether the display 900 (e.g., a rollable display or a flexible display) is in an expanded screen state (e.g., a slide-out state of a rollable display) or is in a contracted screen state (e.g., a slide-in state of a rollable display). For example, the processor 1250 may determine whether the display 900 (e.g., a rollable display or a flexible display) is in an expanded screen state (e.g., a slide-out state of a rollable display) or is in a contracted screen state (e.g., a slide-in state of a rollable display), by using a sensor module (e.g., the sensor module 176 of FIG. 1).

When the display 900 (e.g., a rollable display or a flexible display) is in an expanded state (e.g., a slide-out state of a rollable display), the electronic device 1200 according to an embodiment of the disclosure may adjust a location, where a user interface (e.g., a user interface which induces fingerprint sensing) for fingerprint sensing is displayed, according to the expanded state (e.g., a slide-out state of a rollable display) of the display 900 (e.g., a rollable display or a flexible display).

Figure 14:
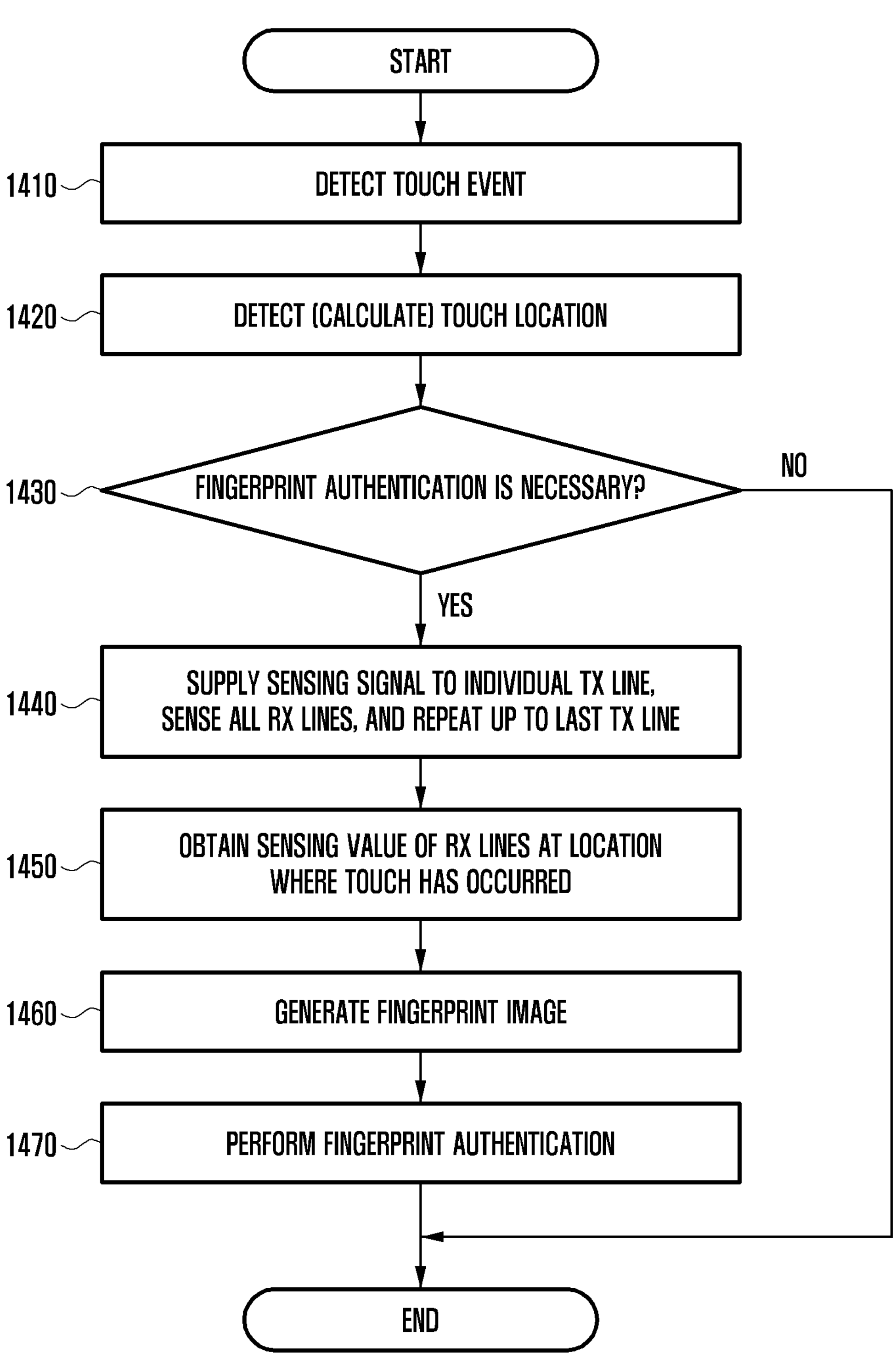
FIG. 14 is a flowchart illustrating an operation method of an electronic device including an integrated touch fingerprint sensor according to an embodiment of the disclosure.

FIG. 14 is a flowchart illustrating an operation method of an electronic device including an integrated touch fingerprint sensor according to an embodiment of the disclosure.

Referring to FIG. 14, in operation 1410, an electronic device (e.g., the electronic device 1200 of FIG. 12) may detect a touch event (e.g., whether a touch has occurred on a display (the display 900 of FIG. 12)). For example, a processor (e.g., the processor 1250 of FIG. 12) may detect a touch event (e.g., whether a touch has occurred on the display 900).

In operation 1420, the electronic device 1200 may determine a touch location (e.g., the touch location 1260 of FIG.

12) (e.g., a location where a touch is made), based on touch values of each of a plurality of Rx touch channels (e.g., the plurality of Rx touch channels 1214 of FIG. 12).

For example, the processor 1250 may determine a touch location (e.g., the touch location 1260 of FIG. 12) (e.g., a location where a touch is made), based on touch values of each of the plurality of Rx touch channels (e.g., the plurality of Rx touch channels 1214 of FIG. 12).

For example, a touch fingerprint sensor IC (e.g., the touch fingerprint sensor IC 1240 of FIG. 12) may determine a touch location (e.g., the touch location 1260 of FIG. 12) (e.g., a location where a touch is made), based on the touch values of each of the plurality of Rx touch channels (e.g., the plurality of Rx touch channels 1214 of FIG. 12).

In operation 1430, the electronic device 1200 may determine whether fingerprint authentication is necessary. For example, the electronic device 1200 may determine whether fingerprint authentication is necessary by executing an application which requires fingerprint authentication. For example, the processor 1250 may determine whether fingerprint authentication is necessary. For example, the processor 1250 may determine whether fingerprint authentication is necessary by executing an application which requires fingerprint authentication.

As a result of the determination in operation 1430, if the fingerprint authentication is not necessary, the operation may be terminated.

As a result of the determination in operation 1430, if the fingerprint authentication is necessary, operation 1440 may be performed.

In operation 1440, the electronic device 1200 may supply a second Tx signal (e.g., a second Tx signal for fingerprint sensing) to first metal mesh lines (e.g., the first metal mesh lines 942 of FIGS. 10 and 11) (e.g., local Tx lines) (e.g., local Tx touch fingerprint sensing lines) disposed at the touch location 1260 (e.g., a location where a touch has occurred) (e.g., a location where a touch has been detected).

For example, the processor 1250 may operate the touch fingerprint sensor IC 1240 and the first multiplexer 1220 (e.g., a Tx multiplexer) to supply a second Tx signal (e.g., a second Tx signal for fingerprint sensing) to an individual first metal mesh line (e.g., the first metal mesh lines 942 of FIGS. 10 and 11) (e.g., local Tx lines) (e.g., local Tx touch fingerprint sensing lines) disposed at the touch location 1260 (e.g., a location where a touch has been occurred) (e.g., a location where a touch has been detected). For example, a second Tx signal (e.g., a second Tx signal for fingerprint sensing) may be supplied to an individual first metal mesh line disposed at the touch location 1260 (e.g., a location where a touch has occurred), and a second Rx signal (e.g., a second Rx signal for fingerprint sensing) of all second metal mesh lines disposed at the touch location 1260 (e.g., a location where a touch has occurred) (e.g., a location where a touch has been detected) may be detected. For example, a second Tx signal (e.g., a second Tx signal for fingerprint sensing) may be sequentially supplied up to the last first metal mesh lines (e.g., the first metal mesh lines 942 of FIGS. 10 and 11) (e.g., local Tx lines) (e.g., local Tx touch fingerprint sensing lines) disposed at the touch location 1260 (e.g., a location where a touch has occurred). For example, the electronic device 1200 may detect an Rx signal (e.g., a background Rx signal) from all the second metal mesh lines (e.g., the second metal mesh lines 944 of FIGS. 10 and 11) (e.g., Rx lines) disposed at the touch location 1260 (e.g., a location where a touch has occurred) whenever a second Tx signal (e.g., a second Tx signal for fingerprint sensing) is supplied to one first metal mesh line disposed at the touch location 1260 (e.g., a location where a touch has occurred).

In operation 1450, the electronic device 1200 may detect a second Rx signal (e.g., a second Rx signal for fingerprint sensing) of the second metal mesh lines (e.g., the second metal mesh lines 944 of FIGS. 10 and 11) (e.g., local Rx lines) (e.g., local Rx touch fingerprint sensing lines) disposed at the touch location 1260 (e.g., a location where a touch has occurred) (e.g., a location where a touch has been detected). For example, an Rx sensing value for fingerprint recognition may be obtained for the second metal mesh lines 944 (e.g., local Rx lines) (e.g., local Rx touch fingerprint sensing lines) disposed at the touch location 1260 (e.g., a location where a touch has occurred) (e.g., a location where a touch has been detected).

For example, the processor 1250 may operate the touch fingerprint sensor IC 1240 and the second multiplexer 1230 (e.g., an Rx multiplexer) to obtain an Rx sensing value for fingerprint recognition with respect to the second metal mesh lines 944 (e.g., local Rx lines) (e.g., local Rx touch fingerprint sensing lines) disposed at the touch location 1260 (e.g., a location where a touch has occurred) (e.g., a location where a touch has been detected).

In operation 1460, the electronic device 1200 may generate a fingerprint image, based on a second Rx sensing value (e.g., an Rx sensing value for fingerprint recognition) detected from the second metal mesh lines 944 (e.g., local Rx lines) (e.g., local Rx touch fingerprint sensing lines) disposed at the touch location 1260 (e.g., a location where a touch has occurred) (e.g., a location where a touch has been detected).

For example, the processor 1250 may generate a fingerprint image, based on a second Rx sensing value (e.g., an Rx sensing value for fingerprint recognition) detected from the second metal mesh lines 944 (e.g., local Rx lines) (e.g., local Rx touch fingerprint sensing lines) disposed at the touch location 1260 (e.g., a location where a touch has occurred) (e.g., a location where a touch has been detected).

For example, the touch fingerprint sensor IC 1240 may generate a fingerprint image, based on a second Rx sensing value (e.g., an Rx sensing value for fingerprint recognition) detected from the second metal mesh lines 944 (e.g., local Rx lines) (e.g., local Rx touch fingerprint sensing lines) disposed at the touch location 1260 (e.g., a location where a touch has occurred) (e.g., a location where a touch has been detected).

In operation 1470, the electronic device 1200 may perform fingerprint authentication by comparing the generated fingerprint image with a reference fingerprint image (e.g., a sample fingerprint image and a fingerprint image template) stored in memory (e.g., the memory 130 of FIG. 1 or the memory 130 of FIG. 12). For example, the reference fingerprint image (e.g., a sample fingerprint image and a fingerprint image template) may be stored in a separate secure memory. For example, the secure memory may be an area logically separated from a general memory, or may be a separate memory physically separated.

For example, the processor 1250 may perform fingerprint authentication by comparing the generated fingerprint image with a reference fingerprint image (e.g., a sample fingerprint image and a fingerprint image template) stored in memory (e.g., the memory 130 of FIG. 1, the memory 130 of FIG. 12, or a secure memory). For example, the operation of performing fingerprint authentication by comparing the currently generated fingerprint image with the reference fingerprint image stored in the secure memory may be performed in a separate security processor. For example, a fingerprint authentication operation may be performed in a security environment. The security environment in which fingerprint authentication is performed may be logically or physically separated from a general execution environment. For example, a security processor corresponds to an example of a physically separated environment and may include a logically separated example (TrustZone) and a physically separated example (eSE, Secure Processor). For example, the security processor may operate as a physically separate processor, and the security processor may perform a fingerprint authentication operation alone. For example, the fingerprint authentication operation may be performed distributedly between the processor 1250 and the security processor.

The electronic device 1200 according to an embodiment of the disclosure may perform a touch sensing operation, and perform a fingerprint sensing operation on the touch location 1260 (e.g., a location where a touch has occurred) (e.g., a location where a touch has been detected), based on a touch sensing result. Latency for fingerprint authentication can be reduced and power consumption can be reduced by performing fingerprint sensing on the touch location 1260 (e.g., a location where a touch has occurred) (e.g., a location where a touch has been detected).

The electronic device 1200 according to an embodiment of the disclosure may perform touch sensing and fingerprint sensing together, and thus may perform fingerprint authentication by sensing a fingerprint immediately at a location where a touch is made. Even when a user touches any part of a screen of the electronic device 1200, the fingerprint authentication may be performed by immediately sensing the fingerprint at the location where the touch is made.

The electronic device 1200 according to an embodiment of the disclosure may perform touch sensing and fingerprint authentication simultaneously (e.g., substantially simultaneously) or in parallel, and may log in to an application by using fingerprint authentication. The electronic device 1200 according to an embodiment of the disclosure may eliminate the inconvenience of performing a separate login when running an application which requires fingerprint authentication.

According to an embodiment, the operations shown in FIG. 14 may be performed by loading instructions stored in memory (e.g., the memory 130 of FIG. 1 or the memory 130 of FIG. 12) by an electronic device (e.g., the electronic device 101 of FIG. 1, the electronic device 200 of FIG. 2A, the electronic device 300 of FIG. 3A, or the electronic device 1200 of FIG. 12). The operations shown in FIG. 14 may be performed by loading instructions stored in the memory 130 by a processor (e.g., the processor 120 of FIG. 1 or the processor 1250 of FIG. 12). The operations shown in FIG. 14 may be performed by loading instructions stored in the memory 130 by a touch fingerprint sensor IC (e.g., the touch fingerprint sensor IC 453 of FIG. 4 or the touch fingerprint sensor IC 1240 of FIG. 12). The operations shown in FIG. 14 may be performed by loading instructions stored in the memory 130 by a display driver IC (e.g., the display driver IC 430 of FIG. 4). For example, the operations shown in FIG. 14 may be sequentially performed, or at least some of the operations may be performed in parallel.

Figure 15:
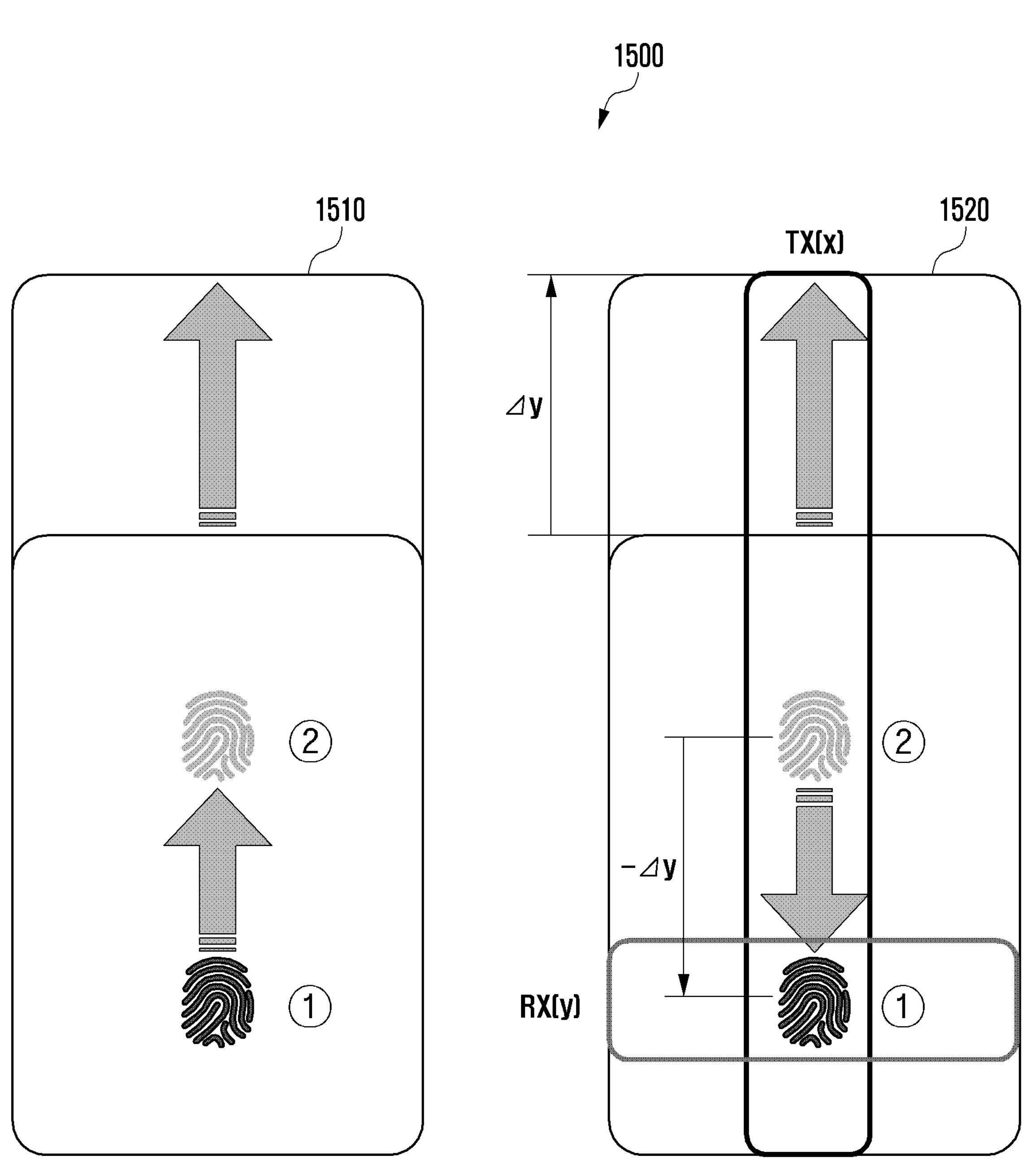
FIG. 15 is a diagram illustrating a change in a fingerprint recognition driving location according to expansion (or contraction) of a rollable display according to an embodiment of the disclosure.

FIG. 15 is a diagram illustrating a change in a fingerprint recognition driving location according to expansion (or contraction) of a rollable display according to an embodiment of the disclosure.

Figure 16:
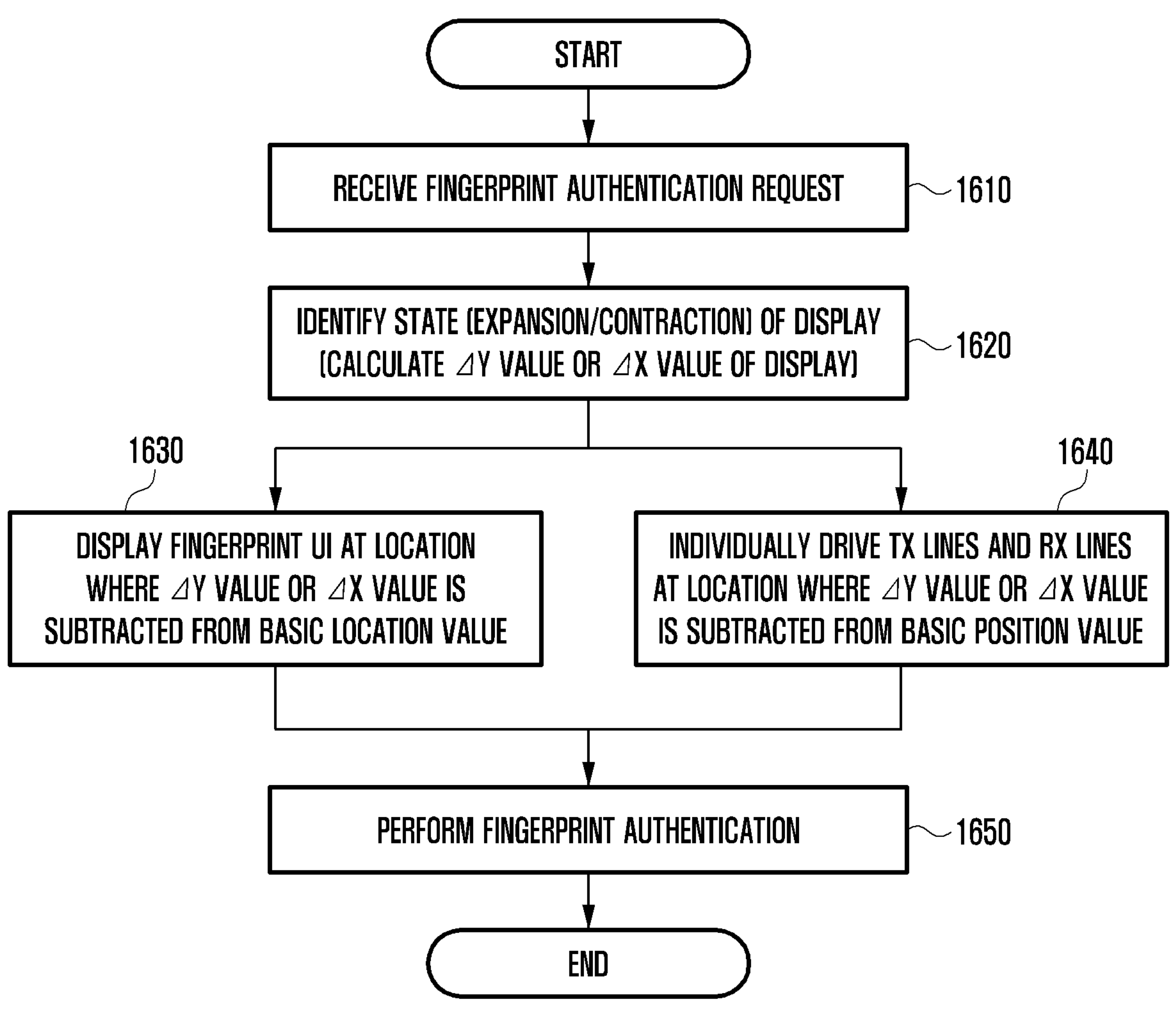
FIG. 16 is a flowchart illustrating a fingerprint authentication method according to expansion (or contraction) of a rollable display according to an embodiment of the disclosure.

FIG. 16 is a flowchart illustrating a fingerprint authentication method according to expansion (or contraction) of a rollable display according to an embodiment of the disclosure.

Referring to FIG. 15, during a fingerprint sensing operation, an electronic device (e.g., the electronic device 1200 of FIG. 12) according to an embodiment of the disclosure may determine whether a display 1500 (e.g., the display 900 of FIGS. 10 and 11) (e.g., a rollable display or a flexible display) is in an expanded screen state (e.g., a slide-out state of a rollable display) or is in a contracted screen state (e.g., a slide-in state of a rollable display).

When the display 900 or 1500 (e.g., a rollable display or a flexible display) is in an expanded state (e.g., a slide-out state of a rollable display), the electronic device 1200 according to an embodiment of the disclosure may adjust a location, where a user interface (e.g., a user interface which induces fingerprint sensing) for fingerprint sensing is displayed, according to the expanded state (e.g., a slide-out state of a rollable display) of the display 900 or 1500 (e.g., a rollable display or a flexible display).

According to an embodiment, when fingerprint authentication is required while the electronic device 1200 is used, it may be convenient to perform fingerprint authentication by sensing a user's fingerprint at a fixed location (e.g., a lower end of the display 900 or 1500) and generating a fingerprint image, regardless of whether a screen is expanded or contracted.

When the electronic device 1200 includes a flexible display (e.g., a rollable display), a user interface for fingerprint authentication may be displayed (1510) at a first location (①) in a contracted screen state. When a screen of the flexible display (e.g., a rollable display) is expanded, the user interface 1510 moves to a second location (②) where the interface is displayed.

When the screen of the flexible display (e.g., a rollable display) is expanded, the electronic device 1200 according to an embodiment of the disclosure may change a location where the user interface 1510 is displayed from the second location (②) to the first location (①) (1520) (e.g., move the location to a lower end portion (e.g., bottom) of the display).

For example, when fingerprint recognition is performed at the first location (①), Tx lines (TX(x)) to be driven by display expansion ($\Delta y$) remain unchanged, whereas Rx lines (RX(y)), corresponding to Rx lines (RX(y-$\Delta$y)) at a (y-$\Delta$y) location moved downwards by the extent of the flexible display (e.g., a rollable display) expansion, are required to be driven. The electronic device 1200 may change the driven Rx lines (RX(y)) according to the expansion of the flexible display (e.g., a rollable display). Accordingly, fingerprint recognition may be consistently possible at the first location (①) from the user's perspective. The electronic device 1200 may change the driven Rx lines (RX(y)) by the extent of the flexible display (e.g., a rollable display) expansion, and also change a location of an icon (e.g., a graphic user interface (GUI) icon) indicating a fingerprint recognition location. Accordingly, fingerprint authentication may be performed at a consistent location as perceived by a user.

Referring to FIG. 16, in operation 1610, the electronic device 1200 may receive a fingerprint authentication request. For example, when an application is executed, a processor (e.g., the processor 1250 of FIG. 12) may receive a fingerprint authentication request from the application.

In operation 1620, the electronic device 1200 may identify a state (e.g., expansion or contraction) of a display (e.g., a rollable display).

For example, the processor 1250 may determine whether the display 900 or 1500 (e.g., a rollable display or a flexible display) is in an expanded screen state (e.g., a slide-out state of a rollable display) or is in a contracted screen state (e.g., a slide-in state of a rollable display), by using a sensor module (e.g., the sensor module 176 of FIG. 1).

For example, when a display (e.g., a rollable display) is expanded (or contracted) in the y-axis direction (e.g., a vertical direction), the processor 1250 may determine a state (e.g., expansion or contraction) of the display (e.g., a rollable display), based on a change value (Δy value) of the y-axis of the display 900 or 1500 (e.g., a rollable display or a flexible display).

For example, when the display (e.g., a rollable display) is expanded (or contracted) in the x-axis direction (e.g., a horizontal direction), the processor 1250 may determine a state (e.g., expansion or contraction) of the display (e.g., a rollable display), based on a change value (Δx value) of the x-axis of the display 900 or 1500 (e.g., a rollable display or a flexible display).

In operation 1630, the processor 1250 may display a fingerprint user interface (e.g., a user interface for fingerprint recognition) at a location obtained by subtracting a change value (Δy value) of the y-axis (or a change value (Δx value) of the x-axis) from a basic location value of the display 900 or 1500 (e.g., a rollable display or a flexible display).

In operation 1640, the processor 1250 may individually drive Tx lines (e.g., the first metal mesh lines 942) and Rx lines (e.g., the second metal mesh lines 944) at locations where the display 900 or 1500 (e.g., a rollable display or a flexible display) subtracts the change value (Δy value) of the y-axis (or the change value (Δx value) of the x-axis) from the basic location value.

In operation 1650, an Rx sensing value for fingerprint recognition may be obtained from the Rx lines (e.g., the second metal mesh lines 944). The processor 1250 may generate a fingerprint image, based on the obtained Rx sensing value for fingerprint recognition. The processor 1250 may perform fingerprint authentication by comparing the generated fingerprint image with a reference fingerprint image (e.g., a sample fingerprint image and a fingerprint image template) stored in memory (e.g., the memory 130 of FIG. 1 or the memory 130 of FIG. 12).

According to an embodiment, the operations shown in FIG. 16 may be performed by loading instructions stored in memory (e.g., the memory 130 of FIG. 1 or the memory 130 of FIG. 12) by an electronic device (e.g., the electronic device 101 of FIG. 1, the electronic device 200 of FIG. 2A, the electronic device 300 of FIG. 3A, or the electronic device 1200 of FIG. 12). The operations shown in FIG. 16 may be performed by loading instructions stored in the memory 130 by a processor (e.g., the processor 120 of FIG. 1 or the processor 1250 of FIG. 12). The operations shown in FIG. 16 may be performed by loading instructions stored in the memory 130 by a touch fingerprint sensor IC (e.g., the touch fingerprint sensor IC 453 of FIG. 4 or the touch fingerprint sensor IC 1240 of FIG. 12). The operations shown in FIG. 16 may be performed by loading instructions stored in the memory 130 by a display driver IC (e.g., the display driver IC 430 of FIG. 4). For example, the operations shown in FIG. 16 may be sequentially performed, or at least some of the operations may be performed in parallel.

Figure 17:
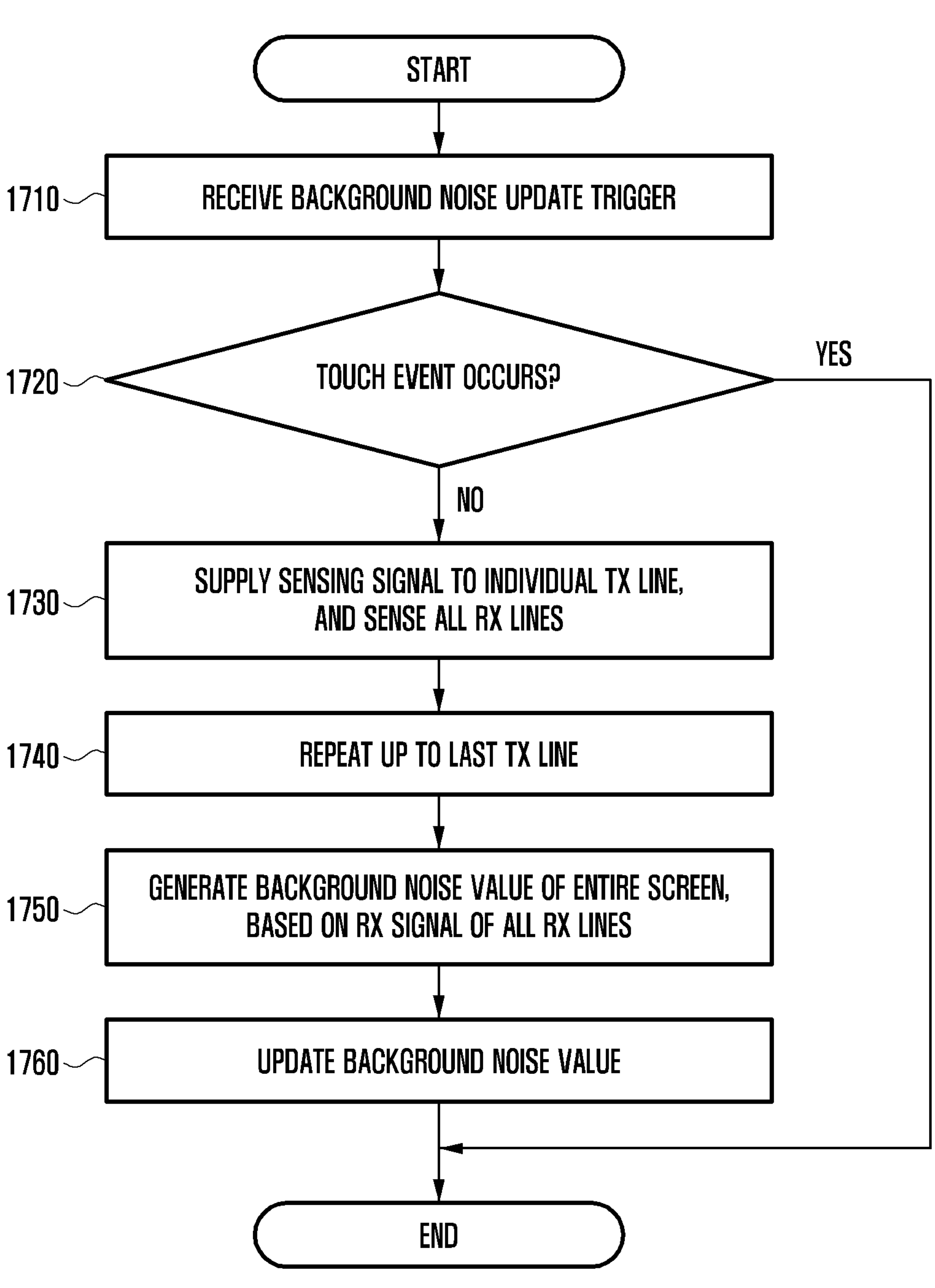
FIG. 17 is a flowchart illustrating a method of storing and updating a background noise value of an integrated touch fingerprint sensor according to an embodiment of the disclosure.

FIG. 17 is a flowchart illustrating a method of storing and updating a background noise value of an integrated touch fingerprint sensor according to an embodiment of the disclosure.

Referring to FIG. 17, in operation 1710, an electronic device (e.g., the electronic device 1200 of FIG. 12) may receive an update trigger of background noise of a touch fingerprint sensor (e.g., the touch fingerprint sensor 940 of FIGS. 10 and 11) (e.g., an integrated touch fingerprint sensor). For example, a timer may be operated to identify whether a touch event occurs or does not occur during a preconfigured time. An update trigger of background noise may be generated when a touch event does not occur during a preconfigured time. For example, a processor (e.g., the processor 1250 of FIG. 12) may receive an update trigger of background noise.

In operation 1720, the electronic device 1200 may determine whether a touch event has occurred (e.g., a touch has occurred on a display (e.g., the display 900 of FIG. 12)). For example, the processor 120 may determine whether a touch has occurred on the display 900.

In operation 1730, when the touch event does not occur, the electronic device 1200 may supply a Tx signal (e.g., a background Tx signal) to all first metal mesh lines (e.g., the first metal mesh lines 942 of FIGS. 10 and 11) (e.g., Tx lines).

For example, when the touch event does not occur, the processor 1250 may operate a first multiplexer (e.g., the first multiplexer 1220 of FIG. 12) (e.g., a Tx multiplexer) and a touch fingerprint sensor IC (e.g., the touch fingerprint sensor IC 1240 of FIG. 12) to supply a Tx signal (e.g., a background Tx signal) to all individual first metal mesh lines (e.g., the first metal mesh lines 942 of FIGS. 10 and 11) (e.g., Tx lines).

For example, the electronic device 1200 may supply a Tx signal (e.g., a background Tx signal) to individual first metal mesh lines (e.g., the first metal mesh lines 942 of FIGS. 10 and 11) (e.g., local Tx lines) (e.g., local Tx touch fingerprint sensing lines). The electronic device 1200 may detect an Rx signal (e.g., a background Rx signal) from all second metal mesh lines (e.g., the second metal mesh lines 944 of FIGS. 10 and 11) (e.g., Rx lines). In operation 1740, the electronic device 1200 may supply a Tx signal (e.g., a background Tx signal) up to the last first metal mesh line (e.g., the first metal mesh lines 942 of FIGS. 10 and 11) (e.g., local Tx lines) (e.g., local Tx touch fingerprint sensing lines). The electronic device 1200 may detect an Rx signal (e.g., a background Rx signal) from all the second metal mesh lines (e.g., the second metal mesh lines 944 of FIGS. 10 and 11) (e.g., Rx lines) whenever a Tx signal (e.g., a background Tx signal) is supplied to one first metal mesh line (e.g., the first metal mesh lines 942 of FIGS. 10 and 11) (e.g., local Tx lines) (e.g., local Tx touch fingerprint sensing lines).

For example, the processor 1250 may operate a second multiplexer (e.g., the second multiplexer 1230 of FIG. 12) (e.g., an Rx multiplexer) and a touch fingerprint sensor IC (e.g., the touch fingerprint sensor IC 1240 of FIG. 12) to detect (e.g., obtain or receive) an Rx signal (e.g., a background Rx signal) from all the second metal mesh lines (e.g., the second metal mesh lines 944 of FIGS. 10 and 11) (e.g., Rx lines).

In operation 1750, the electronic device 1200 may generate a background noise value of the entirety (e.g., the entire screen) of a flexible display (e.g., a rollable display), based on the Rx signal (e.g., a background Rx signal) detected (e.g., obtained or received) from all the second metal mesh lines (e.g., the second metal mesh lines 944 of FIGS. 10 and 11) (e.g., Rx lines).

For example, the processor 1250 may generate a background noise value of the entirety (e.g., the entire screen) of a flexible display (e.g., a rollable display), based on the Rx signal (e.g., a background Rx signal) detected (e.g., obtained or received) from all the second metal mesh lines (e.g., the second metal mesh lines 944 of FIGS. 10 and 11) (e.g., Rx lines).

In operation 1760, the electronic device 1200 may store the generated background noise value of the entirety (e.g., the entire screen) of the flexible display (e.g., a rollable display) in memory (e.g., the memory 130 of FIG. 1 or the memory of FIG. 12) to update the background noise value.

According to an embodiment, the operations shown in FIG. 17 may be performed by loading instructions stored in memory (e.g., the memory 130 of FIG. 1 or the memory 130 of FIG. 12) by an electronic device (e.g., the electronic device 101 of FIG. 1, the electronic device 200 of FIG. 2A, the electronic device 300 of FIG. 3A, or the electronic device 1200 of FIG. 12). The operations shown in FIG. 17 may be performed by loading instructions stored in the memory 130 by a processor (e.g., the processor 120 of FIG. 1 or the processor 1250 of FIG. 12). The operations shown in FIG. 17 may be performed by loading instructions stored in the memory 130 by a touch fingerprint sensor IC (e.g., the touch fingerprint sensor IC 453 of FIG. 4 or the touch fingerprint sensor IC 1240 of FIG. 12). The operations shown in FIG. 17 may be performed by loading instructions stored in the memory 130 by a display driver IC (e.g., the display driver IC 430 of FIG. 4). For example, the operations shown in FIG. 17 may be sequentially performed, or at least some of the operations may be performed in parallel.

Figure 18:
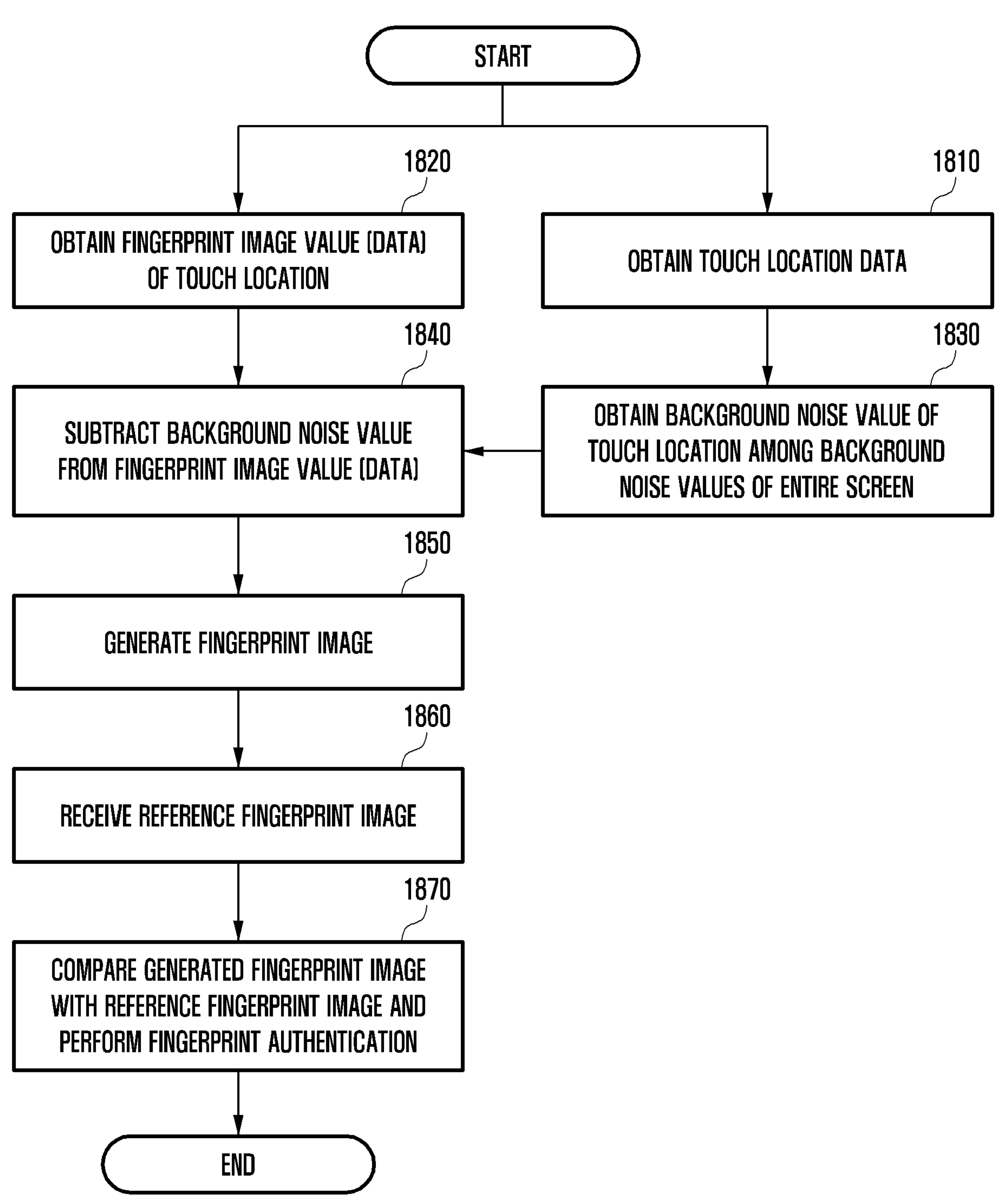
FIG. 18 is a flowchart illustrating a method of performing fingerprint authentication by reflecting a background noise value of an integrated touch fingerprint sensor according to an embodiment of the disclosure.

FIG. 18 is a flowchart illustrating a method of performing fingerprint authentication by reflecting a background noise value of an integrated touch fingerprint sensor according to an embodiment of the disclosure.

Referring to FIG. 18, in operation 1810, an electronic device (e.g., the electronic device 1200 of FIG. 12) may obtain location data (e.g., touch location data) of a touch location (e.g., the touch location 1260 of FIG. 12) (e.g., a location where a touch has been detected).

For example, a processor (e.g., the processor 1250 of FIG. 12) may obtain location data (e.g., touch location data) of the touch location 1260 (e.g., a location where a touch has been detected).

In operation 1820, the electronic device 1200 may obtain a fingerprint image value (e.g., fingerprint image data) of the touch location 1260 (e.g., a location where a touch has been detected).

For example, the processor 1250 may obtain a fingerprint image value (e.g., fingerprint image data) of the touch location 1260 (e.g., a location where a touch has been detected).

In operation 1830, the electronic device 1200 may obtain a background noise value (e.g., a local background noise value) of the touch location 1260 (e.g., a location where a touch has been detected) among background noise values of the entire area (e.g., the entire screen) of a flexible display (e.g., a rollable display).

For example, the processor 1250 may obtain a background noise value (e.g., a local background noise value) of the touch location 1260 (e.g., a location where a touch has been detected) among background noise values of the entire area (e.g., the entire screen) of a flexible display (e.g., a rollable display).

In operation 1840, the electronic device 1200 may subtract the background noise value (e.g., a local background noise value) of the touch location 1260 (e.g., a location where a touch has been detected) from the obtained fingerprint image value (e.g., fingerprint image data).

For example, the processor 1250 may subtract the background noise value (e.g., a local background noise value) of the touch location 1260 (e.g., a location where a touch has been detected) from the obtained fingerprint image value (e.g., fingerprint image data).

In operation 1850, the electronic device 1200 may generate (e.g., obtain) a fingerprint image from which the background noise value (e.g., a local background noise value) of the touch location 1260 (e.g., a location where a touch has been detected) has been removed.

For example, the processor 1250 may generate (e.g., obtain) a fingerprint image from which the background noise value (e.g., a local background noise value) of the touch location 1260 (e.g., a location where a touch has been detected) has been removed.

In operation 1860, the electronic device 1200 may obtain a reference fingerprint image (e.g., a sample fingerprint image and a fingerprint image template) stored in memory (e.g., the memory 130 of FIG. 1 or the memory 130 of FIG. 12).

For example, the processor 1250 may obtain a reference fingerprint image (e.g., a sample fingerprint image and a fingerprint image template) stored in memory (e.g., the memory 130 of FIG. 1 or the memory 130 of FIG. 12).

In operation 1870, the electronic device 1200 may perform fingerprint authentication by comparing the fingerprint image from which the background noise value of the touch location 1260 (e.g., a location where a touch has been detected) has been removed with the reference fingerprint image (e.g., a sample fingerprint image and a fingerprint image template) stored in the memory 130.

For example, the processor 1250 may perform fingerprint authentication by comparing the fingerprint image from which the background noise value of the touch location 1260 (e.g., a location where a touch has been detected) has been removed with the reference fingerprint image (e.g., a sample fingerprint image and a fingerprint image template) stored in the memory 130.

According to an embodiment, the operations shown in FIG. 18 may be performed by loading instructions stored in memory (e.g., the memory 130 of FIG. 1 or the memory 130 of FIG. 12) by an electronic device (e.g., the electronic device 101 of FIG. 1, the electronic device 200 of FIG. 2A, the electronic device 300 of FIG. 3A, or the electronic device 1200 of FIG. 12). The operations shown in FIG. 18 may be performed by loading instructions stored in the memory 130 by a processor (e.g., the processor 120 of FIG. 1 or the processor 1250 of FIG. 12). The operations shown in FIG. 18 may be performed by loading instructions stored in the memory 130 by a touch fingerprint sensor IC (e.g., the touch fingerprint sensor IC 453 of FIG. 4 or the touch fingerprint sensor IC 1240 of FIG. 12). The operations shown in FIG. 18 may be performed by loading instructions stored in the memory 130 by a display driver IC (e.g., the display driver IC 430 of FIG. 4). For example, the operations shown in FIG. 18 may be sequentially performed, or at least some of the operations may be performed in parallel.

An electronic device (e.g., the electronic device 101 of FIG. 1, the electronic device 200 of FIG. 2A, the electronic device 300 of FIG. 3A, or the electronic device 1200 of FIG. 12) according to an embodiment of the disclosure may include a display (e.g., the display 900 of FIGS. 9 to 12) (e.g., a rollable display or a flexible display) in which a plurality of pixels are arranged, a display driver integrated circuit (IC) (e.g., the display driver IC 430 of FIG. 4) configured to control an operation of the display 900, a touch fingerprint sensor (e.g., the touch fingerprint sensor 940 of FIGS. 10 to 12) disposed inside the display 900 and including Tx lines (e.g., the first metal mesh lines 942 of FIGS. 10 and 11) (e.g., first metal mesh lines) and Rx lines (e.g., the second metal mesh lines 944 of FIGS. 10 and 11) (e.g., second metal mesh lines) formed of a metal mesh, a touch fingerprint sensor IC (e.g., the touch fingerprint sensor IC 453 of FIG. 4 or the touch fingerprint sensor IC 1240 of FIG. 12) configured to control an operation of the touch fingerprint sensor 940, a processor (e.g., the processor 120 of FIG. 1 or the processor 1250 of FIG. 12) configured to control operations of the display driver IC 430 and the touch fingerprint sensor IC 453 or 1240, and memory (e.g., the memory 130 of FIG. 1 or the memory 130 of FIG. 12) operatively connected to the processor 120 or 1250. The memory 130 may include instructions. When the instructions are executed by the processor 120 or 1250, during a touch sensing operation, the electronic device 101, 200, 300, or 1200 may configure a plurality of Tx touch channels (e.g., the plurality of Tx touch channels 1212 of FIG. 12) by grouping the Tx lines 942 (e.g., first metal mesh lines) in a predetermined number of units, and supply a first Tx signal to the plurality of Tx touch channels 1212. When the instructions are executed by the processor 120 or 1250, during the touch sensing operation, the electronic device 101, 200, 300, or 1200 may configure a plurality of Rx channels (e.g., the plurality of Rx channels 1214 of FIG. 12) by grouping the Rx lines (e.g., second metal mesh lines) in a predetermined number of units, and receive a first Rx signal of each of the plurality of Rx channels 1214. When the instructions are executed by the processor 120 or 1250, during the touch sensing operation, the electronic device 101, 200, 300, or 1200 may detect a touch location, based on the first Rx signal of each of the plurality of Rx channels 1214.

According to an embodiment, the electronic device 101, 200, 300, or 1200 may include a first multiplexer (e.g., the first multiplexer 1220 of FIG. 12) electrically connected to the Tx lines 942 (e.g., first metal mesh lines) and configured to select supply of the first Tx signal to the Tx lines 942 (e.g., first metal mesh lines).

According to an embodiment, the electronic device 101, 200, 300, or 1200 may include a second multiplexer (e.g., the second multiplexer 1230 of FIG. 12) electrically connected to the Rx lines (e.g., second metal mesh lines) and configured to select reception of the first Rx signal from the Rx lines (e.g., second metal mesh lines).

According to an embodiment, the display 900 may include a flexible display 900 which slides in a first direction to expand a screen thereof and slides in a second direction opposite to the first direction to contract the screen.

According to an embodiment, the processor 120 or 1250 may detect screen expansion or contraction of the display 900. The processor 120 or 1250 may adjust a display location of a user interface of an application running on the electronic device 101, 200, 300, or 1200 according to the screen expansion or contraction of the display 900.

According to an embodiment, during a fingerprint sensing operation, the electronic device 101, 200, 300, or 1200 may adjust a display location of a user interface for fingerprint authentication according to the screen expansion or contraction of the display 900.

According to an embodiment, during the fingerprint sensing operation, the electronic device 101, 200, 300, or 1200 may supply a second Tx signal to each of local Tx lines 942 (e.g., first metal mesh lines) corresponding to the touch location among all the Tx lines 942 (e.g., first metal mesh lines).

According to an embodiment, the electronic device 101, 200, 300, or 1200 may receive a second Rx signal of each of local Rx lines (e.g., second metal mesh lines) corresponding to the touch location among all the Rx lines (e.g., second metal mesh lines).

According to an embodiment, during the fingerprint sensing operation, the electronic device 101, 200, 300, or 1200 may generate a fingerprint image, based on the second Rx signal of each of the local Rx lines (e.g., second metal mesh lines).

According to an embodiment, the memory 130 of the electronic device 101, 200, 300, or 1200 may include a first background noise value including a fixed noise value regardless of driving of the plurality of pixels, and a second background noise value including a noise value which is changed according to the driving of the plurality of pixels.

According to an embodiment, during the fingerprint sensing operation, the electronic device 101, 200, 300, or 1200 may generate the fingerprint image by reflecting the first background noise value and the second background noise value of the touch location.

According to an embodiment, during the fingerprint sensing operation, the electronic device 101, 200, 300, or 1200 may supply a third Tx signal to all the Tx lines 942 (e.g., first metal mesh lines). During the fingerprint sensing operation, the electronic device 101, 200, 300, or 1200 may receive a third Rx signal of all the Rx lines (e.g., second metal mesh lines). During the fingerprint sensing operation, the electronic device 101, 200, 300, or 1200 may generate a fingerprint image, based on the third Rx signal.

According to an embodiment, a reference fingerprint image stored in the memory 130 of the electronic device 101, 200, 300, or 1200 may be obtained. Fingerprint authentication may be performed by comparing the generated fingerprint image with the reference fingerprint image.

According to an embodiment, fingerprint authentication may be performed by generating a fingerprint image in the entire area of the display 900.

An electronic device (e.g., the electronic device 101 of FIG. 1, the electronic device 200 of FIG. 2A, the electronic device 300 of FIG. 3A, or the electronic device 1200 of FIG. 12) according to an embodiment of the disclosure may include a display 900 in which a plurality of pixels are arranged, a display driver integrated circuit (IC) 430 configured to control an operation of the display 900, a touch fingerprint sensor 940 disposed inside the display 900 and including Tx lines 942 and Rx lines 944 formed of a metal mesh, a touch fingerprint sensor IC 1240 configured to control an operation of the touch fingerprint sensor 940, and a processor 120 configured to control operations of the display driver IC 430 and the touch fingerprint sensor IC 1240. The display 900 may include the plurality of pixels, a light blocking layer 950 defining areas of the plurality of pixels, and circuit wires 930 configured to drive the plurality of pixels. The plurality of pixels 920 and the touch fingerprint sensor 940 may be arranged so as not to overlap in a vertical direction. The touch fingerprint sensor 940 and the light blocking layer 950 may be arranged so as to overlap in the vertical direction.

According to an embodiment, the light blocking layer 950 may be disposed on the top of the touch fingerprint sensor 940 in the vertical direction. The light blocking layer 950 may be disposed so as to overlap the entirety of the touch fingerprint sensor 940.

According to an embodiment, the touch fingerprint sensor 940 may be disposed above the circuit wires 930 in the vertical direction. The touch fingerprint sensor 940 and the circuit wires 930 may be arranged so as to overlap.

According to an embodiment, the Tx lines 942 of the touch fingerprint sensor 940 may be formed as metal mesh lines having a length in a first direction (y-axis direction). The Rx lines 944 of the touch fingerprint sensor 940 may be formed as metal mesh lines having a length in a second direction (x-axis direction) perpendicular to the first direction (y-axis direction).

According to an embodiment, the Tx lines 942 and the Rx lines 944 may be arranged on different planes.

According to an embodiment, the Tx lines 942 and the Rx lines 944 may be arranged on substantially the same plane.

According to an embodiment, the Tx lines 942 and the Rx lines 944 may be arranged to be electrically separated from each other.

In an operation method of an electronic device 101, 200, 300, or 1200 including a touch fingerprint sensor 940 according to an embodiment of the disclosure, the electronic device 101, 200, 300, or 1200 may include a display 900 (e.g., a rollable display or a flexible display) in which a plurality of pixels are arranged, a display driver integrated circuit (IC) 430 configured to control an operation of the display 900, a touch fingerprint sensor 940 disposed inside the display 900 and including Tx lines 942 (e.g., first metal mesh lines) and Rx lines (e.g., second metal mesh lines) formed of a metal mesh, a touch fingerprint sensor IC 453 or 1240 configured to control an operation of the touch fingerprint sensor 940, a processor 120 or 1250 configured to control operations of the display driver IC 430 and the touch fingerprint sensor IC 453 or 1240, and memory 130 operatively connected to the processor 120 or 1250, wherein the memory 130 includes instructions for executing an operation of the electronic device 101, 200, 300, or 1200. The operation method may include, during a touch sensing operation, configuring a plurality of Tx touch channels 1212 by grouping the Tx lines 942 (e.g., first metal mesh lines) in a predetermined number of units, and supplying a first Tx signal to the plurality of Tx touch channels 1212. The operation method may include, during the touch sensing operation, configuring a plurality of Rx channels 1214 by grouping the Rx lines (e.g., second metal mesh lines) in a predetermined number of units, and receiving a first Rx signal of each of the plurality of Rx channels 1214. The operation method may include, during the touch sensing operation, detecting a touch location, based on the first Rx signal of each of the plurality of Rx channels 1214.

According to an embodiment, the display 900 may slide in a first direction to expand a screen thereof, and may slide in a second direction opposite to the first direction to contract the screen. The operation method may include detecting screen expansion or contraction of the display 900, and adjusting a display location of a user interface of an application according to the screen expansion or contraction of the display 900.

According to an embodiment, the operation method may include, during a fingerprint sensing operation, adjusting a display location of a user interface for fingerprint authentication according to the screen expansion or contraction of the display 900.

According to an embodiment, the operation method may include, during the fingerprint sensing operation, supplying a second Tx signal to each of local Tx lines 942 (e.g., first metal mesh lines) corresponding to the touch location among all the Tx lines 942 (e.g., first metal mesh lines). The operation method may include receiving a second Rx signal of each of local Rx lines (e.g., second metal mesh lines) corresponding to the touch location among all the Rx lines (e.g., second metal mesh lines). The operation method may generate a fingerprint image, based on the second Rx signal of each of the local Rx lines (e.g., second metal mesh lines).

According to an embodiment, in the operation method, the memory 130 of the electronic device 101, 200, 300, or 1200 may include a first background noise value including a fixed noise value regardless of driving of the plurality of pixels, and a second background noise value including a noise value which is changed according to the driving of the plurality of pixels. The operation method may include, during the fingerprint sensing operation, generating the fingerprint image by reflecting the first background noise value and the second background noise value of the touch location.

According to an embodiment, the operation method may include, during the fingerprint sensing operation, supplying a third Tx signal to all the Tx lines 942 (e.g., first metal mesh lines). The operation method may include, during the fingerprint sensing operation, receiving a third Rx signal of all the Rx lines (e.g., second metal mesh lines). The operation method may include, during the fingerprint sensing operation, generating a fingerprint image, based on the third Rx signal.

According to an embodiment, the operation method may include, during the fingerprint sensing operation, obtaining a reference fingerprint image stored in the memory 130 of the electronic device 101, 200, 300, or 1200. The operation method may include, during the fingerprint sensing operation, performing fingerprint authentication by comparing the generated fingerprint image with the reference fingerprint image.

According to an embodiment, the operation method may include, during the fingerprint sensing operation, performing fingerprint authentication by generating a fingerprint image in the entire area of the display 900.

In a recording medium storing instructions readable by a processor 120 or 1250 of an electronic device 101, 200, 300, or 1200, the instructions, when executed by the processor 120 or 1250, may cause the electronic device 101, 200, 300, or 1200 to, during a touch sensing operation, configure a plurality of Tx touch channels 1212 by grouping Tx lines 942 (e.g., first metal mesh lines) arranged on a display 900 of the electronic device 101, 200, 300, or 1200 in a predetermined number of units, and supply a first Tx signal to the plurality of Tx touch channels 1212. The instructions, when executed by the processor 120 or 1250, may cause the electronic device 101, 200, 300, or 1200 to, during a touch sensing operation, configure a plurality of Rx channels 1214 by grouping Rx lines (e.g., second metal mesh lines) arranged on the display 900 in a predetermined number of units, and receive a first Rx signal of each of the plurality of Rx channels 1214. The instructions, when executed by the processor 120 or 1250, may cause the electronic device 101, 200, 300, or 1200 to, during the touch sensing operation, detect a touch location, based on the first Rx signal of each of the plurality of Rx channels 1214. The instructions, when executed by the processor 120 or 1250, may cause the electronic device 101, 200, 300, or 1200 to, during a fingerprint sensing operation, supply a second Tx signal to each of local Tx lines 942 (e.g., first metal mesh lines) corresponding to the touch location among all the Tx lines 942 (e.g., first metal mesh lines). The instructions, when executed by the processor 120 or 1250, may cause the electronic device 101, 200, 300, or 1200 to, during the fingerprint sensing operation, receive a second Rx signal of each of local Rx lines (e.g., second metal mesh lines) corresponding to the touch location among all the Rx lines (e.g., second metal mesh lines). The instructions, when executed by the processor 120 or 1250, may cause the electronic device 101, 200, 300, or 1200 to, during the fingerprint sensing operation, generate a fingerprint image, based on the second Rx signal of each of the local Rx lines (e.g., second metal mesh lines).

In an electronic device including an integrated touch fingerprint sensor and an operation method thereof according to various embodiments of the disclosure, touch sensing and fingerprint sensing may be performed together by embedding a sensor (e.g., an integrated touch fingerprint sensor), in which a touch sensing function and a fingerprint sensing function are integrated, in a flexible display (e.g., a rollable display) (e.g., an in-cell touch manner).

In an electronic device including an integrated touch fingerprint sensor and an operation method thereof according to various embodiments of the disclosure, a user interface for fingerprint authentication may be displayed at a preconfigured location regardless of screen expansion or screen contraction of a flexible display (e.g., a rollable display), and a fingerprint may be sensed at the preconfigured location.

In an electronic device including an integrated touch fingerprint sensor and an operation method thereof according to various embodiments of the disclosure, a touch and a fingerprint may be sensed on the entire screen (e.g., the entire area of a display) of a flexible display (e.g., a rollable display).

In an electronic device including an integrated touch fingerprint sensor and an operation method thereof according to various embodiments of the disclosure, a high-resolution fingerprint image may be generated on the entire screen (e.g., the entire area of a display) of a flexible display (e.g., a rollable display), and a more intuitive and convenient user experience using enhanced security and the fluidity in a fingerprint recognition area may be provided.

In an electronic device including an integrated touch fingerprint sensor and an operation method thereof according to various embodiments of the disclosure, a touch fingerprint sensor is embedded in the inside of a flexible display (e.g., a rollable display) (or disposed in an upper portion of the display), and the touch fingerprint sensor is disposed so as to overlap a light blocking layer (e.g., a light absorption layer) (e.g., a black matrix), so that reflected light inside the flexible display (e.g., a rollable display) can be prevented from being reflected externally and deteriorating image quality.

An electronic device according to an embodiment of the disclosure may perform touch sensing and fingerprint sensing together to use a locking function using fingerprint authentication for each application without a separate login operation, thereby providing a user with the convenience of fingerprint authentication.

An electronic device according to an embodiment of the disclosure may perform touch sensing and fingerprint sensing together, so as to, when a card payment service application is used, select a card for payment and immediately activate payment through fingerprint authentication at the same time. In addition, multi-finger authentication may be applied to an operation which requires security, such as various financial services, including a payment service. Accordingly, security may be strengthened when running an application.

Advantageous effects obtainable from the disclosure may not be limited to the above mentioned effects, and other effects which are not mentioned may be clearly understood, through the following descriptions, by those skilled in the art to which the disclosure pertains.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display that comprises a substrate, a plurality of subpixels disposed on the substrate, circuits and wires for driving the subpixels, a touch fingerprint sensor for sensing a touch and a fingerprint, and a light blocking layer, the touch fingerprint sensor comprising a plurality of transmission (Tx) metal mesh lines and a plurality of reception (Rx) metal mesh lines that are arranged in the display;

one or more processors; and memory storing instructions that, when executed by the one or more processors individually or collectively, cause the electronic device to:

configure a plurality of Tx channels by grouping a predetermined number of the plurality of Tx metal mesh lines, configure a plurality of Rx channels by grouping a predetermined number of the plurality of Rx metal mesh lines, supply a first Tx signal to the plurality of Tx channels for touch sensing, detect a touch input based on a first Rx signal from the plurality of Rx channels while the first Tx signal is supplied to the plurality of Tx channels, identify at least one Tx channel among the plurality of Tx channels based on the detected touch input, supply a second Tx signal to the identified at least one Tx channel corresponding to a touch location of the detected touch input, receive a second Rx signal from at least one Rx channel corresponding to the touch location, and generate a fingerprint image based on the received second Rx signal, wherein the plurality of subpixels are separated by the light blocking layer to prevent color mixing, wherein the plurality of subpixels and the touch fingerprint sensor are arranged to be separated so as not to overlap each other on a plane of the display, wherein the touch fingerprint sensor and the light blocking layer are arranged so as to overlap on a plane, and the light blocking layer is disposed so as to cover the circuits and wires and at least an entirety of the touch fingerprint sensor, wherein the plurality of Tx metal mesh lines are formed by electrically connecting a plurality of first metal mesh patterns by a plurality of first connection wires, and the plurality of Rx metal mesh lines are formed by electrically connecting a plurality of second metal mesh patterns by a plurality of second connection wires, wherein the plurality of Tx metal mesh lines and the plurality of Rx metal mesh lines are formed of a metal material comprising at least one selected from the group consisting of Ag, Cu, Au, Al, Mg, Zn, Ni, Pb, Sb, and alloys thereof, wherein the plurality of Tx metal mesh lines are arranged in a line form having a length in a first direction, and the plurality of Rx metal mesh lines are arranged in a line form having a length in a second direction perpendicular to the first direction, wherein the plurality of Tx metal mesh lines and the plurality of Rx metal mesh lines are arranged on a same plane, and a bridge pattern is disposed in a portion where the plurality of Tx metal mesh lines and the plurality of Rx metal mesh lines intersect, and the plurality of Tx metal mesh lines and the plurality of Rx metal mesh lines are electrically insulated from each other through the bridge pattern, and wherein the fingerprint image is generated based on capacitive sensing through the plurality of Tx metal mesh lines and the plurality of Rx metal mesh lines at the touch location.

2. The electronic device of claim 1, further comprising:

a first multiplexer electrically connected to the plurality of Tx metal mesh lines, wherein the plurality of Tx channels are configured using the first multiplexer.

3. The electronic device of claim 1, further comprising:

a second multiplexer electrically connected to the plurality of Rx metal mesh lines, wherein the plurality of Rx channels are configured using the second multiplexer.

4. The electronic device of claim 1, wherein the instructions, when executed by the one or more processors individually or collectively, cause the electronic device to:

identify at least one Rx channel among the plurality of Rx channels based on the detected touch input, and receive the second Rx signal from the identified at least one Rx channel.

5. The electronic device of claim 1, wherein the instructions, when executed by the one or more processors individually or collectively, cause the electronic device to:

generate the fingerprint image, based on the second Rx signal of each of the plurality of Rx metal mesh lines.

6. The electronic device of claim 1, wherein the instructions, when executed by the one or more processors individually or collectively, cause the electronic device to:

obtain a background noise value of the touch location, wherein the background noise value comprises at least one of a first background noise value comprising a fixed noise value regardless of driving of a plurality of pixels, or a second background noise value comprising a noise value which is changed based on the driving of the plurality of pixels, and generate the fingerprint image from which the background noise value of the touch location is removed.

7. The electronic device of claim 1, wherein the instructions, when executed by the one or more processors individually or collectively, cause the electronic device to:

obtain a reference fingerprint image stored in the memory, and perform a fingerprint authentication by comparing the generated fingerprint image with the reference fingerprint image.

8. The electronic device of claim 1, wherein the fingerprint image is generated in an entire area of the display.

9. A method performed by an electronic device comprising a display that comprises a substrate, a plurality of subpixels disposed on the substrate, circuits and wires for driving the subpixels, a touch fingerprint sensor for sensing a touch and a fingerprint, and a light blocking layer, the touch fingerprint sensor comprising a plurality of transmission (Tx) metal mesh lines and a plurality of reception (Rx) metal mesh lines that are arranged in the display, the method comprising:

configuring a plurality of Tx channels by grouping a predetermined number of the plurality of Tx metal mesh lines;

configuring a plurality of Rx channels by grouping a predetermined number of the plurality of Rx metal mesh lines;

supplying a first Tx signal to the plurality of Tx channels for touch sensing;

detecting a touch input based on a first Rx signal from the plurality of Rx channels while the first Tx signal is supplied to the plurality of Tx channels;

identifying at least one Tx channel among the plurality of Tx channels based on the detected touch input;

supplying a second Tx signal to the identified at least one Tx channel corresponding to a touch location of the detected touch input;

receiving a second Rx signal from at least one Rx channel corresponding to the touch location; and generating a fingerprint image based on the received second Rx signal, wherein the plurality of subpixels are separated by the light blocking layer to prevent color mixing, wherein the plurality of subpixels and the touch fingerprint sensor are arranged to be separated so as not to overlap each other on a plane of the display, wherein the touch fingerprint sensor and the light blocking layer are arranged so as to overlap on a plane, and the light blocking layer is disposed so as to cover the circuits and wires and at least an entirety of the touch fingerprint sensor, wherein the plurality of Tx metal mesh lines are formed by electrically connecting a plurality of first metal mesh patterns by a plurality of first connection wires, and the plurality of Rx metal mesh lines are formed by electrically connecting a plurality of second metal mesh patterns by a plurality of second connection wires, wherein the plurality of Tx metal mesh lines and the plurality of Rx metal mesh lines are formed of a metal material comprising at least one selected from the group consisting of Ag, Cu, Au, Al, Mg, Zn, Ni, Pb, Sb, and alloys thereof, wherein the plurality of Tx metal mesh lines are arranged in a line form having a length in a first direction, and the plurality of Rx metal mesh lines are arranged in a line form having a length in a second direction perpendicular to the first direction, wherein the plurality of Tx metal mesh lines and the plurality of Rx metal mesh lines are arranged on a same plane, and a bridge pattern is disposed in a portion where the plurality of Tx metal mesh lines and the plurality of Rx metal mesh lines intersect, and the plurality of Tx metal mesh lines and the plurality of Rx metal mesh lines are electrically insulated from each other through the bridge pattern, and wherein the fingerprint image is generated based on capacitive sensing through the plurality of Tx metal mesh lines and the plurality of Rx metal mesh lines at the touch location.

10. The method of claim 9, further comprising:

selecting, by a first multiplexer of the electronic device electrically connected to the plurality of Tx metal mesh lines, at least one of supply of the first Tx signal to the plurality of Tx channels or supply of the second Tx signal to the plurality of Tx metal mesh lines.

11. The method of claim 9, further comprising:

selecting, by a second multiplexer of the electronic device electrically connected to the plurality of Rx metal mesh lines, at least one of reception of the first Rx signal from the plurality of Rx channels or reception of the second Rx signal from the plurality of Rx metal mesh lines.

12. The method of claim 9, further comprising:

identifying at least one Rx channel among the plurality of Rx channels based on the detected touch input; and receiving the second Rx signal from the identified at least one Rx channel.

13. The method of claim 9, further comprising:

generating the fingerprint image, based on the second Rx signal of each of the plurality of Rx metal mesh lines.

14. The method of claim 9, wherein the generating of the fingerprint image comprises:

obtaining a background noise value of the touch location, wherein the background noise value comprises at least one of a first background noise value comprising a fixed noise value regardless of driving of a plurality of pixels of the display, or a second background noise value comprising a noise value which is changed according to the driving of the plurality of pixels; and generating the fingerprint image from which the background noise value of the touch location is removed.

15. The method of claim 9, further comprising:

obtaining a reference fingerprint image stored in a memory of the electronic device; and performing a fingerprint authentication by comparing the generated fingerprint image with the reference fingerprint image.

16. The method of claim 9, wherein the fingerprint image is generated in an entire area of the display.

* * * * *